US012705722B2

(12) United States Patent
Shahan et al.

(10) Patent No.: US 12,705,722 B2
(45) Date of Patent: Aug. 11, 2026

(54) REAL TIME INCONSISTENCY DETECTION DURING COMPOSITE MATERIAL MANUFACTURING

(71) Applicant: The Boeing Company, Arlington, VA (US)

(72) Inventors: David Williamson Shahan, Santa Monica, CA (US); Rashmi Sundareswara, Topanga, CA (US); Tiffany Allison Stewart, Los Angeles, CA (US); Russell Patrick Mott, Agoura Hills, CA (US); Andrew L. Bauer, Kirkland, WA (US); Gwen Marie Lanphere Gross, Redmond, WA (US)

(73) Assignee: The Boeing Company, Arlington, VA (US)

( * ) Notice: Subject to any disclaimer, the term of this patent is extended or adjusted under 35 U.S.C. 154(b) by 290 days.

(21) Appl. No.: 18/416,615

(22) Filed: Jan. 18, 2024

(65) Prior Publication Data

US 2024/0153063 A1 May 9, 2024

Related U.S. Application Data

(63) Continuation-in-part of application No. 17/811,433, filed on Jul. 8, 2022, now Pat. No. 12,422,831.

(Continued)

(51) Int. Cl.

| | |
|---|---|
| ***G06T 7/00*** | (2017.01) |
| ***B29C 70/54*** | (2006.01) |
| ***G06T 7/277*** | (2017.01) |

(52) U.S. Cl.
CPC ............ *G06T 7/0004* (2013.01); *B29C 70/54* (2013.01); *G06T 7/277* (2017.01); *G06T 2207/20081* (2013.01); *G06T 2207/30108* (2013.01)

(58) Field of Classification Search
CPC ... G06T 7/0004; G06T 7/0006; G06T 7/0008; G06T 7/001; G06T 7/0002;

(Continued)

(56) References Cited

U.S. PATENT DOCUMENTS

| | | | |
|---|---|---|---|
| 5,142,151 | A | 8/1992 | Varnell et al. |
| 9,976,964 | B2 | 5/2018 | Fisset et al. |

(Continued)

FOREIGN PATENT DOCUMENTS

| | | | |
|---|---|---|---|
| CN | 1472531 | A | 2/2004 |
| CN | 117371116 | A | 1/2024 |

(Continued)

OTHER PUBLICATIONS

Harik, R., Saidy, C., Williams, S. J., Gurdal, Z., & Grimsley, B. (2018). Automated fiber placement defect identity cards: cause, anticipation, existence, significance, and progression (No. NF1676L-29045). (Year: 2018).*

(Continued)

*Primary Examiner* — Andrew W Bee
*Assistant Examiner* — Emma E Dryden
(74) *Attorney, Agent, or Firm* — Yee & Associates, P.C.

(57) ABSTRACT

A method, apparatus, system, and computer program product for detecting inconsistencies in an unconsolidated composite material. Fiber inconsistencies are detected in sections of the fibers input into a composite material manufacturing system in real time during operation of the composite material manufacturing system. Material inconsistencies are detected in the unconsolidated composite (Continued)

material in real time as the unconsolidated composite material is being manufactured by the composite material manufacturing system using the fibers. A determination is made as to whether the material inconsistencies are present in a number of the sections in which the fiber inconsistencies are detected in real time as the unconsolidated composite material is being manufactured by the composite material manufacturing system. The fiber inconsistencies in the number of the sections in which the fibers with fiber inconsistencies resulted in the material inconsistencies in the number of the sections in the unconsolidated composite material are tracked.

21 Claims, 30 Drawing Sheets

Related U.S. Application Data

(60) Provisional application No. 63/493,123, filed on Mar. 30, 2023.

(58) Field of Classification Search
CPC . G06T 2207/30124; G06T 2207/30108; B29C 70/54; B29C 70/504; G05B 2219/32187; G05B 19/41875; G05B 13/0265; G05B 13/04; G05B 2219/32177
See application file for complete search history.

(56) References Cited

U.S. PATENT DOCUMENTS 11,009,863 B2 5/2021 Bharadwaj et al.
11,502,912 B2 11/2022 Levy et al.
11,660,784 B2 5/2023 Fujiki
11,731,317 B1 8/2023 Stewart et al.
11,803,165 B2 10/2023 Moriguchi et al.
11,853,033 B1 12/2023 McCallum et al.
12,242,237 B2 3/2025 Kazmierski et al.
12,422,831 B2 9/2025 Stewart et al.
2004/0230411 A1 11/2004 Zheng et al.
2005/0047643 A1 3/2005 Lowe
2006/0071668 A1 4/2006 Senibi et al.
2009/0112357 A1 4/2009 Hammond et al.
2010/0276578 A1 11/2010 Shelley et al.
2012/0056082 A1 3/2012 Werner et al.
2014/0299253 A1* 10/2014 Minamida ............... B32B 29/02 156/64
2014/0299523 A1 10/2014 Sommer, Jr.
2015/0252160 A1 9/2015 Teranishi et al.
2016/0025565 A1 1/2016 Adda et al.
2016/0299085 A1 10/2016 Fisset et al.
2016/0334380 A1 11/2016 Wachinger et al.
2018/0154591 A1 6/2018 Hauber et al.
2018/0311914 A1* 11/2018 Marcoe ................. B29C 70/386
2019/0072500 A1* 3/2019 Green ...................... D06H 3/14
2019/0375171 A1 12/2019 Choi et al.
2020/0264335 A1 8/2020 Bhatia et al.
2020/0387824 A1 12/2020 Kelsey et al.
2020/0401113 A1 12/2020 Yuan et al.
2021/0096051 A1 4/2021 Kutscha et al.
2021/0172894 A1 6/2021 Cordatos
2021/0252744 A1 8/2021 Yamamoto et al.
2021/0311440 A1* 10/2021 Sundstrom ............ G06T 1/0014
2021/0317821 A1 10/2021 Mignacca
2022/0156439 A1 5/2022 Takagaki et al.
2022/0245307 A1 8/2022 Kothnur et al.
2022/0266390 A1 8/2022 Neogi et al.
2023/0016600 A1 1/2023 Jarrahi et al.
2023/0115965 A1 4/2023 Yu et al.
2023/0145539 A1 5/2023 Kalwa
2023/0195061 A1 6/2023 Gadre et al.
2023/0323503 A1 10/2023 Ojima et al.
2024/0012399 A1 1/2024 Stewart et al.
2024/0159665 A1 5/2024 Shahan et al.
2025/0093853 A1 3/2025 Sundstrom et al.

FOREIGN PATENT DOCUMENTS

DE 102018008739 A1 5/2020
EP 1503206 A1 2/2005
EP 3495904 A1 6/2019
EP 3628473 A1 * 4/2020 ......... G01N 21/8851
EP 3751367 A1 12/2020
EP 4303677 A1 1/2024
EP 4303678 A1 1/2024
JP H09292391 A 11/1997
JP 2006266847 A * 10/2006
JP 2010133963 A 6/2010
WO 0007010 A1 2/2000
WO 2016044415 A1 3/2016
WO 2021079985 A1 4/2021
WO WO-2021141015 A1 * 7/2021 ............. B29C 70/52
WO 2022009596 A1 1/2022
WO 2022054500 A1 3/2022

OTHER PUBLICATIONS

Nash, C., Karve, P., Adams, D., & Mahadevan, S. (2021). Flaw detection and localization in curing fiber-reinforced polymer composites using infrared thermography and Kalman filtering: a simulation study. Journal of Nondestructive Evaluation, 40(3), 78. ( Year: 2021).*

Zhou, Y., Yu, H., Simmons, J., Przybyla, C. P., & Wang, S. (2016). Large-scale fiber tracking through sparsely sampled image sequences of composite materials. IEEE Transactions on Image Processing, 25(10), 4931-4942. (Year: 2016).*

Brasington Alex et al: "A review and framework for modeling methodologies to advance automated fiber placement", Composites Part C: Open Access, vol. 10, Mar. 1, 2023 (Mar. 1, 2023), p. 100347, XP093133036, ISSN: 2666-6820, DOI: 10.1016/j.jcomc.2023.100347.

Brook A et al: "A 3D THz image processing methodology for a fully integrated, semi-automatic and near real-time operational system", Terahertz Physics, Devices, and Systems VI: Advanced Applications in Industry and Defense, SPIE, 1000 20th St. Ellingham WA, 98225-6705 USA, vol. 8363, No. 1, May 11, 2012 (May 11, 2012) , pp. 1-12, XP060003767, DOI: 10.1117/12.919382 [retrieved on May 8, 2012].

European Patent Office Extended Search Report, dated Aug. 30, 2024, regarding Application No. 24167298.9, 15 pages.

European Patent Office Extended Search Report, dated Aug. 9, 2024, regarding Application No. EP24167269.0, 10 pages.

European Patent Office Extended Search Report, dated Aug. 9, 2024, regarding Application No. EP24167303.7, 7 pages.

Islam Faisal et al: "An approach for process optimisation of the Automated Fibre Placement (AFP) based thermoplastic composites manufacturing using Machine Learning, photonic sensing and thermomechanics modelling", Manufacturing Letters, vol. 32, Apr. 1, 2022 (Apr. 1, 2022), pp. 10-14, XP093193172, ISSN: 2213-8463, DOI: 10.1016/j.mfglet.2022.01.002 Retrieved from the Internet: URL:https://www.sciencedirect.com/science/article/pii/S2213846322000025/pdfft?md5=a25c697bcf46b439d2f22c547e40b7e8&pid=1-s2.0-S2213846322000025-main.pdf.

"ULLMAN et al., ""In-line Quality Assurance for the Manufacturing of Carbon Fiber Reinforced Aircraft Structures," 2nd Int. Symposium on NDT in Aerospace, Nov. 2010, 8 pages.

European Patent Office Extended Search Report, dated Dec. 6, 2023, regarding Application No. EP23175983.8, 10 pages.

European Patent Office Extended Search Report, dated Dec. 6, 2023, regarding Application No. EP23180604.3, 10 pages.

Notice of Allowance, dated Jun. 6, 2023, regarding U.S. Appl. No. 17/811,461, 7 pages.

Office Action, dated May 8, 2023, regarding U.S. Appl. No. 17/811,461, 34 pages.

(56) References Cited

OTHER PUBLICATIONS

Final Office Action, dated Jun. 24, 2025, regarding U.S. Appl. No. 17/811,433, 14 pages.
Notice of Allowance, dated Aug. 4, 2025, regarding U.S. Appl. No. 17/811,433, 11 pages.
European Patent Office Extended Search Report, dated Sep. 30, 2024, regarding Application No. EP24167279.9, 6 pages.
Office Action, dated Feb. 13, 2025, regarding U.S. Appl. No. 17/811,433, 35 pages.
Extended European Search Report, dated Oct. 20, 2025, regarding EP Application No. 25172696.4, 9 pages.
George, et al., "Cure Monitoring of Aerospace Epoxy Resins and Prepregs by Fourier Transform Infrared Emission Spectroscopy," Polymer International, Oct. 1, 1996, pp. 169-182, vol. 41, No. 2, SCI, Great Britain, DOI: 10.1002/(SICI)1097-0126(199610)41:2<169.
Office Action, dated Sep. 23, 2025, regarding U.S. Appl. No. 18/416,653, 18 pages.
Shahan et al., "Real Time Characteristic Prediction for Unconsolidated Composite Materials," filed Jan. 18, 2024, U.S. Appl. No. 18/416,467, 127 pages.
Shahan et al., "Unconsolidated Composite Material Component Verification via Non-Contact Chemical Sensing," filed Jan. 18, 2024, U.S. Appl. No. 18/416,717, 125 pages.
Notice of Allowance, dated Mar. 10, 2026, regarding U.S. Appl. No. 18/416,717, 7 pages.
Corrected Notice of Allowability, dated Mar. 27, 2026, regarding U.S. Appl. No. 18/416,717, 12 pages.
European Patent Office Action, dated May 4, 2026, regarding EP Application No. 24167303.7, 6 pages.
Office Action, dated Apr. 27, 2026, regarding U.S. Appl. No. 18/416,467, 54 pages.

* cited by examiner

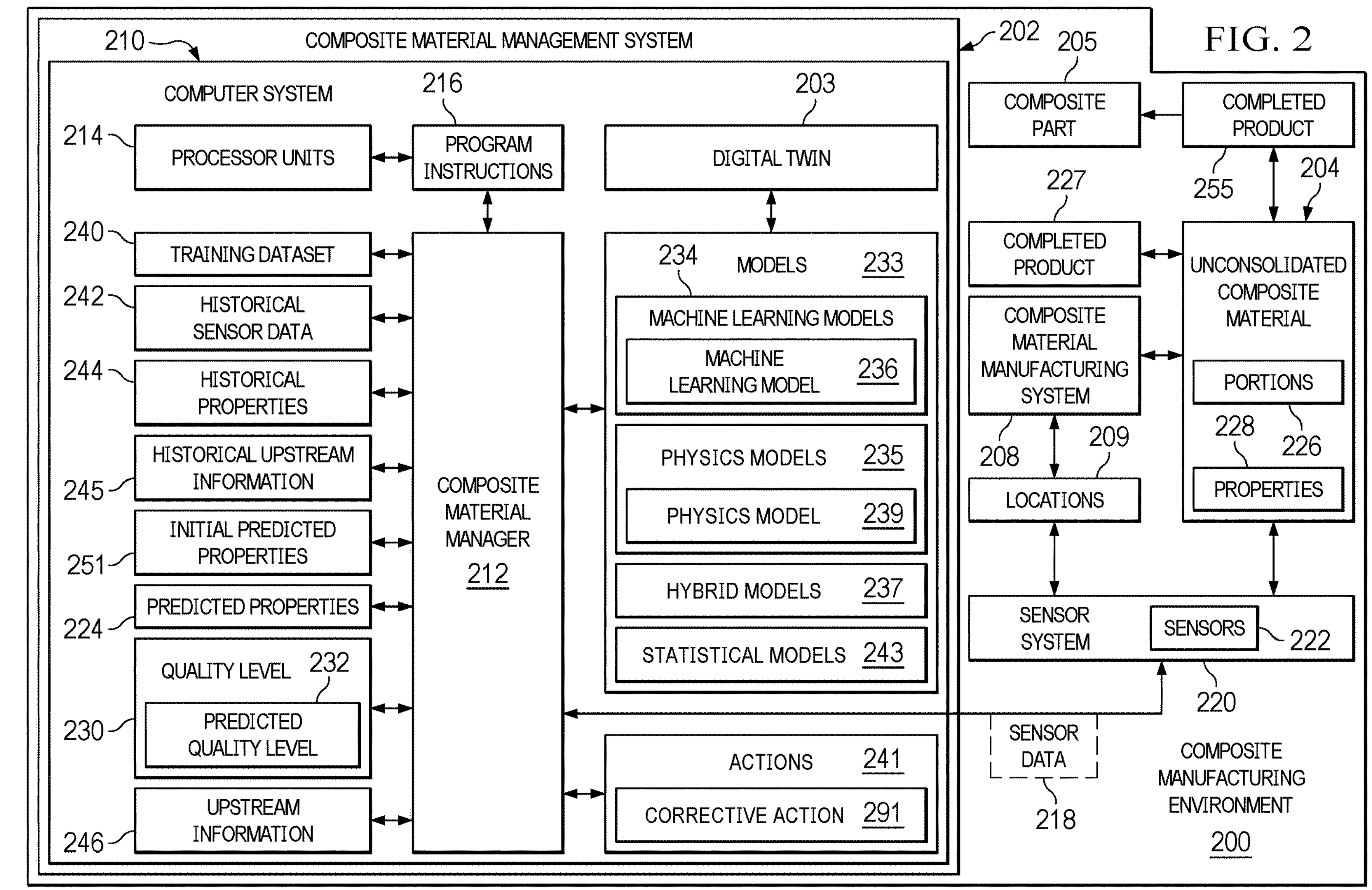
FIG. 2
COMPOSITE MATERIAL MANAGEMENT SYSTEM
210
202
COMPUTER SYSTEM
216
203
214
PROCESSOR UNITS
PROGRAM INSTRUCTIONS
DIGITAL TWIN
240
TRAINING DATASET
234
MODELS
233
242
HISTORICAL SENSOR DATA
MACHINE LEARNING MODELS
MACHINE LEARNING MODEL
236
244
HISTORICAL PROPERTIES
HISTORICAL UPSTREAM INFORMATION
245
PHYSICS MODELS
235
COMPOSITE MATERIAL MANAGER
212
INITIAL PREDICTED PROPERTIES
251
PHYSICS MODEL
239
PREDICTED PROPERTIES
224
HYBRID MODELS
237
STATISTICAL MODELS
243
QUALITY LEVEL
232
PREDICTED QUALITY LEVEL
230
ACTIONS
241
UPSTREAM INFORMATION
246
CORRECTIVE ACTION
291
205
COMPOSITE PART
COMPLETED PRODUCT
255
204
227
COMPLETED PRODUCT
UNCONSOLIDATED COMPOSITE MATERIAL
COMPOSITE MATERIAL MANUFACTURING SYSTEM
PORTIONS
208
209
228
226
LOCATIONS
PROPERTIES
SENSOR SYSTEM
SENSORS
222
220
SENSOR DATA
218
COMPOSITE MANUFACTURING ENVIRONMENT
200

2800
AIRCRAFT
2802
AIRFRAME
INTERIOR
2806
SYSTEMS
PROPULSION SYSTEM
ELECTRICAL SYSTEM
2808
2812
2810
2814
2804
HYDRAULIC SYSTEM
ENVIRONMENTAL SYSTEM

REAL TIME INCONSISTENCY DETECTION DURING COMPOSITE MATERIAL MANUFACTURING

CROSS-REFERENCE TO RELATED APPLICATIONS

This application claims the benefit of U.S. Provisional Patent Application Ser. No. 63/493,123, filed Mar. 30, 2023, and entitled "Real-Time Identification and Digital Tracking of Defects During Composite Material Manufacturing via Online Imaging," which is incorporated herein by reference in its entirety.

This application is a Continuation-In-Part (CIP) and claims the benefit of U.S. patent application Ser. No. 17/811,433, filed Jul. 8, 2022, and entitled "Property Prediction for Unconsolidated Composite Materials," which is incorporated herein by reference in its entirety.

This application is related to the following U.S. Patent Applications: U.S. patent application Ser. No. 18/416,467, filed even date hereof, and entitled "Real Time Characteristic Prediction for Unconsolidated Composite Materials;" U.S. patent application Ser. No. 18/416,653, filed even date hereof, and entitled "Real Time Contaminants Identification During Composite Material Manufacturing via Non-Contact Chemical Sensing;" and U.S. patent application Ser. No. 18/416,717, filed even date hereof, and entitled "Unconsolidated Composite Material Component Verification via Non-Contact Chemical Sensing;" which are incorporated herein by reference in their entirety.

BACKGROUND INFORMATION

1. Field

The present disclosure relates generally to manufacturing composite materials and in particular, to manufacturing uncured composite materials. Still more particularly, the present disclosure relates to a method, apparatus, system, and computer program product for predicting properties for uncured composite materials during the manufacturing of the uncured composite materials.

2. Background

Aircraft are being designed and manufactured with greater and greater percentages of composite materials. Composite materials are used in aircraft to decrease the weight of the aircraft and improve aero efficiency through design. This decreased weight improves performance features such as increased payload capacities and fuel efficiencies. Further, composite materials provide longer service life for various components in an aircraft.

Composite materials are tough, light-weight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

Further, using composite materials to create aerospace composite structures potentially allows for portions of an aircraft to be manufactured in larger pieces or sections. For example, a fuselage in an aircraft may be created in cylindrical sections and then assembled to form the fuselage of the aircraft. Other examples include, without limitation, wing sections joined to form a wing or stabilizer sections joined to form a stabilizer.

In manufacturing composite structures, layers of composite material are typically laid up on a tool. The layers may be comprised of fibers in sheets. These sheets may take the form of fabrics, tape, tows, or other suitable forms. In some cases, resin may be infused or pre-impregnated into the sheets. These types of sheets are commonly referred to as prepreg. Prepreg can be manufactured in long sheets that are stored in rolls until the prepreg is used to manufacture composite structures.

Different layers of prepreg may be laid up in different orientations and different numbers of layers may be used depending on the thickness of the composite structure being manufactured. These layers may be laid up by hand or using automated lamination equipment such as a tape laminating machine or a fiber placement system.

After the different layers of composite material have been laid up on the tool, the layers of composite material may be consolidated and cured upon exposure to temperature and pressure, thus forming the final composite structure.

The quality of the final composite structure can be determined using testing, including non-destructive testing. Further, components used to manufacture a composite structure can also be monitored and tested for quality purposes. Maintaining a desired quality for composite components can increase the quality of the final composite structures. For example, prepreg can be inspected to determine whether the thickness is within specified tolerances. The quality testing of composite components, such as prepreg components, can be more time consuming than desired.

Therefore, it would be desirable to have a method and apparatus that take into account at least some of the issues discussed above, as well as other possible issues. For example, it would be desirable to have a method, apparatus, system, and computer program product that overcome a technical problem with quality testing of prepreg components.

SUMMARY

An embodiment of the present disclosure provides an inconsistency detection system comprising a computer system and an inconsistency analyzer located in the computer system. The inconsistency analyzer is configured to detect fiber inconsistencies in sections of fibers input into a composite material manufacturing system in real time during operation of the composite material manufacturing system. The inconsistency analyzer is configured to detect material inconsistencies in an unconsolidated composite material in real time as the unconsolidated composite material is being manufactured by the composite material manufacturing system using the fibers. The inconsistency analyzer is configured to determine whether the material inconsistencies are present in a number of the sections in which the fiber inconsistencies are detected in real time as the unconsolidated composite material is being manufactured by the composite material manufacturing system. The inconsistency analyzer is configured to track the fiber inconsistencies in the number of the sections in which the fibers with fiber inconsistencies resulted in the material inconsistencies in the number of the sections in the unconsolidated composite material.

In another embodiment of the present disclosure, a method detects inconsistencies in an unconsolidated composite material. Fiber inconsistencies are detected in sections of the fibers input into a composite material manufacturing system in real time during operation of the composite material manufacturing system. Material inconsistencies are detected in the unconsolidated composite material in real time as the unconsolidated composite material is being manufactured by the composite material manufacturing system using the fibers. A determination is made as to whether the material inconsistencies are present in a number of the sections in which the fiber inconsistencies are detected in real time as the unconsolidated composite material is being manufactured by the composite material manufacturing system. The fiber inconsistencies in the number of the sections in which the fibers with fiber inconsistencies resulted in the material inconsistencies in the number of the sections in the unconsolidated composite material are tracked.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 is a block diagram of a composite manufacturing environment in accordance with an illustrative embodiment;

DETAILED DESCRIPTION

Figure 1:
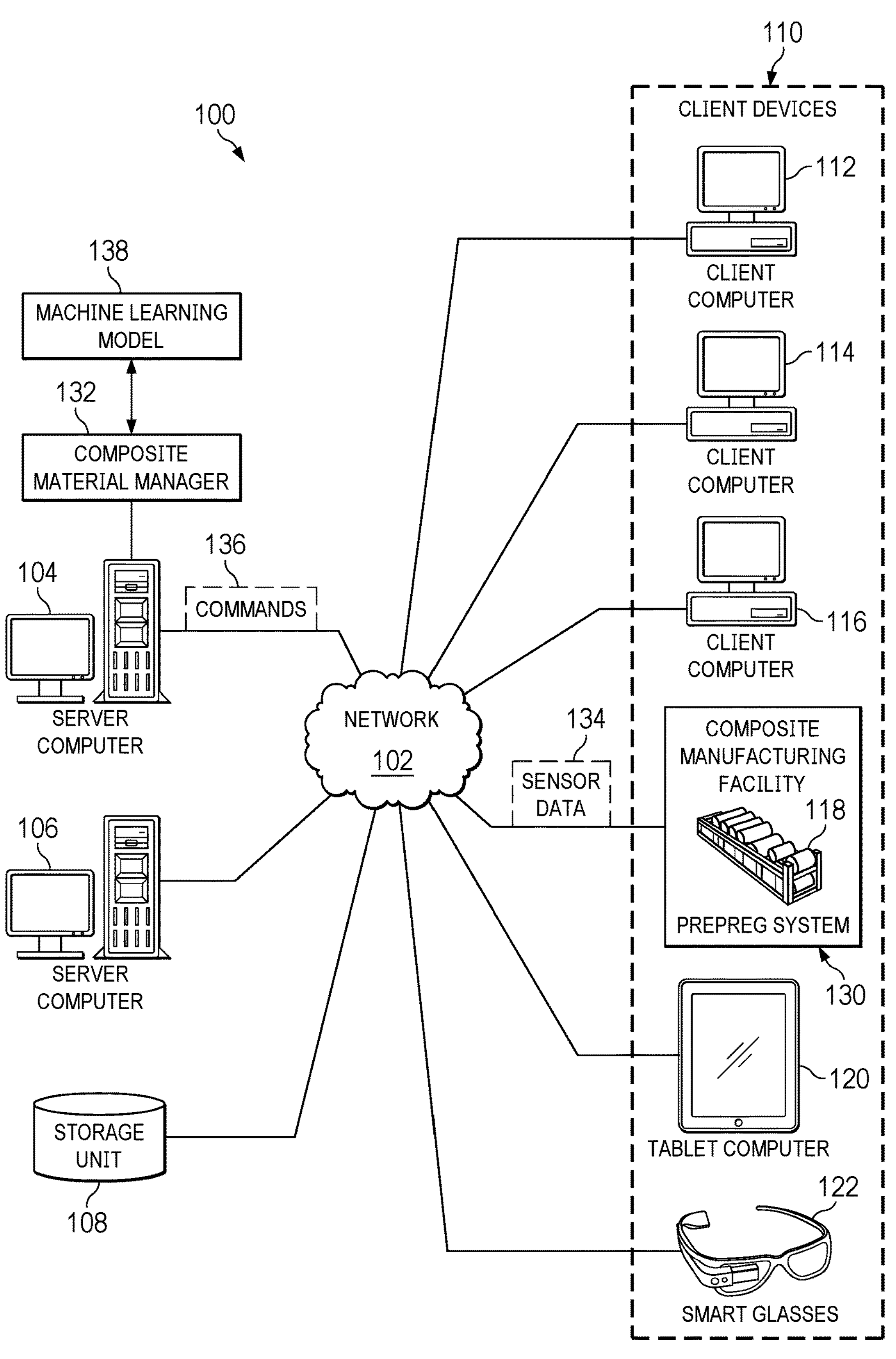
FIG. 1 is a pictorial representation of a network of data processing systems in which illustrative embodiments may be implemented.

The illustrative embodiments recognize and take into account one or more different considerations as described below. For example, current testing of unconsolidated composite components, such as a prepreg roll manufactured by carbon fiber prepreg coating line, can be performed using a sample from the prepreg roll. If the sample does not meet a desired quality level, the entire prepreg roll is discarded or recycled. However, the entire prepreg roll may not have an undesired quality level. Only a portion of the prepreg roll may not meet tolerances for the desired quality level. Current techniques do not enable identifying which portions of the prepreg roll may have properties that are out of tolerance without testing multiple portions of the entire prepreg roll. Testing multiple portions of the entire prepreg roll is time consuming and inefficient.

Also determining the cause for the prepreg roll to have properties with an undesired quality level cannot currently be performed during the manufacturing process. Instead, an analysis is performed after manufacturing the prepreg roll and testing a sample of the prepreg roll indicates the sample does not have the desired quality level. Further, when the cause can be determined, adjustments to the carbon fiber prepreg coating line can be made to ensure future prepreg rolls have a desired quality level. The time needed for the determination may not be possible before more prepreg rolls have been completed and one or more have been determined to not have a desired quality level. As a result, one solution is to halt manufacturing of prepreg rolls using the carbon fiber prepreg coating line that manufactured the prepreg roll until the cause can be determined and adjustments can be made to the carbon fiber prepreg coating line. This unavailability to the carbon fiber prepreg coating line reduces the capacity to manufacture prepreg rolls.

The illustrative embodiments further recognize and take into account that it would be desirable to have an ability to determine the characteristics of prepreg materials. The manufacturing process can be at least one of resin mixing, resin filming, a resin bath operation, or other operations performed to produce prepreg during the manufacturing process while the prepreg is being manufactured. The different types of sensor data obtained from different locations in the carbon fiber prepreg coating line in real time can be used to predict the characteristics of the prepreg while the prepreg is still being manufactured. This information can be used to determine which portions of the prepreg roll have characteristics that are in tolerance and other portions of the prepreg roll that are out of tolerance. This type of determination of characteristics for portions of the prepreg being manufactured can be in real time in a manner that allows marking or recording which portions are in tolerance or out of tolerance. As a result, when some portions of the prepreg roll are out of tolerance, the portions recorded or marked to not be used while the other portion of the prepreg rolls can still be used. As a result, the amount of prepreg discarded or recycled can be reduced.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as prepreg system 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of Things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this example, prepreg system 118 is located in composite manufacturing facility 130. This location manufactures unconsolidated composite materials such as prepreg using prepreg system 118. As depicted, composite material manager 132 at server computer 104 can communicate with prepreg system 118 at composite manufacturing facility 130. This communication can include the exchange of information selected from at least one of sensor data 134, commands 136, or other types of information that can be sent over network 102.

In this example, composite material manager 132 can receive sensor data 134 from a sensor system for prepreg system 118. The sensor system can be located in at least one of prepreg system 118 or another location in composite manufacturing facility 130.

In this illustrative example, sensor data 134 is received in real time from prepreg system 118. In other words, receiving sensor data 134 in real time means that sensor data 134 is received as prepreg system 118 operates to manufacture prepreg. When sensor data 134 is sent in real time, sensor data 134 is sent as quickly as possible without potential delays. In analyzing sensor data 134 in real time, composite material manager 132 can process and analyze sensor data 134 as sensor data 134 is received.

As depicted, sensor data 134 can be analyzed by composite material manager 132 to determine a prediction of properties for the prepreg when manufacturing of the prepreg is completed. This prediction of properties is made while the prepreg is being manufactured by prepreg system 118. The predicted properties are properties for a number of portions of the prepreg being manufactured within prepreg system 118. These properties can include, for example, prepreg thickness, areal weight, and other characteristics of the completed prepreg. In other words, composite material manager 132 can perform real time predicting of characteristics of the prepreg being manufactured by prepreg system 118 before manufacturing of the prepreg has been completed. Based on the predicted properties, composite material manager 132 can identify which of the portions of the prepreg are within a tolerance for use in manufacturing a composite part. Based on the set properties predicted for the prepreg, composite material manager 132 can record one or more portions that are within tolerance as well as portions that may be out of tolerance for use in manufacturing a composite part. Further, composite material manager 132 can determine how long the portions will remain within tolerance. In some cases, the unconsolidated composite material may have a shelf life which may vary depending on the properties predicted for the prepreg.

Additionally, with knowing the predicted properties for a portion of the prepreg, composite material manager 132 performs corrective actions based on the quality level determined for the portion of the unconsolidated composite material from the prediction of the properties of unconsolidated composite materials made prior to manufacturing operations being completed when the portion is completed product in the unconsolidated composite material.

For example, composite material manager 132 can determine what adjustments are needed to prepreg system 118 such that further processing of the portion of the prepreg results in that portion being within tolerance or having a desired quality level. With this determination, composite material manager 132 can send commands 136 to prepreg system 118 to make the adjustments.

Using commands 136, these adjustments can be made by composite material manager 132 while the portion of the prepreg is still being manufactured. These adjustments can be made to portions of prepreg system 118 that have not yet processed the portion of the prepreg. With these adjustments, additional sensor data can be received to determine whether the action performed has changed the portions of the prepreg to have a desired quality level. In this manner, composite material manager 132 can manage the manufacturing of the unconsolidated composite material in a manner that can increase the portions of the unconsolidated composite material that will meet a desired quality level and reduce discarding portions of unconsolidated composite material.

In this illustrative example, this prediction can be made using machine learning model 138. In this example, machine learning model 138 has been trained using historical sensor data generated from previously manufactured by prepreg system 118.

Illustration of network data processing system 100 in FIG. 1 is not meant to limit the manner in which other illustrative examples can be implemented. For example, composite material manager 132 can be located in another location other than in server computer 104. For example, composite material manager 132 can be located at client computer 112, in prepreg system 118, or another computer located at composite manufacturing facility 130. In other illustrative examples, additional prepreg systems may be located at composite manufacturing facility 130 or other locations that can be managed by composite material manager 132.

With reference now to FIG. 2, a block diagram of a composite manufacturing environment is depicted in accordance with an illustrative embodiment. In this illustrative example, composite manufacturing environment 200 includes components that can be implemented in hardware such as the hardware shown in network data processing system 100 in FIG. 1.

In this illustrative example, composite material management system 202 operates to manage the manufacturing of unconsolidated composite material 204 for use in manufacturing composite part 205.

Unconsolidated composite material 204 is a composite material that has not been processed to form composite part 205. For example, processing such as at least one of pressure, heating, or curing has not been applied to unconsolidated composite material 204. In other words, unconsolidated composite material 204 has not been processed in a manner that forms the final composite part.

Unconsolidated composite material 204 can be selected from at least one of a prepreg, an aerospace-grade prepreg, a thermoset prepreg, a thermoplastic prepreg, a woven fabric prepreg, a fiber tow prepreg, a tow prepreg, unidirectional tape prepreg, a resin coated film, non-crimp fabric, a resin mix, or other suitable unconsolidated composite materials. Fibers in the unconsolidated composite material 204 can take a number of different forms. For example, unconsolidated composite material 204 such as fibers and fabric can be selected from at least one of glass fibers, carbon fibers, Kevlar fibers, para-aramid fibers, hybrid fibers, carbon fabric with a glass yarn, carbon fiber fabric with an interwoven wire, boron silicate fibers, or other suitable type of materials. Composite part 205 can be, for example, a fuselage section, a skin panel, a wing, a rib, a door, or other suitable types of parts.

In another example, unconsolidated composite material 204 can be used to manufacture another unconsolidated composite material. For example, unconsolidated composite material 204 can be a filmed paper. This filmed paper can be used to manufacture another unconsolidated composite material such as prepreg.

For example, composite material management system 202 can control the operation of composite material manufacturing system 208 to manufacture unconsolidated composite material 204. As depicted, composite material manufacturing system 208 can take a number of forms. For example, composite material manufacturing system 208 can be selected from at least one of a carbon fiber prepreg coating line, a reinforcing fiber resin impregnation line, a resin mix process system, a resin filming line, a prepreg system, a slitting process system, and other suitable types of composite material manufacturing systems.

As depicted, composite material management system 202 comprises computer system 210 and composite material manager 212. Composite material manager 212 is located in computer system 210.

Composite material manager 212 can be implemented in software, hardware, firmware or a combination thereof. When software is used, the operations performed by composite material manager 212 can be implemented in program instructions configured to run on hardware, such as a processor unit. When firmware is used, the operations performed by composite material manager 212 can be implemented in program instructions and data and stored in persistent memory to run on a processor unit. When hardware is employed, the hardware can include circuits that operate to perform the operations in composite material manager 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. When more than one data processing system is present in computer system 210, those data processing systems are in communication with each other using a communications medium. The communications medium can be a network. The data processing systems can be selected from at least one of a computer, a server computer, a tablet computer, or some other suitable data processing system.

As depicted, computer system 210 includes a number of processor units 214 that are capable of executing program instructions 216 implementing processes in the illustrative examples. As used herein a processor unit in the number of processor units 214 is a hardware device and is comprised of hardware circuits such as those on an integrated circuit that respond and process instructions and program code that operate a computer. When a number of processor units 214 execute program instructions 216 for a process, the number of processor units 214 is one or more processor units that can be on the same computer or on different computers. In other words, the process can be distributed between processor units on the same or different computers in a computer system. Further, the number of processor units 214 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, composite material manager 212 is configured to receive sensor data 218 from sensor system 220 for composite material manufacturing system 208. Sensor data 218 can take a number of different forms. For example, sensor data 218 can be comprised from at least one of a component temperature, an unconsolidated composite material temperature, an ambient temperature, a humidity, a roller speed, a speed of the unconsolidated composite material, a pressure between a pair of rollers, a gap between the pair of rollers, an unconsolidated composite material thickness, a Fourier transform infrared (FTIR) spectra, Raman spectroscopy data, spectroscopy data, a material width, a fiber web width, a material areal weight, a fiber areal weight, a resin viscosity, an electrical measurement across a dimension of the unconsolidated composite material, a voltage across the dimension of the unconsolidated composite material, an electromagnetic measurement across the dimension of the unconsolidated composite material, an acoustic measurement across the dimension of the unconsolidated composite material, a tension, or an image of a prepreg at a location in the composite material manufacturing system.

In this illustrative example, sensor system 220 for composite material manufacturing system 208 can be considered part of composite material management system 202, composite material manufacturing system 208, or both. Sensor system 220 can operate to generate sensor data 218 about at least one of unconsolidated composite material 204 or composite material manufacturing system 208 during the operation of composite material manufacturing system 208. Sensor data 218 can be information about unconsolidated composite material 204 being manufactured by composite material manufacturing system 208. Sensor data 218 is received during manufacturing of unconsolidated composite material 204 by composite material manufacturing system 208. Sensor data 218 is generated by sensor system 220 in real time and is sent to composite material manager 212 in real time.

Sensor system 220 comprises sensors 222. As depicted, sensors 222 are in locations 209 relative to composite material manufacturing system 208. Locations 209 can be on, in, or proximate to composite material manufacturing system 208. In this example, sensors 222 can be selected from at least one of a temperature sensor, a camera, infrared camera, a thermal camera, line scan camera, a tension sensor, a density sensor, a drop gauge, an infrared sensor, a noncontact laser distance sensor, a beta gauge, a speed sensor, a Fourier transform infrared (FTIR) spectrometer, Raman spectrometer, a force detector, a linear variable differential transformer (LVDT) sensor, a rotary third differential transformer (RVDT) sensor, a thickness sensor, a gap width sensor, a viscometer, a light reflecting sensor, an electrical conductivity sensor, an electrical resistance sensor, a capacitance sensor, an electromagnetic sensor, an acoustic sensor, a humidity sensor, a laser Doppler sensor, or other suitable sensors.

As depicted, composite material manager 212 determines a set of predicted properties 224 for a number of portions 226 of unconsolidated composite material 204 as completed from manufacturing by composite material manufacturing system 208 using sensor data 218.

The number of portions 226 of unconsolidated composite material 204 can be a part or all of portions 226 of unconsolidated composite material 204. In this depicted example, unconsolidated composite material 204 as completed from manufacturing by composite material manufacturing system 208 forms completed product 255, which can be used to manufacture composite part 205. The number of portions 226 can be sections of unconsolidated composite material 204. For example, the number of portions 226 can be pieces or sections of prepreg that form a prepreg roll. These portions can have the same or different lengths.

In this example, composite material manager 212 can predict a set of properties 228 that portions 226 of unconsolidated composite material 204 will have when manufacturing of unconsolidated composite material 204 is complete. In other words, this prediction is made while portions 226 of unconsolidated composite material 204 is still being manufactured. Different portions in portions 226 can be in different states or stages of manufacturing in composite material manufacturing system 208.

The set of properties 228 can take a number of different forms. For example, the set of properties 228 comprises at least one of a prepreg fiber areal weight, prepreg resin content, prepreg thickness, prepreg infiltration level, a prepreg tack level, resin film areal weight, resin film thickness, release liner areal weight, release liner thickness, or a laminate structural property.

Composite material manager 212 identifies quality level 230 for the number of portions 226 of unconsolidated composite material 204 based on the set of predicted properties 224 for the number of portions 226 of unconsolidated composite material 204. This identification of quality level 230 is predicted quality level 232. In other words, quality level 230 is determined using predicted properties 224. Actual testing of the number of portions 226 can be performed to determine actual properties for determining the actual quality level.

In this illustrative example, the determination of the set of predicted properties 224 can be made by composite material manager 212 using a set of models 233. The set of models 233 can include at least one of a set of machine learning models 234, a set of physics models 235, a set of hybrid models 237, or other suitable type of models. In this illustrative example, any combination of models 233 can be used to predict properties 228.

When a set of machine learning models 234 are used, the set of machine learning models 234 can be trained to predict properties 228 for a particular type of unconsolidated composite material 204 using sensor data 218. A machine learning model is a type of artificial intelligence model and is a data driven model that can learn without being explicitly programmed. A machine learning model can learn based on training data input into the machine learning model. The machine learning model can learn using various types of machine learning algorithms. The machine learning algorithms include at least one of a supervised learning, and unsupervised learning, a feature learning, a sparse dictionary learning, an anomaly detection, a reinforcement learning, a recommendation learning, or other types of learning algorithms.

Examples of machine learning models include an artificial neural network, a decision tree, a support vector machine, a random forest machine learning model, a regression machine learning model, a classification machine learning model, a Bayesian network, and other types of models. These machine learning models can be trained using data and process additional data to provide a desired output.

For example, machine learning model 236 can be trained to determine predicted properties 224 for unconsolidated composite material 204 such as prepreg using training dataset 240. Training dataset 240 can be created using historical sensor data 242 received from composite material manufacturing system 208 for manufacturing unconsolidated composite material 204 in the form of a prepreg. Training dataset 240 can include labels in the form of historical properties 244. Historical properties 244 can be determined from measurements made of unconsolidated composite material 204 at different locations in composite material manufacturing system 208. In other words, historical properties 244 can include properties 228 of unconsolidated composite material 204 when manufacturing of unconsolidated composite material 204 has been completed.

Additionally, training dataset 240 can also include historical upstream information 245. Historical upstream information 245 can be associated with historical sensor data 242 generated when manufacturing an unconsolidated composite material in which the manufacturing process includes historical upstream information. Historical upstream information 245 can include information about components or settings used in manufacturing unconsolidated composite materials. For example, historical upstream information 245 can be selected from at least one of reinforcement information, fiber information, reinforcement sizing information, resin information, release liner information, resin film information, or other suitable information that may be measured to generate historical sensor data 242.

Properties 228 of interest can take a number of different forms depending on the type of unconsolidated composite material 204. For example, when unconsolidated composite material 204 is a prepreg, properties 228 can include at least one of thickness, fiber areal weight (FAW), resin weight content (RC), prepreg areal weight (PAW), water pickup, tack, pucker, or other properties of interest for unconsolidated composite material 204 in the form prepreg.

With the use of machine learning model 236 to determine predicted properties 224, composite material manager 212 can predict these properties prior to completing manufacturing of unconsolidated composite material 204. In other words, predicted properties 224 for unconsolidated composite material 204 in a completed or manufactured state can be made during different locations in different times during the manufacturing of unconsolidated composite material 204.

In another example, a set of physics models 235 can be used to determine predicted properties 224 for unconsolidated composite material 204. In this example, physics model 239 in the set of physics models 235 is a mathematical model that contains equations that can describe the effects of actions performed on materials to manufacture unconsolidated composite material based on at least mathematical equations. These actions can be, for example, in response to parameters such as heat, tension, pressure, force, or other parameters in sensor data 218.

The set of physics models 235 can take a number of different forms. For example, the set of physics models can be selected from at least one of a machine dynamics thermal and mechanical model, a resin infiltration model, a Darcy infiltration model including viscosity, a resin flow model, a cure kinetics model, a finite element analysis (FEA) model of infiltration, a finite element analysis (FEA) model of layup and other suitable types of physics based models.

The set of hybrid models 237 are hybrid physics based and data driven models that use both physics components and machine learning components. In this example, hybrid models 237 combines physics (real time software) or measured data along with learned/predicted data into a single model such that the distribution/noise for the sensors embedded in the predictions along with other items being evaluated.

Statistical models 243 can also be present in models 233. Statistical models 243 can be selected from at least one of a Kalman filter, an extended Kalman filter, an unscented Kalman filter, or other suitable statistical models. For example, Kalman filters can be used with noisy data to estimate the property of a system that is being measured to increase the accuracy of the estimate of the property being measured.

When determining predicted properties 224 for a number of portions 226 of unconsolidated composite material 204, composite material manager 212 can determine quality level 230 for the number of portions 226 of unconsolidated composite material 204 using the set of predicted properties 224 determined for the number of portions 226 of unconsolidated composite material 204. In this illustrative example, different portions in portions 226 can have a different quality level from other portions.

With the identification of quality level 230, composite material manager 212 can perform a number of actions 241. Depending on quality level 230 identified for each portion in the number of portions 226, a different action in actions 241 can be performed for that portion.

Further, other information can be used in addition to sensor data 218 for determining predicted properties 224 for the number of portions of unconsolidated composite material 204. For example, upstream information 246 can be used with sensor data 218 by composite material manager 212 to determine predicted properties 224 for the number of portions 226. Upstream information 246 can be selected from at least one of reinforcement information, fiber information, reinforcement sizing information, resin information, release liner information, resin film information, or other suitable information that can be used with sensor data 218 to determine predicted properties 224 for number of portions 226 of unconsolidated composite material 204.

Models 233 can operate as digital twin 203 and can be used by composite material manager 212 to determine predicted properties 224 for a number of portions 226 of unconsolidated composite material 204. As a result, the placement of sensors 222 in sensor system 220 in locations 209 for composite material manufacturing system 208 can provide sensor data 218 used by models 233 for digital twin 203 to predict a number of properties 228 for a number of portions 226 of unconsolidated composite material 204. Using models 233 as digital twin 203 enables real time inspection and certification of a number of portions 226 of unconsolidated composite material 204 that can identify properties 228 of the number of portions 226 of unconsolidated composite material 204 without having to sample the number of portions 226 of unconsolidated composite material 204. If actual testing is desired, the identification of portions 226 of unconsolidated composite material 204 can be tested to verify the predictions if needed.

Further, any combination of different types of models 233 can be used to provide increased accuracy in predicted properties 224. For example, a first set of initial predicted properties 251 can be determined for a portion of unconsolidated composite material 204 from the machine learning model 236 generated using sensor data 218. A second set of initial predicted properties 251 can be determined for the same portion of unconsolidated composite material 204 from physics model 239 generated using sensor data 218. The set of predicted properties 224 for the portion of unconsolidated composite material 204 can be determined from a fusion of the first set of initial predicted properties and the second set of initial predicted properties.

With the determination of the set of predicted properties, composite material manager 212 can determine quality level 230 for a number of portions 226 of unconsolidated composite material 204 using the set of predicted properties 224. Quality level 230 is predicted quality level 232 that the number of portions 226 of unconsolidated composite material 204 is predicted or expected to have when manufacturing of the number of portions 226 has been completed and the number of portions 226 of unconsolidated composite material 204 forms completed product 227.

Composite material manager 212 can perform a number of actions 241 based on quality level 230 predicted for the number of portions 226 of unconsolidated composite material 204. In this example, quality level 230 is determined using the number of predicted properties 224 for the number of portions 226 of unconsolidated composite material 204. For example, the number of actions 241 can include corrective action 291. Composite material manager 212 can perform corrective action 291 based on quality level 230 for a number of portions 226 of unconsolidated composite material 204.

In this depicted example, corrective action 291 can be performed prior to completing manufacturing of the number of portions 226 of unconsolidated composite material 204 to form completed product 227. In the illustrative example, manufacturing of the number of portions 226 of unconsolidated composite material 204 can be completed prior to or after other portions in portions 226 of unconsolidated composite material 204. In other words, number of portions 226 of unconsolidated composite material 204 can be completed product 227 while other portions are not yet completed product 227 and are still being processed within composite material manufacturing system 208.

As a result, increased number of portions 226 of unconsolidated composite material 204 can be used for manufacturing composite part 205 when corrective action 291 is performed. For example, at least one of discarding, reworking, or recycling the number of portions 226 can be avoided by performing corrective action 291 prior to completing manufacturing a number of portions 226 of unconsolidated composite material 204.

Figure 3:
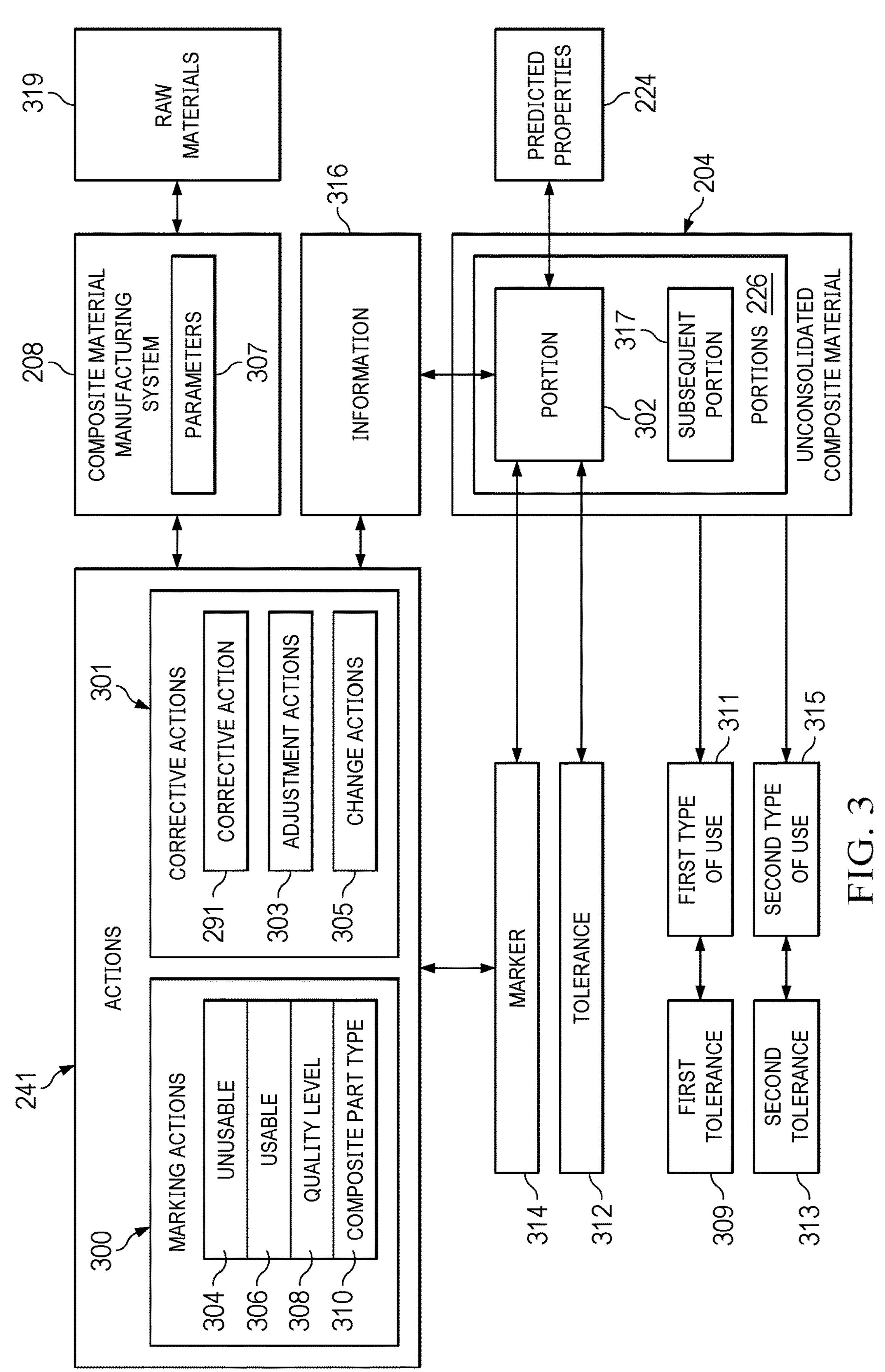
FIG. 3 is an illustration of a block diagram of actions that can be taken using predicted properties for portions of an unconsolidated composite material in accordance with an illustrative embodiment.

With reference next to FIG. 3, an illustration of a block diagram of actions that can be taken using predicted properties for portions of an unconsolidated composite material is depicted in accordance with an illustrative embodiment. In the illustrative examples, the same reference numeral may be used in more than one figure. This reuse of a reference numeral in different figures represents the same element in the different figures.

As depicted, actions 241 can take a number of different forms. For example, actions 241 can be performed for the number of portions 226 of unconsolidated composite material 204 as manufacturing of the number of portions 226 are completed.

Actions 241 can include marking actions 300. As depicted, marking actions 300 can include marking portion 302 of unconsolidated composite material 204 in the number of portions 226 as unusable 304, usable 306, quality level 308, and composite part type 310.

In this example, unusable 304 is an action in which composite material manager 212 marks portion 302 of unconsolidated composite material 204 in the number of portions 226 of unconsolidated composite material 204 as unusable based on quality level 230 for portion 302 being out of tolerance 312. In this example, tolerance 312 can be a range or a threshold for one or more properties 228 of portion 302 that are considered acceptable or tolerable. The property or properties of interest that are in tolerance 312 can be used to determine whether quality level 308 for portion 302 is acceptable.

As depicted, usable 306 is an action in which composite material manager 212 marks portion 302 of unconsolidated composite material 204 in the number of portions 226 of unconsolidated composite material 204 as usable based on quality level 230 for portion 302 being in tolerance 312. Quality level 308 is an action in which composite material manager 212 marks portion 302 of unconsolidated composite material 204 in the number of portions 226 of unconsolidated composite material 204 with the quality level identified for portion 302.

As another example, composite part type is an action in which composite material manager 212 marks portion 302 of unconsolidated composite material 204 in the number of portions 226 of unconsolidated composite material 204 with an identification of the type of composite part that portion 302 can be used to manufacture. For example, the quality level may be such that the portion 302 is unsuitable for use for the intended type of composite part. However, the quality level may be such that portion 302 can be used to manufacture another type of composite part. As a result, portion 302 can still be used rather than discarded or recycled.

Figure 26:
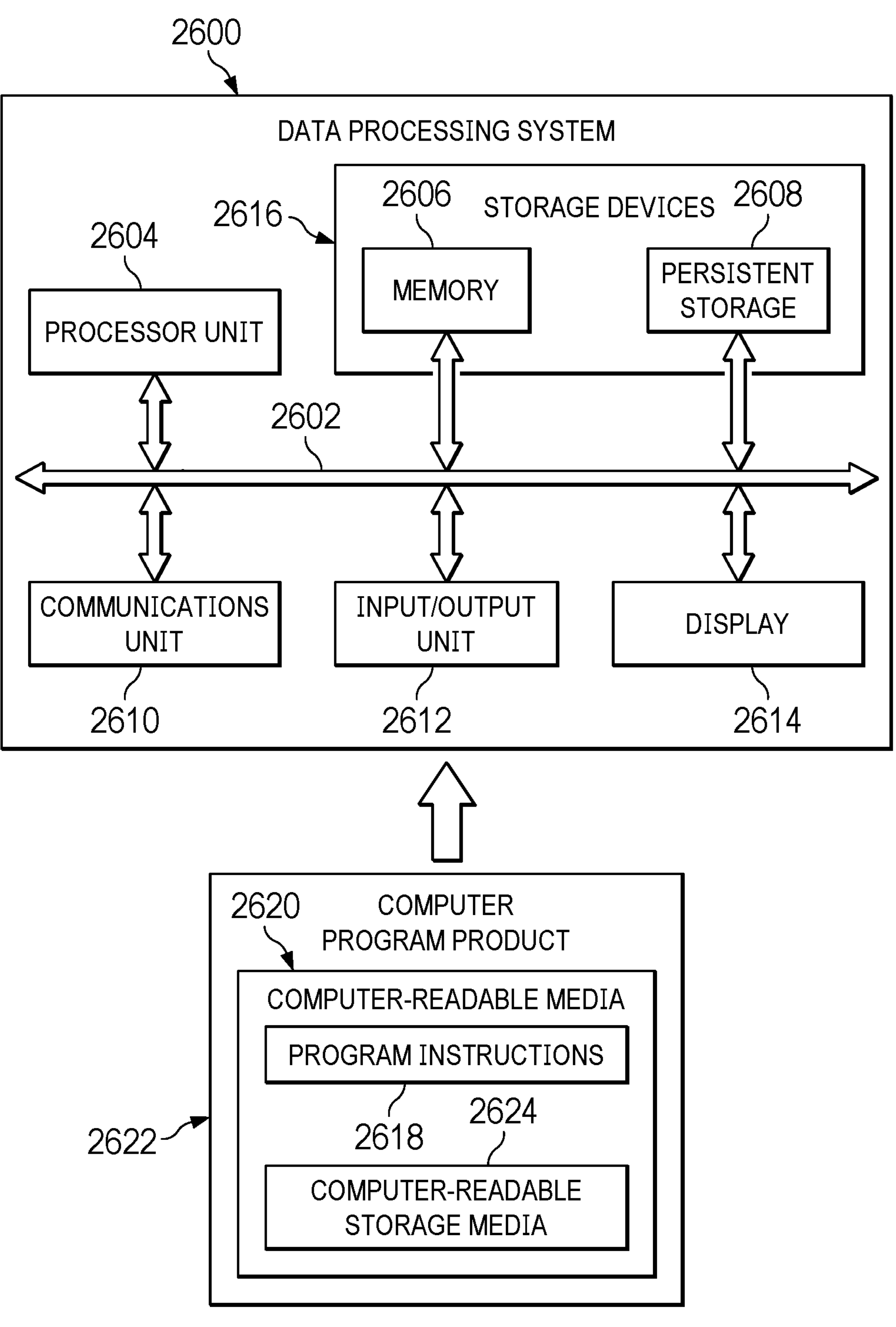
FIG. 26 is an illustration of a block diagram of a data processing system in accordance with an illustrative embodiment.

The identification of these actions can be marked on portion 302 using marker 314. Marker 314 can be an identifier such as a radiofrequency (RFID) identifier, a microdot, a set of quantum dots, an ink mark, a barcode, a quick response (QR) code, or some other suitable type of marker. Marker 314 can identify the action. Marking actions 300 can also include recording information 316 about portion 302 using marker 314. For example, the information can include the length of portion 302, location of portion 302 in unconsolidated composite material 204, quality level, predicted properties 224, shelf life, or other information about portion 302. Information 316 can be determined from predicted properties 224 for portion 302. Marker 314 and marking actions 300 also include recording the position on the roll or recording information 316 about portion 302 in a memory 2606 as shown in FIG. 26 for later correlation of quality of portion 302 to a position on a roll. One example of this use is to print out position information that designates the quality on the roll at specific positions on the roll. In other words, marking can include at least one of indicating or recording information in a record or log about the quality in addition to or in place of actually marking portion 302 itself. As a result, the result of marking can also be a printout or a thumb drive that accompanies each roll with the "marking".

In this illustrative example, actions 241 can also include corrective actions 301. Corrective actions 301 are actions 241 that can be performed on a number of portions 226 including portion 302. In this illustrative example, corrective action 291 in the set of corrective actions 301 can be performed by composite material manager 212 in response to the set of predicted properties 224 for the number of portions 226 being out of tolerance 312 specified for unconsolidated composite material 204.

These corrective actions can be performed in an effort to change the set of predicted properties 224 for the number of portions 226 such that the set of predicted properties 224 are within a tolerance 312 for the number of portions 226 when manufacturing of the number of portions 226 of unconsolidated composite material 204 as completed to form completed product 227.

As depicted, corrective actions 301 can take a number of different forms. For example, corrective actions 301 can include at least one of adjustment actions 303, change actions 305, or some other suitable corrective actions.

For example, when corrective action 291 in corrective actions 301 takes the form of adjustment actions 303, composite material manager 212 can adjust a set of parameters 307 in the composite material manufacturing system 208 to change the set of predicted properties for the number of portions of the unconsolidated composite material in response to the set of predicted properties 224 for number of portions 226 being out of tolerance 312 specified for unconsolidated composite material 204.

In this depicted example, set of parameters for composite material manufacturing system 208 can take a number of different forms. For example, the set of parameters 307 can be selected from at least one of a speed, a torque, a voltage, a current, a gap, a nip gap, a force, a tension, a thickness at a location, a pressure or other suitable parameters that can be set in composite material manufacturing system 208.

For example, corrective action 291 can be adjusting a set of parameters 307 in composite material manufacturing system 208. Adjustment of the set of parameters 307 can be such that the set of predicted properties 224 for the number of portions 226 of unconsolidated composite material 204 is within tolerance 312 for the unconsolidated composite material 204.

In yet another example, adjustments may not make the set of predicted properties 224 fall within tolerance 312 for the number of portions 226 of unconsolidated composite material 204 to meet tolerance 312 for the specified use for unconsolidated composite material 204. In this depicted example, the set of predicted properties 224 for the number of portions 226 of unconsolidated composite material 204 is outside of first tolerance 309 for a first type of use 311 of unconsolidated composite material 204.

In this case, performing corrective action 291 based on quality level 230 for the number of portions 226 of unconsolidated composite material 204 comprises adjusting a set of parameters 307 in composite material manufacturing system 208 such that the set of predicted properties 224 for the number of portions 226 of unconsolidated composite material 204 is within second tolerance 313 for second type of use 315 of unconsolidated composite material 204.

For example, first type of use 311 can be for using unconsolidated composite material 204 in a skin panel. Second type of use 315 can be for using unconsolidated composite material 204 in a monument within an aircraft.

This type of corrective action 291 can also be performed to create some portions of unconsolidated composite material 204 for second type of use 315 instead of first type of use 311. In other words, this action can also be performed even when a set of predicted properties 224 is within tolerance 312. As a result, when the need arises for unconsolidated composite material 204 for second type of use 315, some of unconsolidated composite material 204 manufactured for first type of use 311 can be diverted for second type of use 315.

In another illustrative example, corrective action 291 can comprise adjusting a set of parameters 307 in composite material manufacturing system 208 such that the set of predicted properties 224 for subsequent portion 317 to the number of portions 226 of unconsolidated composite material 204 is within second tolerance 313 for unconsolidated composite material 204 in response to the set of predicted properties 224 for the number of portions 226 being out of tolerance 312 specified for unconsolidated composite material 204. This type of corrective action can be performed when changing parameters 307 will not cause the number of portions 226 of unconsolidated composite material 204 to have a set of predicted properties 224 that fall within tolerance 312. However, this corrective action can be used to cause later portions of unconsolidated composite material 204 to have a set of predicted properties 224 that fall within tolerance 312. As a result, a marking action is still performed for the number of portions 226 in this example.

In another illustrative example, corrective action 291 can be a change action in change actions 305. For example, corrective action 291 can change a number of raw materials 319 used to form unconsolidated composite material 204. The change in the number of raw materials 319 is such that the set of predicted properties 224 for subsequent portions can be the number of portions 226 of unconsolidated composite material 204 that is within tolerance 312 for unconsolidated composite material 204 in response to the set of predicted properties 224 for the number of portions 226 being out of tolerance 312 specified for the unconsolidated composite material 204.

With this illustrative example, a raw material in raw materials 319 can be any material that is used by composite material manufacturing system 208 to manufacture unconsolidated composite material 204. For example, the number of raw materials 319 can be selected from at least one of a resin, a paper, a film, a fabric, a tow, a spread tow fabric, a fiber type, a tow size, a fiber size, or other material used to manufacture unconsolidated composite material 204.

In some illustrative examples, multiple corrective actions can be taken. For example, both an adjustment action and a change action can be performed.

In one illustrative example, one or more solutions are present that overcome a problem with an inability to determine properties of unconsolidated composite materials as quickly as desired. One or more illustrative examples can enable predicting properties of different portions of unconsolidated composite materials before manufacturing of those portions have been completed. With this type of prediction, action such as marking different portions or performing other actions may be made more quickly than testing samples after manufacturing of the unconsolidated composite materials has been completed.

Computer system 210 can be configured to perform at least one of the steps, operations, or actions described in the different illustrative examples using software, hardware, firmware or a combination thereof. As a result, computer system 210 operates as a special purpose computer system in which composite material manager 212 in computer system 210 enables predicting properties of an unconsolidated composite material during manufacturing of the unconsolidated composite material before the manufacturing of unconsolidated composite material has completed. The use of real time data about the unconsolidated composite material during manufacturing of the unconsolidated composite material enables determining predicted properties for the unconsolidated composite material during manufacturing of the unconsolidated composite material. Further, using a machine learning model enables determining predicted properties of the unconsolidated composite material before manufacturing of the unconsolidated composite material has been completed. In other words, determination of the predicted properties does not require sampling and testing the unconsolidated composite material after manufacturing of unconsolidated composite material has been completed. Further this determination cannot be performed by a human operator quickly enough to obtain the prediction of the properties for the unconsolidated composite material before manufacturing of unconsolidated composite material has been completed.

In particular, composite material manager 212 transforms computer system 210 into a special purpose computer system as compared to currently available general computer systems that do not have composite material manager 212.

In the illustrative example, the use of composite material manager 212 in computer system 210 integrates processes into a practical application for manufacturing an unconsolidated composite material that increases the performance of computer system 210 in predicting properties 228 for portions 226 of unconsolidated composite material 204. In other words, composite material manager 212 in computer system 210 is directed to a practical application of processes integrated into composite material manager 212 in computer system 210 that generate predictions of properties 228 for unconsolidated composite material 204 in real time such that actions 241 can be taken more quickly with respect to unconsolidated composite material 204. This process using composite material manager 212 to generate predicted properties 224 using models 233 from sensor data 218 received in real time can be performed in real time to obtain predicted properties 224 before manufacturing unconsolidated composite material 204 is complete, which is not possible with human operators analyzing sensor data 218 by hand.

In this illustrative example, composite material manager 212 in computer system 210 enables predicting properties for unconsolidated composite material such as prepreg or resin coated film, before completing manufacturing of the unconsolidated composite material. As a result, actions can be performed on the portions as the manufacturing of those portions are being completed.

For example, the different portions of the unconsolidated composite material can be marked as different portions are completed to indicate suitability or quality of those portions of the unconsolidated composite material. Composite material manager 212 provides a practical application of managing unconsolidated composite materials as the unconsolidated composite materials are manufactured using sensor data 218 obtained from different locations in locations 209 for composite material manufacturing system 208. Predicted properties 224 can be used to mark portions 226 of unconsolidated composite material 204. The marking can be performed based on predicted quality level 232 using predicted properties 224.

This type of management is in contrast to current techniques that may take a sample of a prepreg material in a role to determine the quality of the entire roll. Composite material manager 212 provides an improvement in which this determination can be made for different portions of the prepreg roll and can be performed as the prepreg roll is being manufactured. As a result, the reduction in amount of time needed to manufacture unconsolidated composite materials is realized using composite material manager 212 to predict quality level portions of unconsolidated composite material.

Figure 4:
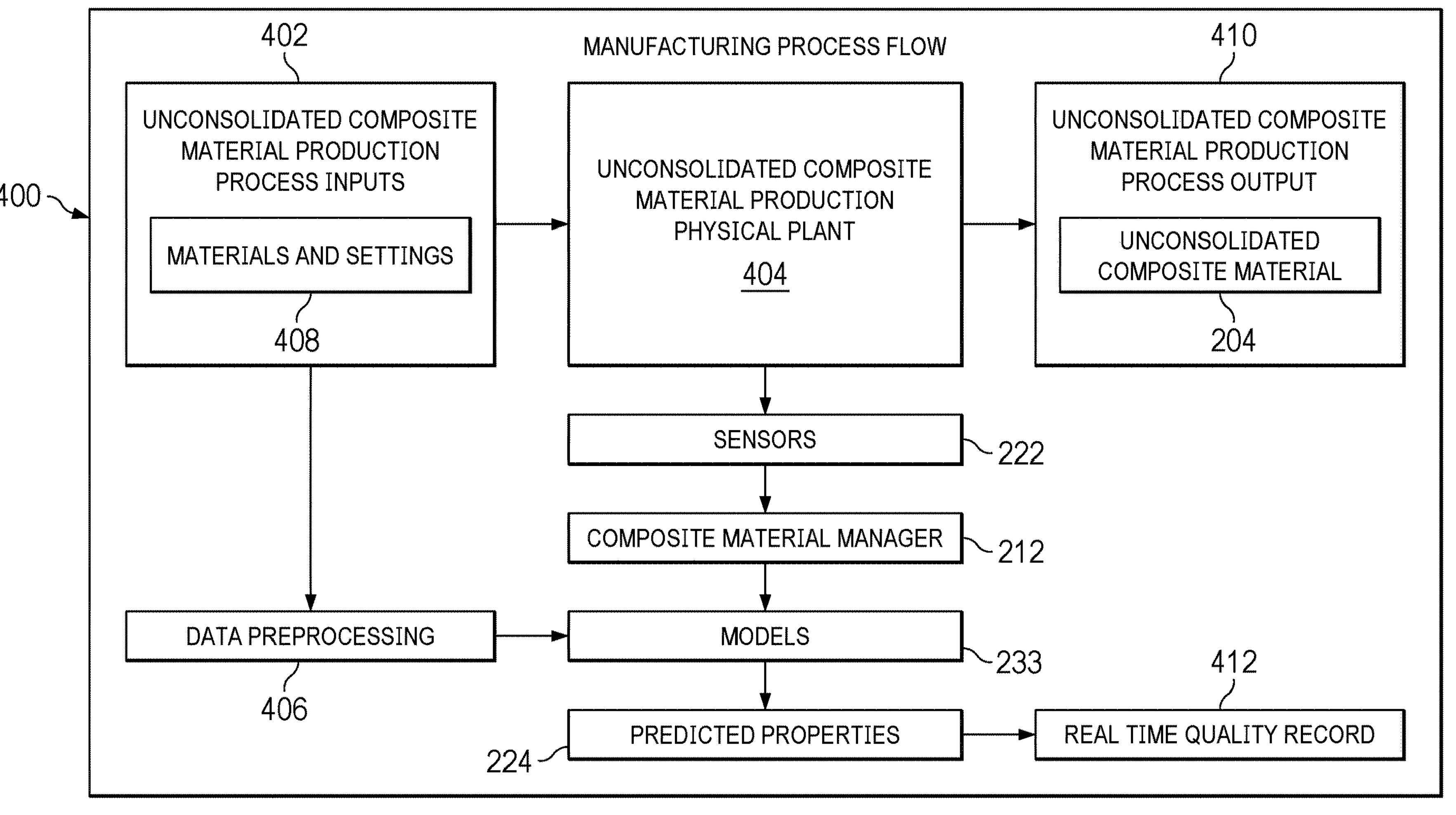
FIG. 4 is an illustration of a manufacturing process flow for manufacturing unconsolidated composite materials in accordance with an illustrative embodiment.

With reference next to FIG. 4, an illustration of a manufacturing process flow for manufacturing unconsolidated composite materials is depicted in accordance with an illustrative embodiment. In this example, manufacturing process flow 400 begins with unconsolidated composite material production process inputs 402 being made to unconsolidated composite material production physical plant 404 and to data preprocessing 406. These inputs in unconsolidated composite material production process inputs 402 include materials and settings 408. In this example, materials and settings 408 are information that identify materials to be used in manufacturing unconsolidated composite material 204. When unconsolidated composite material 204 is prepreg, the materials can be for example, fiber type, fiber size, resin film specifications, reinforcement information, fiber information, reinforcement sizing information, resin information, release liner information, resin film information, or other suitable information about materials used to manufacture the prepreg.

The settings can be information such as temperature, pressure, tension, and other information that can be used for settings or to configure a composite material manufacturing system in unconsolidated composite material production physical plant 404 to manufacture the prepreg. Materials and settings 408 can be part of upstream information 246.

With materials and settings 408 as an input, unconsolidated composite material production physical plant 404 can perform manufacturing operations to generate unconsolidated composite material production process output 410 in the form of unconsolidated composite material 204. These operations can be performed using equipment such as composite material manufacturing systems in the plant. In this example, portions of unconsolidated composite material 204 can be output as unconsolidated composite material production process output 410 as manufacturing of portions of unconsolidated composite material 204 are completed.

Data preprocessing 406 can be a component located in computer system 210 that processes unconsolidated composite material production process inputs 402 for use by a number of models 233 to determine predicted properties 224. For example, data preprocessing 406 can process materials and settings 408 to form upstream information 246 that is input into the number of models 233.

Sensors 222 monitors the manufacturing of unconsolidated composite material 204 in real time as unconsolidated composite material 204 is being manufactured and sends sensor data to composite material manager 212 in real time as unconsolidated composite material 204 is being manufactured. Composite material manager 212 acquires sensor data from sensors 222 and sends that sensor data into a number of models 233.

In this example, the sensor data can be sent to a single model in models 233 or multiple models in models 233. When the number of models 233 is a single model, the model can be a machine learning model. When the number of models 233 is multiple models, those models can be, for example, two machine learning models, a machine learning model and a physics model, or some combination of models. When more than one model in models 233 is used, the outputs of those models can be compared to identify a best prediction for predicted properties 224 or combined or fused to form predicted properties 224.

Models 233 generate predicted properties 224. This prediction is made in real time prior to the completion of manufacturing of unconsolidated composite material 204. For example, predicted properties 224 can be for a portion of unconsolidated composite material 204 for which manufacturing has not been completed. In other words, predicted properties 224 can be determined for the portion of unconsolidated composite material 204 prior to that portion being output as a completed product. The completed product can be used to manufacture composite part 205.

In this example, predicted properties 224 can be used to perform an action in actions 241 in the form of real time quality record 412. This record can be used to track portions of unconsolidated composite material 204 for performing additional manufacturing operations to manufacture other unconsolidated composite materials or composite parts.

The illustration of composite manufacturing environment 200 in FIGS. 2-4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, composite material manager 212 can be used to predict properties of one or more unconsolidated composite materials in addition to unconsolidated composite material 204. These other unconsolidated composite materials can be manufactured using other composite material manufacturing systems in addition to composite material manufacturing system 208. Further, the additional unconsolidated composite materials manufactured using composite material manufacturing systems can be different types of unconsolidated composite materials manufactured using different types of composite material manufacturing systems.

Figure 5:
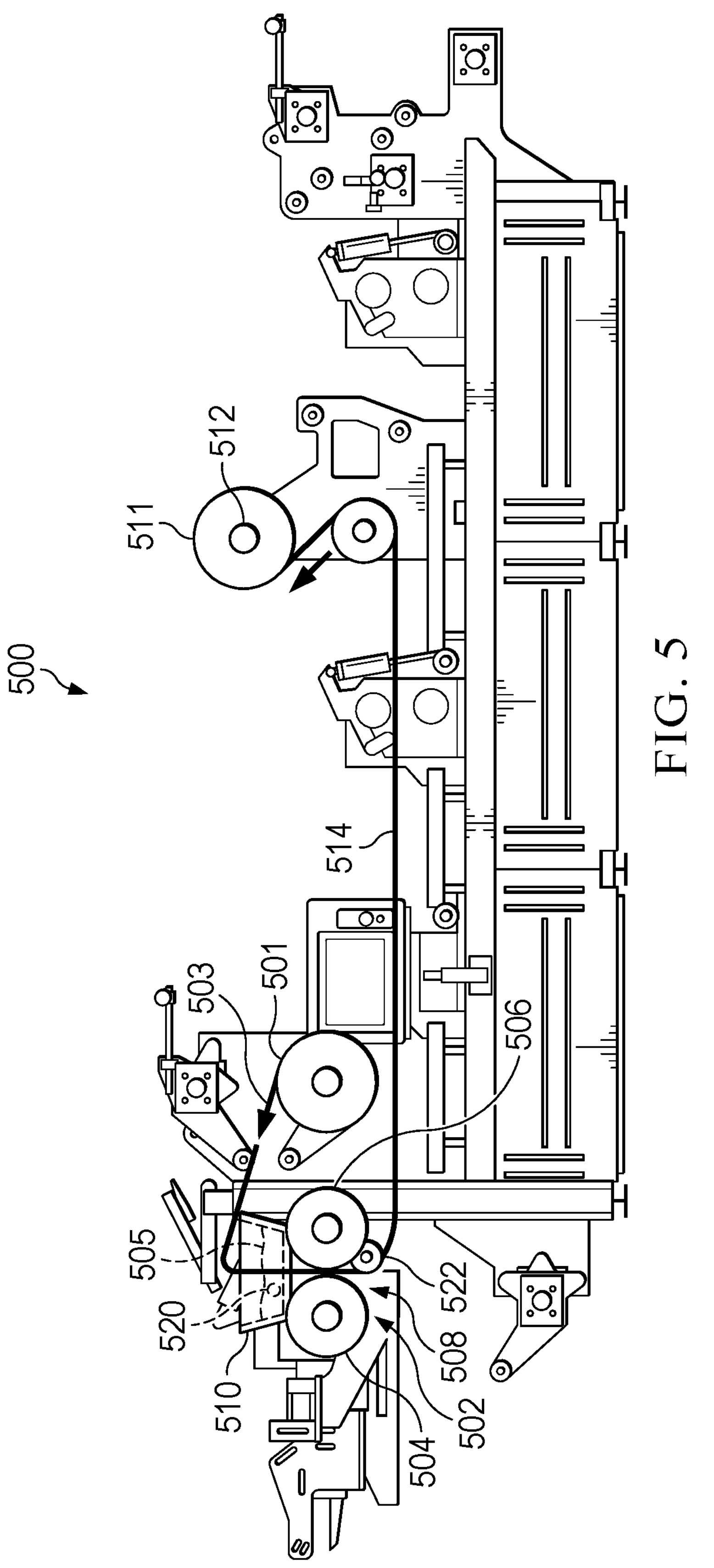
FIG. 5 is an illustration of a composite material manufacturing system configured for performing filming process in accordance with an illustrative embodiment.
Figure 6:
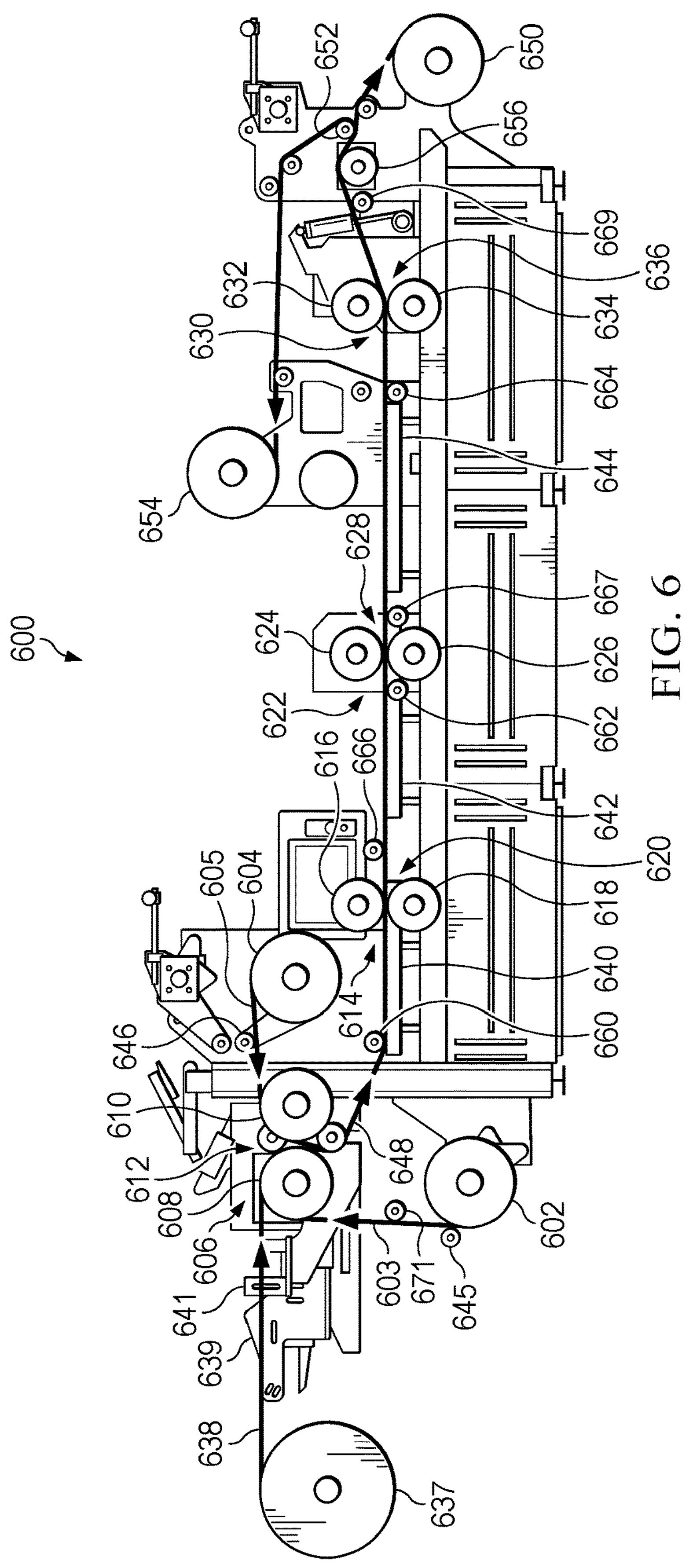
FIG. 6 is an illustration of a composite material manufacturing system configured for performing a prepreg production process in accordance with an illustrative embodiment.

FIG. 5 and FIG. 6 are examples of composite material manufacturing systems that can be used to implement composite material manufacturing system 208 in FIG. 2. A sensor system can be added to these composite material manufacturing systems or existing sensor systems can be augmented to include one or more sensors in configurations that can generate the sensor data needed to predict properties for unconsolidated composite materials as the unconsolidated composite materials are being manufactured by these composite material manufacturing systems.

With reference now to FIG. 5, an illustration of a composite material manufacturing system configured for performing a filming process is depicted in accordance with an illustrative embodiment. Composite material manufacturing system 500 is shown in block form in FIG. 2.

As depicted, composite material manufacturing system 500 is configured to perform a filming process in which resin is coated onto film paper.

In this example, unfilmed paper roll 501 feeds paper 503 into nip 502. A nip comprises a pair of rollers with a gap set between the rollers. As depicted, nip 502 comprises roller 504 and roller 506 with gap 508 between roller 504 and roller 506. The gap can be fixed or changed to provide constant pressure.

Resin 505 is heated and located in resin dams 510 that sit on roller 504 and roller 506. Resin dams 510 feeds resin 505 into gap 508 while paper 503 is pulled through gap 508 and onto filmed paper roll 511 by paper rewinder 512. Paper 503 becomes filmed paper 514 as resin 505 from resin dams 510 coats paper 503 at gap 508. Filmed paper 514 is collected on filmed paper roll 511.

In this illustrative example, the properties of filmed paper 514 can be predicted using sensor data generated by a sensor system for composite material manufacturing system 500. For example, the sensor system can measure tension on paper 503, the speed at which paper 503 moves, a gap width of gap 508, resin viscosity of resin 505 in resin dams 510, basis/areal weight, and other parameters. The gap width of gap 508 and resin viscosity of resin in resin dams 510 can affect how much resin is coated onto paper 503 to form filmed paper 514. Resin viscosity is the thickness of the liquid resin and is typically measured in centipoise (cup).

Resin viscosity of resin 505 in resin dams 510 can be measured using a sensor 520 in resin dams 510. Sensor 520 can be a viscometer. The measurement of resin viscosity with the gap width of gap 508 can be used to predict the thickness of resin 505 on filmed paper 514. As another example, resin viscosity can be determined using dielectric measurements. For example, sensor 520 can apply an oscillatory voltage to resin 505 in resin dams 510 and measure the current. This type of measurement can also be made by sensor 522 located just after gap 508 in which sensor 522 applies an oscillatory voltage and measures current. This measurement can be used to predict the amount of resin that will be present on filmed paper 514 that is collected on filmed paper roll 511.

When creating a training dataset, the sensor data can be labeled with actual measurements of resin on filmed paper 514. For example, the paper from each roll can be premeasured at the beginning at unfilmed paper roll 501 and at the end at filmed paper roll 511. The weights of the two rolls can be subtracted to obtain the weight difference to determine the amount of resin. This measurement provides the overall resin on all of filmed paper 514 and not portions of filmed paper 514. Samples for portions can be taken in which a fixed area of paper is cut out and weighed for different portions. The weight of the paper is known and that weight can be subtracted to measure the weight of the sample to determine the weight of the resin. The difference between the paper and resin can be identified to obtain the amount of resin on the sample.

Turning to FIG. 6, an illustration of a composite material manufacturing system configured for performing a prepreg production process is depicted in accordance with an illustrative embodiment. In this example, composite material manufacturing system 600 is another example of an implementation of composite material manufacturing system 208 shown in block form in FIG. 2. Composite material manufacturing system 600 is configured to manufacture an unconsolidated composite material in the form of prepreg. The prepreg can be manufactured using a hot melt prepregging process or a solvent-based prepreg process.

As depicted, composite material manufacturing system 600 has two filmed rolls, filmed roll 1 602 and filmed roll 2 604. The filmed paper on these rolls is paper with resin. For example, filmed roll 1 602 is a source of filmed paper 603 and filmed roll 2 604 is a source of filmed paper 605. These filmed rolls can be manufactured using composite material manufacturing system 500 in FIG. 5.

In this example, composite material manufacturing system 600 has four nips. Nip1 606 has roller 608 and roller 610 with nip1 gap 612 between these two rollers. Nip2 614 has roller 616 and roller 618 with nip2 gap 620. Nip3 622 has roller 624 and roller 626 with nip3 gap 628. Nip4 630 has roller 632 and roller 634 with nip1 gap 636. In this illustrative example, these nips operate as squeeze points where pressure can be applied to materials traveling through the nips.

As depicted, hotplate 640 and hotplate 642 are present in composite material manufacturing system 600. This system also has cold plate 644.

In this illustrative example, nip1 606, nip2 614, nip3 622, nip4 630, hotplate 640, and hotplate 642 are kept at set temperatures. The temperatures of each of these components can be set separately from other components. In other words, the temperature of nip1 606 can be set to a different temperature from nip2 614.

In this illustrative example, fiber creel 637 is a source of fibers 638. These fibers are fed through comb 639 and onto spreader bars 641 before being moved into nip1 606.

As depicted, filmed paper 603 and filmed paper 605 both move into nip1 606 from filmed roll 1 602 and filmed roll 2 604, respectively. Brake 645 on filmed roll 1 602 maintains tension for filmed paper 603, and brake 646 on filmed roll 2 604 maintain tension for filmed paper 605 such that prepreg 648 does not go slack.

The side of filmed paper 603 and the side of filmed paper 605 having resin faces fibers 638. In this example, the temperature and pressure are applied by nip1 606 to cause the resin to infiltrate from filmed paper 603 and filmed paper 605 into fibers 638 at nip1 606.

For example, the width of nip1 gap 612 in nip1 606 is selected to apply pressure to fibers 638 sandwiched between the resin on filmed paper 603 and filmed paper 605. Further, roller 608 and roller 610 for nip1 606 has a temperature selected to heat fibers 638 and the resin on filmed paper 603 and filmed paper 605. At least one of heat or pressure causes the resin to infiltrate fibers 638 to form prepreg 648 when fibers 638, filmed paper 603, and filmed paper 605 exit nip1 606.

The other nips, nip2 614, nip3 622, and nip4 630, can have nip gaps and roller temperatures set to provide the desired amount of pressure and heating as prepreg 648 travels in composite material manufacturing system 600 to prepreg roll 650. The nip gap and roller temperatures can change the viscosity of the resin and in turn change the speed of the infiltration process. Hotplate 640 is located between nip1 606 and nip2 614, and hotplate 642 is located between nip2 614 and nip3 622. This hotplate heats prepreg 648 as prepreg 648 travels between nips. Cold plate 644 is located after nip3 622 and before nip4 630. This cold plate can lower the temperature of prepreg 648. Cold plate 644 can reduce the temperature which increases the viscosity of the resin to reduce or stop the infiltration process of resin into the fibers.

The width of prepreg 648 can be set by slitters 656 before filmed paper 605 is removed. At roller 652, filmed paper 605 is removed and wound onto paper roll 654. Prepreg 648 is now comprised of fibers 638 infused with resin on filmed paper 603 and wound onto prepreg roll 650.

In this illustrative example, sensors can be located at different locations between points in composite material manufacturing system 600. In this illustrative example, these points can be processing points where actions can be performed to manufacture prepreg 648. These processing points can be, for example, nip1 606, nip2 614, nip3 622, or nip4 630. Other processing points can be hotplate 640, hotplate 642, or cold plate 644 where heat or cold is applied to prepreg 648 to heat or cool prepreg 648.

These processing points can change properties of prepreg 648 as prepreg 648 is manufactured until prepreg 648 is in its final form at prepreg roll 650. Sensors can be located between these points and can be used to predict the properties of prepreg 648 as completed from manufacturing prepreg 648 at prepreg roll 650. In other words, with sensor data from sensors between these processing points, predicted properties can be determined for prepreg 648 at prepreg roll 650 from other locations in composite material manufacturing system 600 prior to prepreg roll 650.

For example, sensor location 660 is located between nip1 606 and nip2 614. As another example, sensor location 662 is located between nip2 614 and nip3 622, and sensor location 664 is located between nip3 622 and hotplate 640. As yet another example, sensor location 666 is located between nip2 614 and hotplate 642. As yet another example, sensor location 667 is located between nip3 622 and cold plate 644.

In this example, another sensor location, sensor location 671, can be located between filmed roll 1 602 and nip1 606. As another example, sensor location 669 is located between nip4 630 and prepreg roll 650. The sensor location is an example of a sensor location that can be used even though the location is not between two processing points. Sensor data about filmed paper 603 can be used in predicting properties of prepreg 648 at prepreg roll 650.

In this example, composite material manufacturing system 600 is a hot-melt film prepreg system. This illustrative prepreg system is not meant to limit the types of prepreg systems that can be used. Other examples can encompass those other types of prepreg systems that utilize bath, slurry, spray, or other mechanism to apply resin to the carrier fibers.

Figure 7:
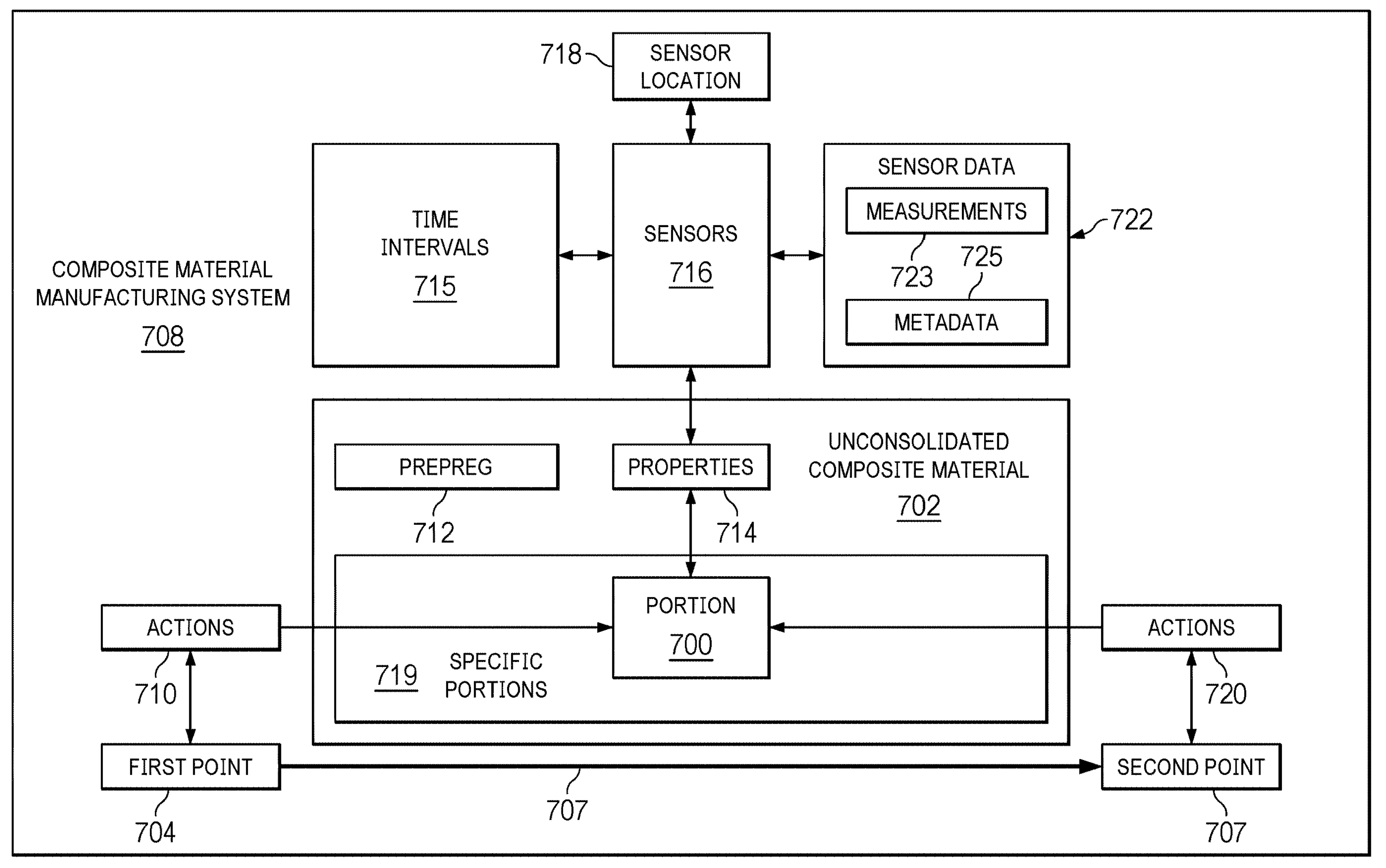
FIG. 7 is an illustration of a block diagram of a sensor location in a composite material manufacturing system in accordance with an illustrative embodiment.

With reference next to FIG. 7, an illustration of a block diagram of a sensor location in a composite material manufacturing system is depicted in accordance with an illustrative embodiment. In this illustrative example, portion 700 of unconsolidated composite material 702 travels from first point 704 to second point 706 in the direction of arrow 707 in composite material manufacturing system 708.

In this illustrative example, a set of actions 710 can be performed on portion 700 of unconsolidated composite material 702 at first point 704 as portion 700 of unconsolidated composite material 702 passes first point 704. The set of actions 710 can be one or more actions performed in manufacturing unconsolidated composite material 702. In this example, the set of actions 710 can be selected from at least one of applying heat, applying pressure, applying a tension, applying a force, applying cold, changing a viscosity, or other suitable action.

For example, when unconsolidated composite material 702 is prepreg 712 and first point 704 is the location component such as a nip having rollers, the set of actions 710 can be to apply pressure and heat to portion 700. The set of actions 710 result in a set of properties 714 being present after first point 704. The set of properties 714 can change from what was present prior to the set of actions 710 being performed on portion 700 at first point 704.

The set of properties 714 for portion 700 can be different from the properties present prior to the set of actions being performed on portion 700 at first point 704. In other words, the set of actions performed at first point 704 can change the set of properties 714 for portion 700 of unconsolidated composite material 702.

The set of properties 714 present after performing the set of actions 710 on portion 700 of unconsolidated composite material 702 can be detected using a set of sensors 716 at sensor location 718. The set of sensors 716 can generate sensor data 722. Sensor data 722 can include measurements 723 and metadata 725. When metadata 725 is present in sensor data 722. Metadata 725 can include, for example, at least one of a timestamp, a sensor location, a sensor identifier, or other suitable information about measurements 723.

When unconsolidated composite material 702 is prepreg 712, the measurements 723 in sensor data 722 can be used to determine the amount of resin present in an area such as portion 700. For example, measurements 723 in sensor data 722 can be aerial weight. The current amount of resin present can be used to predict the amount of resin that will be present before the manufacturing process for portion 700 of unconsolidated composite material 702 is complete.

This sensor data can be used to predict properties 714 that portion 700 of unconsolidated composite material 702 will have when the manufacturing of portion 700 of unconsolidated composite material 702 is completed. The set of sensors 716 can be one or more of sensors 222 in sensor system 220 for composite material manufacturing system 208.

In this illustrative example, sensor location 718 is located after first point 704 and prior to second point 706. Sensor location 718 can be selected to be in a specific position in proximity to first point 704 such that changes in properties 714 caused by the performance of actions 710 at first point 704 can be measured by sensors 716 to generate sensor data 722.

In this example, second point 706 is a location in composite material manufacturing system 708 at which another set of actions 720 can be performed on portion 700 of unconsolidated composite material 702. The set of actions 720 performed at second point 706 can change properties 714.

As a result, the set of sensors 716 at sensor location 718 between first point 704 and second point 706 can measure properties 714 present after the performance of actions 710 on portion 700 at first point 704. This measurement can be made at time intervals 715. For example, a measurement can be made every second. Knowing the speed at which unconsolidated composite material 702 moves, properties for specific portions 719, such as portion 700, can be identified. The set of sensors 716 can generate sensor data 722 from those measurements of the set of properties 714 for use in determining predicted properties for portion 700 of unconsolidated composite material 702 that will be present when the manufacturing of portion 700 of unconsolidated composite material 702 has been completed.

Figure 8:
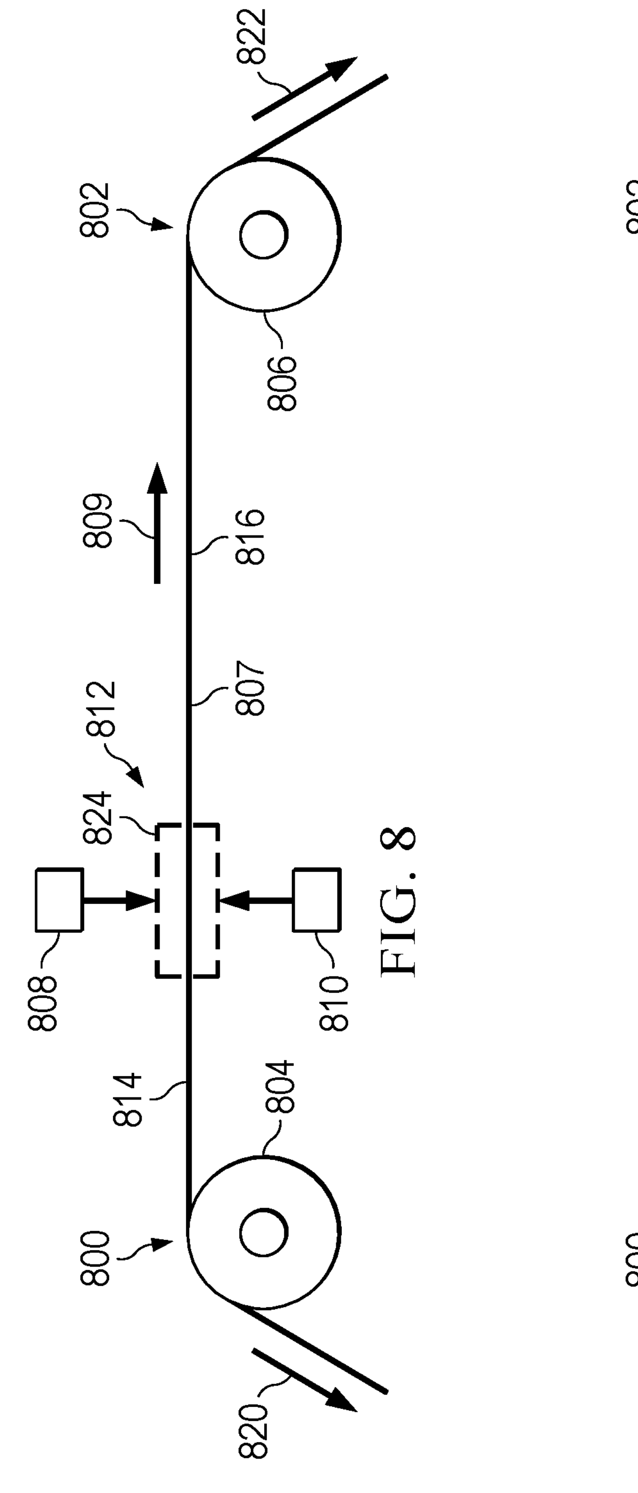
FIG. 8 is an illustration of the side view of a portion of a composite material manufacturing system in accordance with an illustrative embodiment.

With reference now to FIG. 8, an illustration of the side view of a portion of a composite material manufacturing system is depicted in accordance with an illustrative embodiment. In this illustrative example, point 1 800 and point 2 802 are examples of first point 704 and second point 706 in FIG. 7. Roller 804 is located at point 1 800 and roller 806 is located at point 2 802.

An unconsolidated composite material in the form of prepreg 807 moves in the direction of arrow 809 from point 1 800 to point 2 802. The speed of movement is distance/time, such as feet per second. Knowing the speed that prepreg 807 moves enables knowing the length and location of portion 824 as that portion moves within the composite material manufacturing system.

In this example, sensor 808 and sensor 810 are positioned at sensor location 812. At sensor location 812, sensor 808 is positioned on top side 814 of prepreg 807. Sensor 808 is positioned on bottom side 816 of prepreg 807.

In this example, tension 820 at point 1 800 and tension 822 at point 2 802 are present. Additionally, roller 804 applies heat and pressure to prepreg 807 as prepreg 807 travels over roller 804. Sensor 808 and sensor 810 can make real time measurements of thickness and reflectance of portion 824 of prepreg 807 at sensor location 812 that results from applying tension, heat, and pressure to prepreg 807 to generate sensor data.

Figure 9:
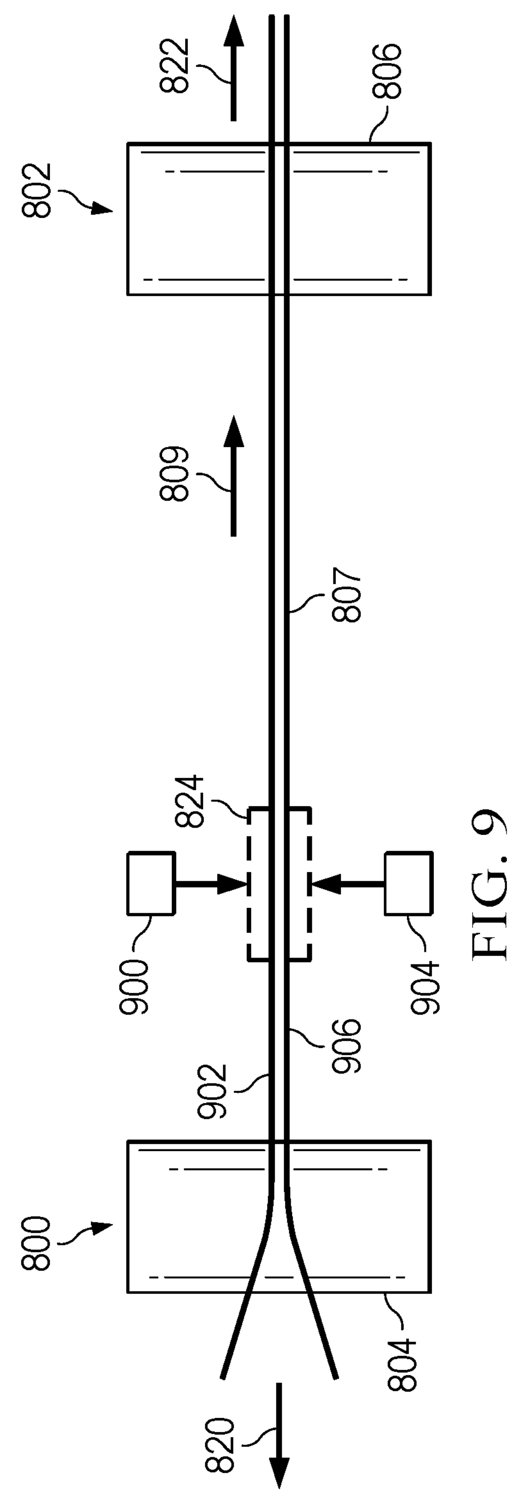
FIG. 9 is an illustration of the top view of a portion of a composite material manufacturing system in accordance with an illustrative embodiment.

Turning to FIG. 9, an illustration of the top view of a portion of a composite material manufacturing system is depicted in accordance with an illustrative embodiment. In this example, a different positioning of sensors is present as compared to the example in FIG. 8. As depicted in this top view, sensor 900 is positioned on first side 902 of prepreg 807 at sensor location 812. Sensor 904 is positioned on second side 906 of prepreg 807 at sensor location 812, which is opposite to first side 902.

In this example, tension 820 at point 1 800 and tension 822 at point 2 802 are present. Additionally, roller 804 applies heat and pressure to prepreg 807 as prepreg 807 travels over roller 804.

As depicted, sensor 900 and sensor 904 can make real time measurements of width, conductance, and capacitance of portion 824 of prepreg 807 to generate sensor data. The sensor data of the electrical measurements can be used to determine properties for portion 824 of prepreg 807 such as the amount of resin absorption and width.

With the sensor data from at least one of sensor location 812 or other sensor locations, predictions of the properties for portion 824 of prepreg 807 can be made for portion 824 when the manufacturing of portion 824 of prepreg 807 is complete, such as when portion 824 of prepreg 807 is wound onto a prepreg roll. For example, the sensor data can be used to predict properties that portion 824 of prepreg 807 will have such as fiber areal weight (FAW) and water pickup.

The illustration of the points, sensor location, and sensors are provided as an example of one implementation and not meant to limit the manner in which other illustrative examples can be implemented. For example, in another illustrative example, only a single sensor may be present, or 3 or more sensors may be present. Further, the additional sensors can be at sensor location 812 or another sensor location between point 1 800 and point 2 802.

As yet another example, point 1 800 and point 2 802 can be locations for other components that perform actions on prepreg 807 other than roller 804 and roller 806. For example, a collar, a spreader bar, a comb, a collar, a nip, a rewinder, or other component can be at point 1 800 and point 2 802.

Figure 10:
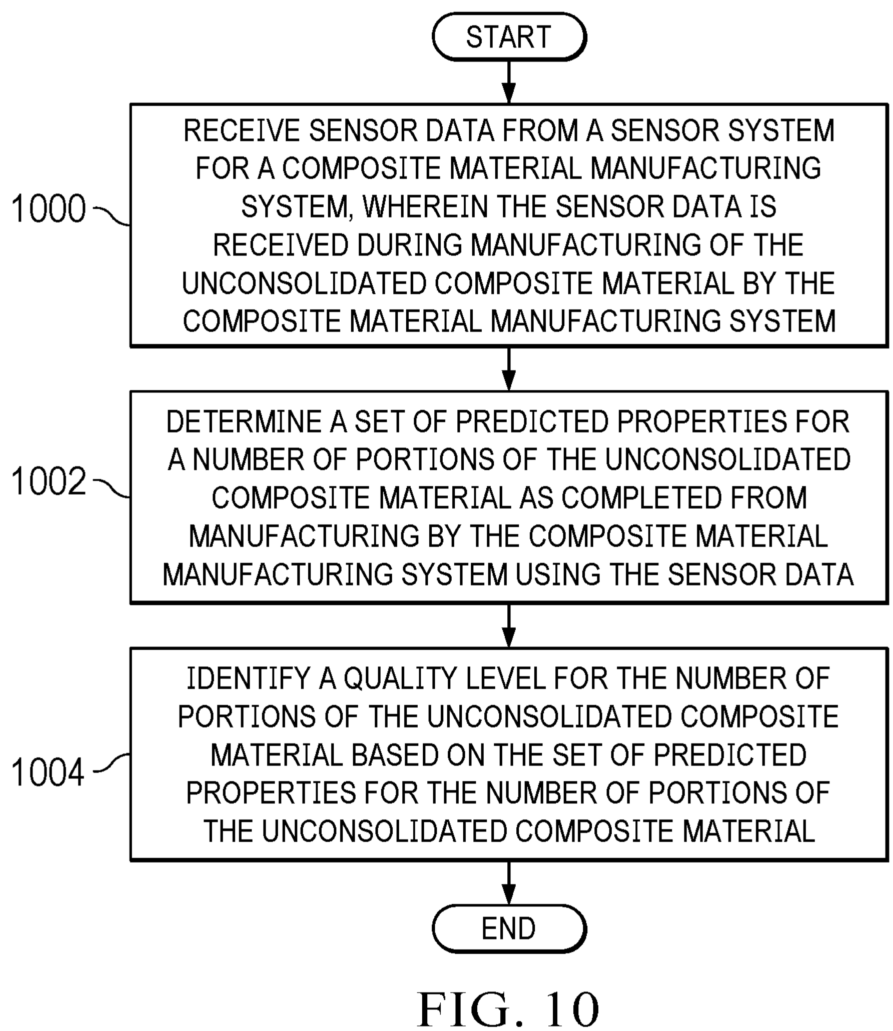
FIG. 10 is an illustration of a flowchart of a process for identifying quality levels for portions of an unconsolidated composite material in accordance with an illustrative embodiment.

Turning to FIG. 10, an illustration of a flowchart of a process for identifying quality levels for portions of an unconsolidated composite material is depicted in accordance with an illustrative embodiment. The process in FIG. 10 can be implemented in hardware, software, or both. When implemented in software, the process can take the form of program code that is run by one of more processor units located in one or more hardware devices in one or more computer systems. For example, the process can be implemented in composite material manager 212 in computer system 210 in FIG. 2.

As depicted, the process begins by receiving sensor data from a sensor system for a composite material manufacturing system, wherein the sensor data is received during manufacturing of the unconsolidated composite material by the composite material manufacturing system (operation 1000). The process determines a set of predicted properties for a number of portions of the unconsolidated composite material as completed from manufacturing by the composite material manufacturing system using the sensor data (operation 1002). The process identifies a quality level for the number of portions of the unconsolidated composite material based on the set of predicted properties for the number of portions of the unconsolidated composite material (operation 1004). The process terminates thereafter.

Figure 11:
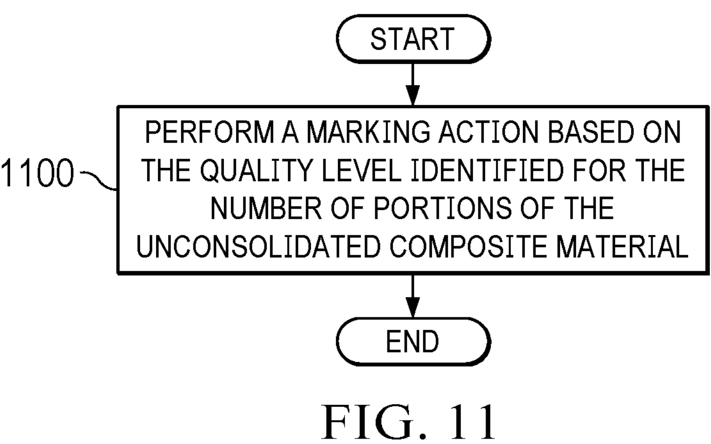
FIG. 11 is an illustration of a flowchart of a process for marking an unconsolidated composite material in accordance with an illustrative embodiment.

FIG. 11, an illustration of a flowchart of a process for marking an unconsolidated composite material is depicted in accordance with an illustrative embodiment. The operations in this figure are examples of additional operations that can be used within the operations in the process in FIG. 10.

As depicted, the process performs a marking action based on the quality level identified for the number of portions of the unconsolidated composite material (operation 1100). The process terminates thereafter.

Figure 12:
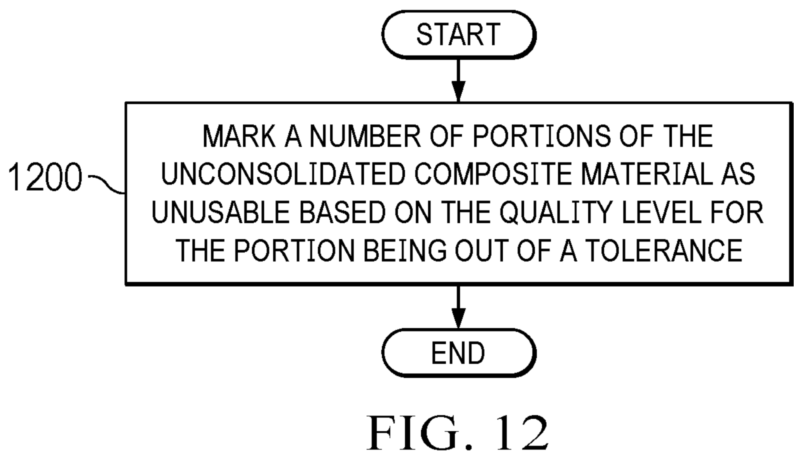
FIG. 12 is an illustration of a flowchart of a process for marking an out-of-tolerance portion of an unconsolidated composite material as unusable in accordance with an illustrative embodiment.

Next in FIG. 12, an illustration of a flowchart of a process for marking an out-of-tolerance portion of an unconsolidated composite material as unusable is depicted in accordance with an illustrative embodiment. The operation in this figure is an example of an implementation of operation 1100 in FIG. 11.

The process marks a number of portions of the unconsolidated composite material in the number of portions of the unconsolidated composite material as unusable based on the quality level for the portion being out of a tolerance (operation 1200). The process terminates thereafter.

Figure 13:
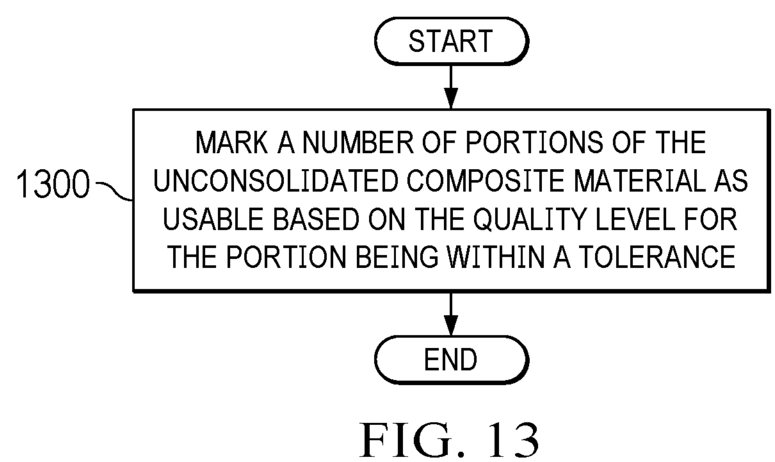
FIG. 13 is an illustration of a flowchart of a process for marking an in-tolerance portion of an unconsolidated composite material as usable in accordance with an illustrative embodiment.

With reference next to FIG. 13, an illustration of a flowchart of a process for marking an in-tolerance portion of an unconsolidated composite material as usable is depicted in accordance with an illustrative embodiment. The operation in this figure is an example of an implementation of operation 1100 in FIG. 11.

The process marks a number of portions of the unconsolidated composite material in the number of portions of the unconsolidated composite material as usable based on the quality level for the portion being within a tolerance (operation 1300). The process terminates thereafter.

Figure 14:
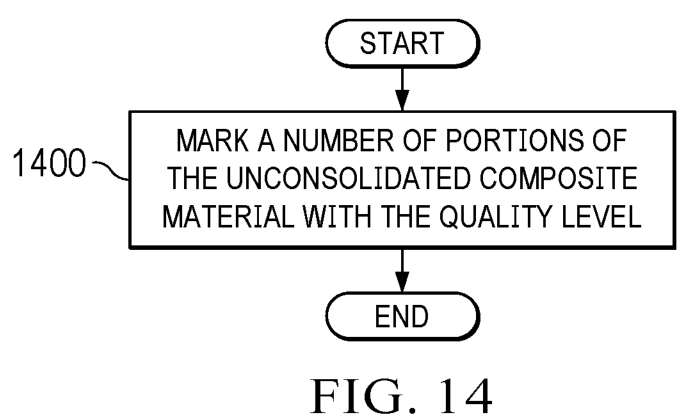
FIG. 14 is an illustration of a flowchart of a process for marking a portion of an unconsolidated composite material with a quality level in accordance with an illustrative embodiment.

Turning to FIG. 14, an illustration of a flowchart of a process for marking a number of portions of an unconsolidated composite material with a quality level is depicted in accordance with an illustrative embodiment. The operation in this figure is an example of an implementation of operation 1100 in FIG. 11.

The process marks a portion of the unconsolidated composite material in the number of portions of the unconsolidated composite material with the quality level (operation 1400). The process terminates thereafter.

Figure 15:
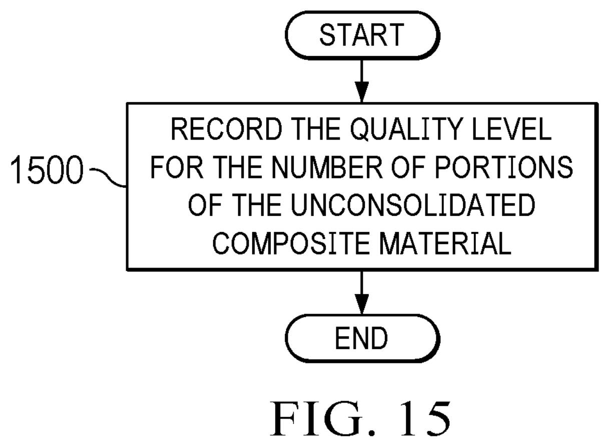
FIG. 15 is an illustration of a flowchart of a process for recording a quality level for portions of an unconsolidated composite material in accordance with an illustrative embodiment.

With reference now to FIG. 15, an illustration of a flowchart of a process for recording a quality level for portions of an unconsolidated composite material is depicted in accordance with an illustrative embodiment. The operation in this figure is an example of an implementation of operation 1100 in FIG. 11.

The process records the quality level for the number of portions of the unconsolidated composite material (operation 1500). The process terminates thereafter.

Figure 16:
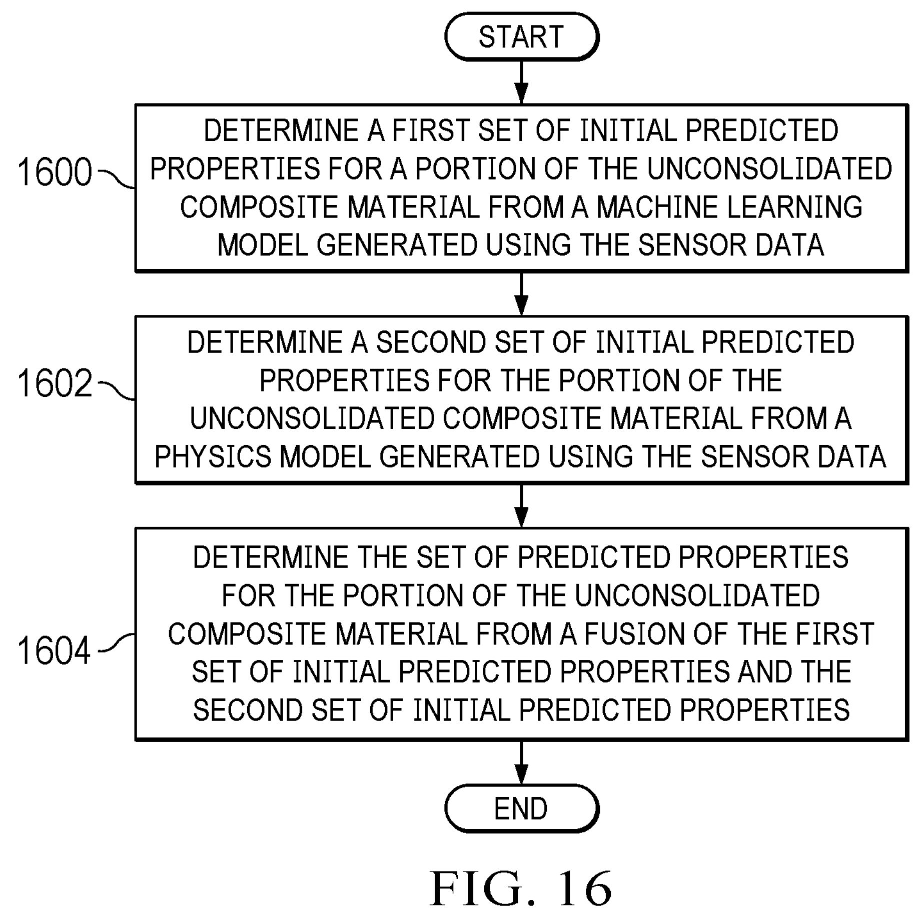
FIG. 16 is an illustration of a flowchart of a process for determining predicted properties for a portion of an unconsolidated composite material in accordance with an illustrative embodiment.

With reference to FIG. 16, an illustration of a flowchart of a process for determining predicted properties for a portion of an unconsolidated composite material is depicted in accordance with an illustrative embodiment. The operations in this figure are an example of one implementation of operation 1002 in FIG. 10.

As depicted, the process begins by determining a first set of initial predicted properties for the portion of the unconsolidated composite material from a machine learning model generated using the sensor data (operation 1600). The process determines a second set of initial predicted properties for the portion of the unconsolidated composite material from a physics model generated using the sensor data (operation 1602). The process determines the set of predicted properties for the portion of the unconsolidated composite material from a fusion of the first set of initial predicted properties and the second set of initial predicted properties (operation 1604). The process terminates thereafter.

Figure 17:
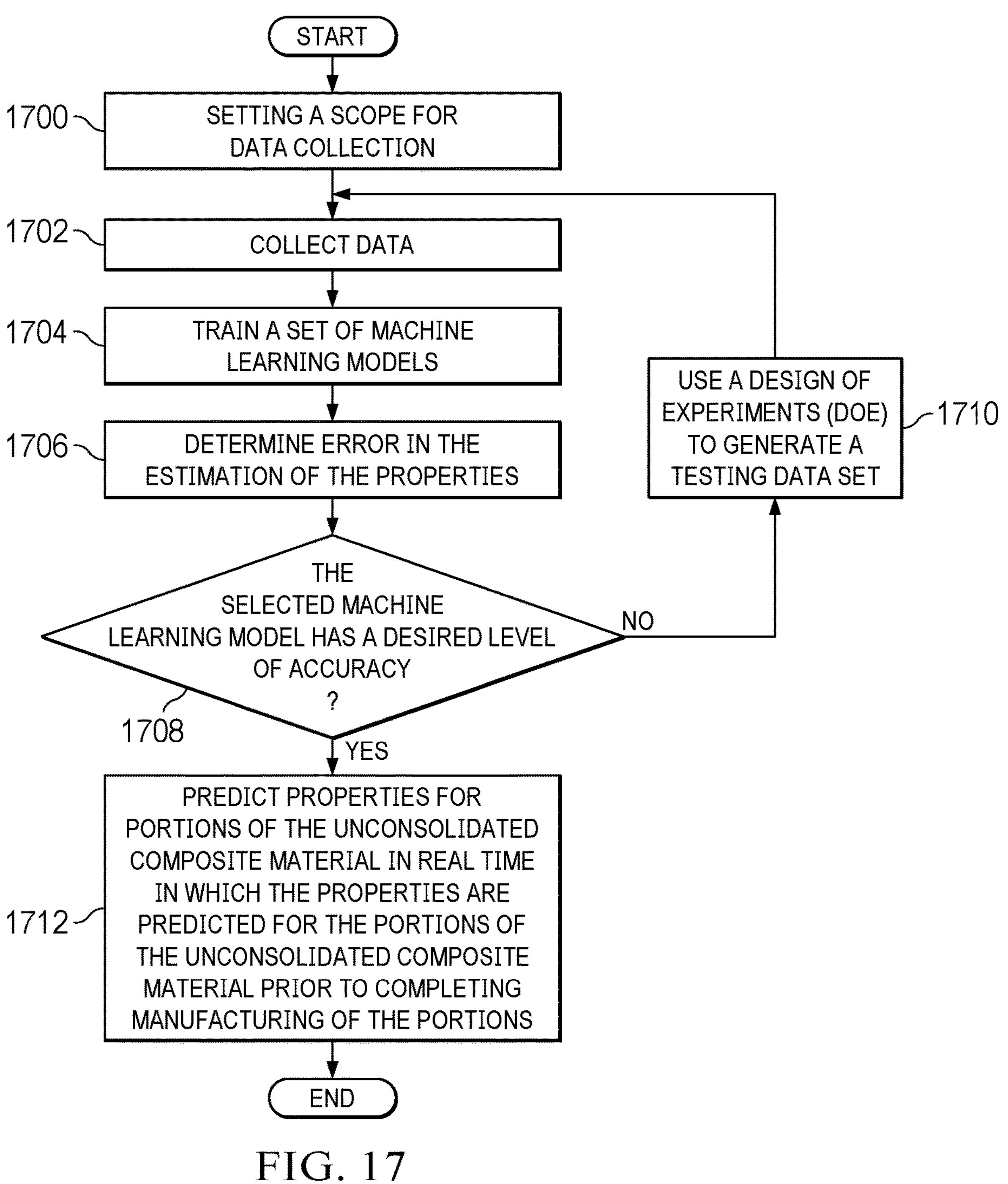
FIG. 17 is an illustration of a flowchart of a process for training a machine learning model to predict properties for an unconsolidated composite material prior to completing fabrication of the unconsolidated composite material in accordance with an illustrative embodiment.

Turning next to FIG. 17, an illustration of a flowchart of a process for training a machine learning model to predict properties for an unconsolidated composite material prior to completing fabrication of the unconsolidated composite material is depicted in accordance with an illustrative embodiment. The process in FIG. 17 can be implemented in hardware, software, or both. When implemented in software, the process can take the form of program code that is run by one of more processor units located in one or more hardware devices in one or more computer systems. For example, the process can be implemented in composite material manager 212 in computer system 210 in FIG. 2.

The process begins by setting a scope for data collection (operation 1700). In operation 1700, the scope is set such that the data is collected with sufficient resolution repetition for training and validating testing models.

The process collects data (operation 1702). In this operation, historical data is collected from the manufacturing of the unconsolidated composite materials. This data can include sensor data, upstream data, and the inspection data. The inspection data is generated by sample testing the manufactured unconsolidated composite material to determine the properties of interest. These properties of interest are used to evaluate the quality of the unconsolidated composite material and whether it is suitable for particular uses.

The process trains a set of machine learning models (operation 1704). In operation 1704, one or more model types can be selected for training. When more than one type of model is selected, an evaluation can be performed to see which machine learning model provides the most accurate predictions.

In operation 1704, properties and parameters are selected for use in training. The properties are properties of unconsolidated composite materials that are of interest in determining the quality and whether the unconsolidated composite material is suitable for use. The parameters are selected as parameters that have a correlation or effect on the properties selected. In other words, when the parameters change, those changes can have an effect on the properties that result for the unconsolidated composite material.

Operation 1704 can also include hyperparameter optimization in which hyperparameters in the model can be set as parameters or variables that are set before actually optimizing the parameters or variables selected for training the model. Hyperparameters can include, for example, model selection.

The process determines error in the estimation of the properties (operation 1706). In operation 1706, the validation data can be used to determine the error occurring in predicting properties.

The process then determines whether the selected machine learning model has a desired level of accuracy (operation 1708). This desired level of accuracy can be tested using a portion of the historical data that is partitioned off as testing data. If the level of accuracy is not present, the process uses a design of experiments (DOE) to generate a testing data set (operation 1710). The process then returns to operation 1702 to collect data using the data generation approach generated by the design of experiments. The design of experiments is a statistical method to guide the execution of experiments to generate training.

With reference again to operation 1708, if the selected machine learning model has a desired level of accuracy, then the process predicts properties for portions of the unconsolidated composite material in real time in which the properties are predicted for the portions of the unconsolidated composite material prior to completing manufacturing of the portions (operation 1712). The process terminates thereafter.

Figure 18:
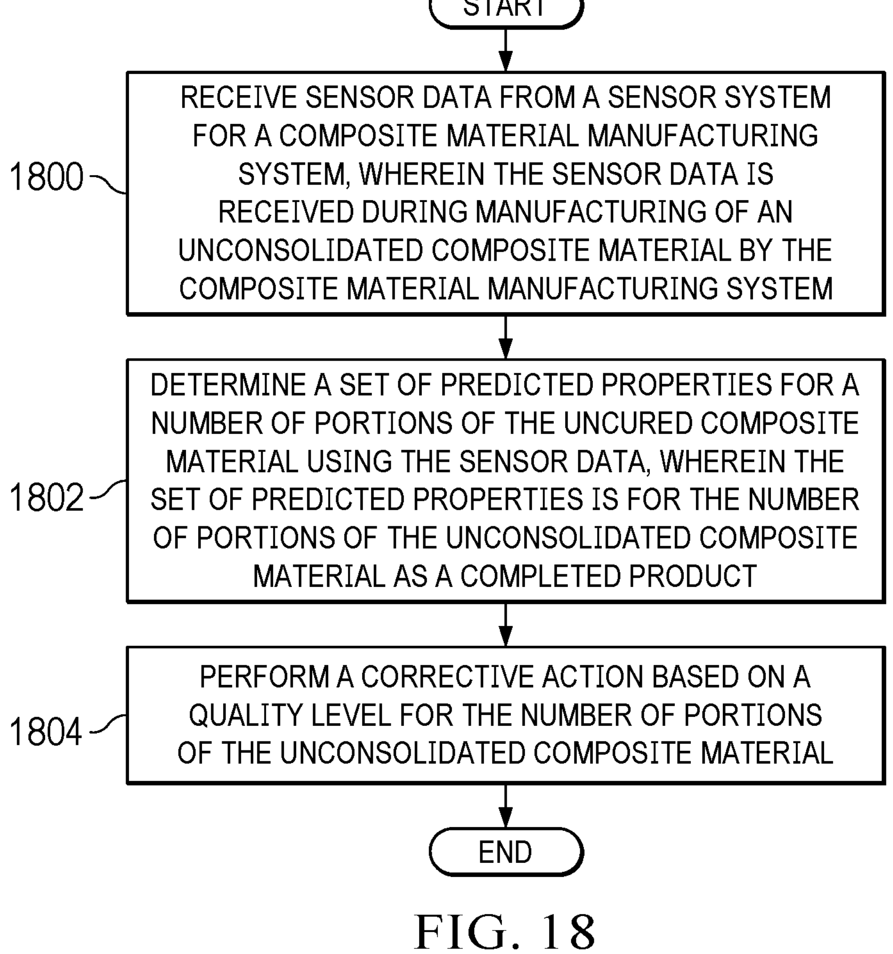
FIG. 18 is an illustration of a flowchart of a process for performing a corrective action for portions of an unconsolidated composite material in accordance with an illustrative embodiment.

Turning to FIG. 18, an illustration of a flowchart of a process for performing a corrective action for portions of an unconsolidated composite material is depicted in accordance with an illustrative embodiment. The process in FIG. 18 can be implemented in hardware, software, or both. When implemented in software, the process can take the form of program code that is run by one of more processor units located in one or more hardware devices in one or more computer systems. For example, the process can be implemented in composite material manager 212 in computer system 210 in FIG. 2.

As depicted, the process begins by receiving sensor data from a sensor system for a composite material manufacturing system, wherein the sensor data is received during manufacturing of an unconsolidated composite material by the composite material manufacturing system (operation 1800). The process determines a set of predicted properties for a number of portions of the unconsolidated composite material using the sensor data, wherein the set of predicted properties is for the number of portions of the unconsolidated composite material as a completed product (operation 1802). The process performs a corrective action based on a quality level for the number of portions of the unconsolidated composite material (operation 1804). The process terminates thereafter.

Figure 19:
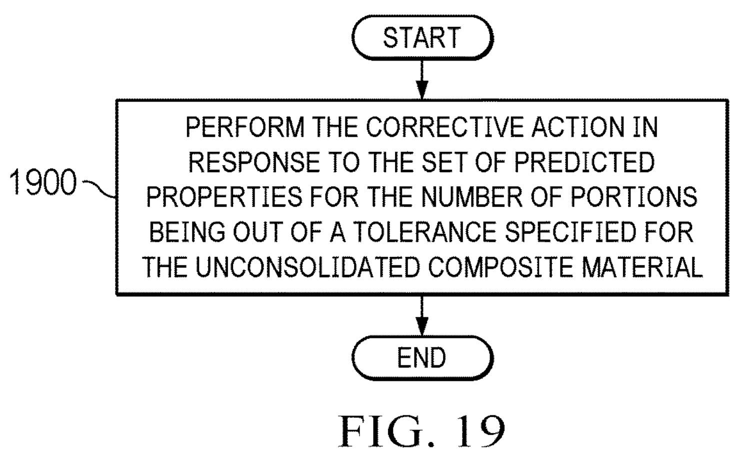
FIG. 19 is an illustration of a flowchart of a process for performing a corrective action for out-of-tolerance portions of an unconsolidated composite material in accordance with an illustrative embodiment.

Turning to FIG. 19, an illustration of a flowchart of a process for performing a corrective action for out-of-tolerance portions of an unconsolidated composite material is depicted in accordance with an illustrative embodiment. The operation in this figure is an example of an implementation of operation 1804 in FIG. 18.

As depicted, the process performs the corrective action in response to the set of predicted properties for the number of portions being out of a tolerance specified for the unconsolidated composite material (operation 1900). The process terminates thereafter.

Figure 20:
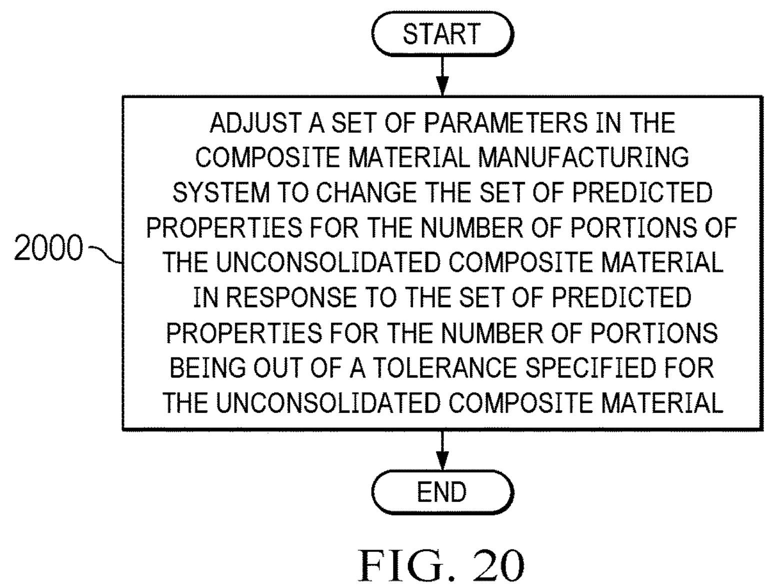
FIG. 20 is an illustration of a flowchart of a process for adjusting parameters for out-of-tolerance portions of an unconsolidated composite material in accordance with an illustrative embodiment.

Turning next to FIG. 20, an illustration of a flowchart of a process for adjusting parameters for out-of-tolerance portions of an unconsolidated composite material is depicted in accordance with an illustrative embodiment. The operation in this figure is an example of an implementation of operation 1804 in FIG. 18.

As depicted, the process adjusts a set of parameters in the composite material manufacturing system to change the set of predicted properties for the number of portions of the unconsolidated composite material in response to the set of predicted properties for the number of portions being out of a tolerance specified for the unconsolidated composite material (operation 2000). The process terminates thereafter.

Figure 21:
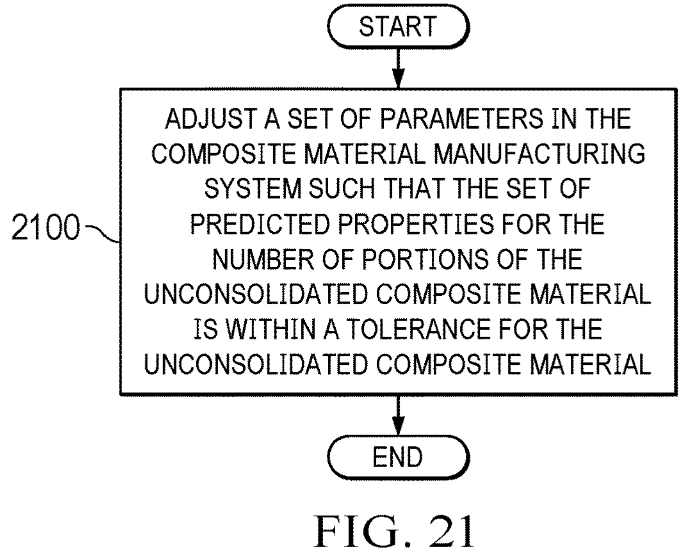
FIG. 21 is an illustration of a flowchart of a process for adjusting parameters for in-tolerance portions of an unconsolidated composite material in accordance with an illustrative embodiment.

With reference to FIG. 21, an illustration of a flowchart of a process for adjusting parameters for in-tolerance portions of an unconsolidated composite material is depicted in accordance with an illustrative embodiment. The operation in this figure is an example of an implementation of operation 1804 in FIG. 18.

As depicted, the process adjusts a set of parameters in the composite material manufacturing system such that the set of predicted properties for the number of portions of the unconsolidated composite material is within a tolerance for the unconsolidated composite material (operation 2100). The process terminates thereafter.

Figure 22:
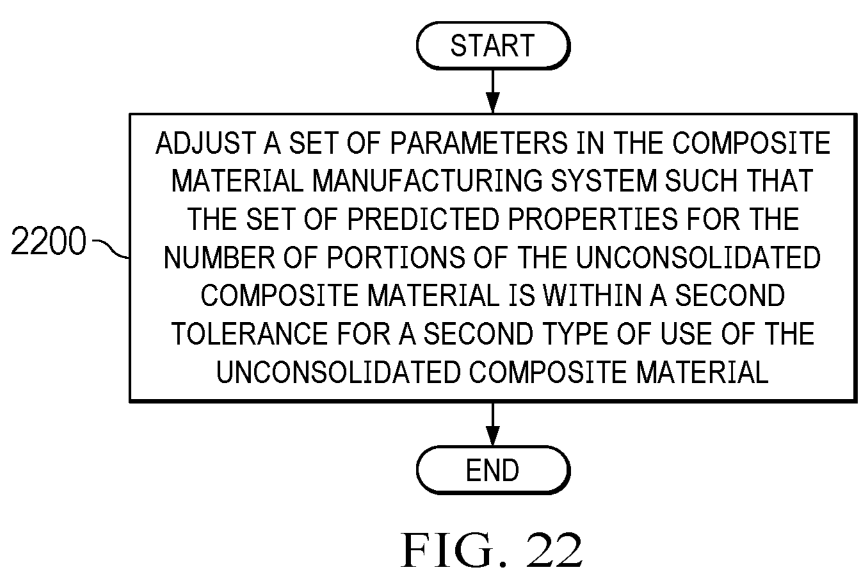
FIG. 22 is an illustration of a flowchart of a process for adjusting parameters such that portions of an unconsolidated composite material are within tolerance in accordance with an illustrative embodiment.

Turning next to FIG. 22, an illustration of a flowchart of a process for adjusting parameters such that portions of an unconsolidated composite material are within tolerance is depicted in accordance with an illustrative embodiment. The operation in this figure is an example of an implementation of operation 1804 in FIG. 18.

As depicted, the process adjusts a set of parameters in the composite material manufacturing system such that the set of predicted properties for the number of portions of the unconsolidated composite material is within a second tolerance for a second type of use of the unconsolidated composite material (operation 2200). The process terminates thereafter.

Figure 23:
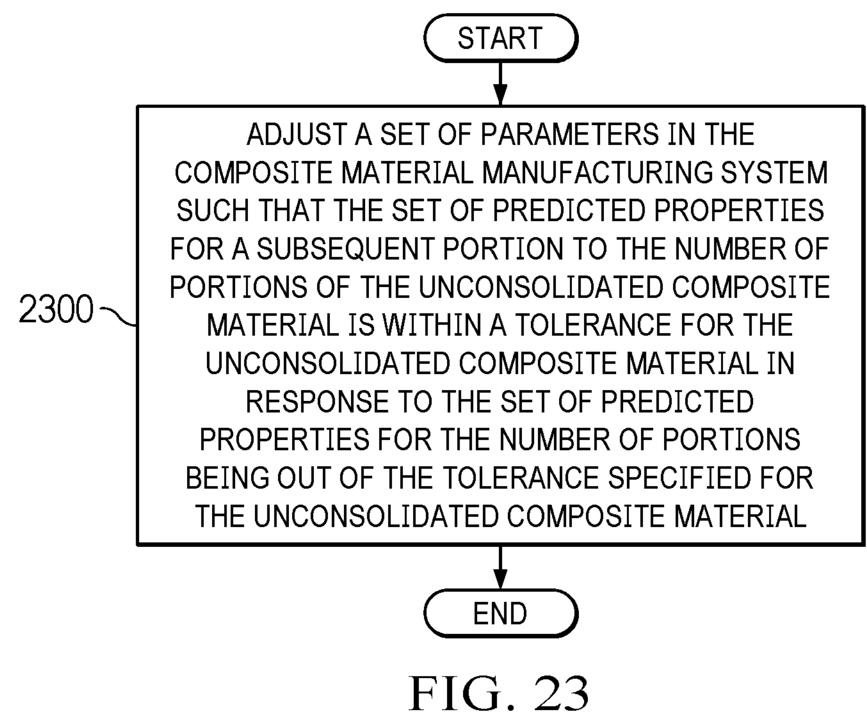
FIG. 23 is an illustration of a flowchart of a process for adjusting parameters for a subsequent portion of an unconsolidated composite material in accordance with an illustrative embodiment.

With reference to FIG. 23, an illustration of a flowchart of a process for adjusting parameters for a subsequent portion of an unconsolidated composite material is depicted in accordance with an illustrative embodiment. The operation in this figure is an example of an implementation of operation 1804 in FIG. 18.

As depicted, the process adjusts a set of parameters in the composite material manufacturing system such that the set of predicted properties for a subsequent portion to the number of portions of the unconsolidated composite material is within a tolerance for the unconsolidated composite material in response to the set of predicted properties for the number of portions being out of the tolerance specified for the unconsolidated composite material (operation 2300). The process terminates thereafter.

Figure 24:
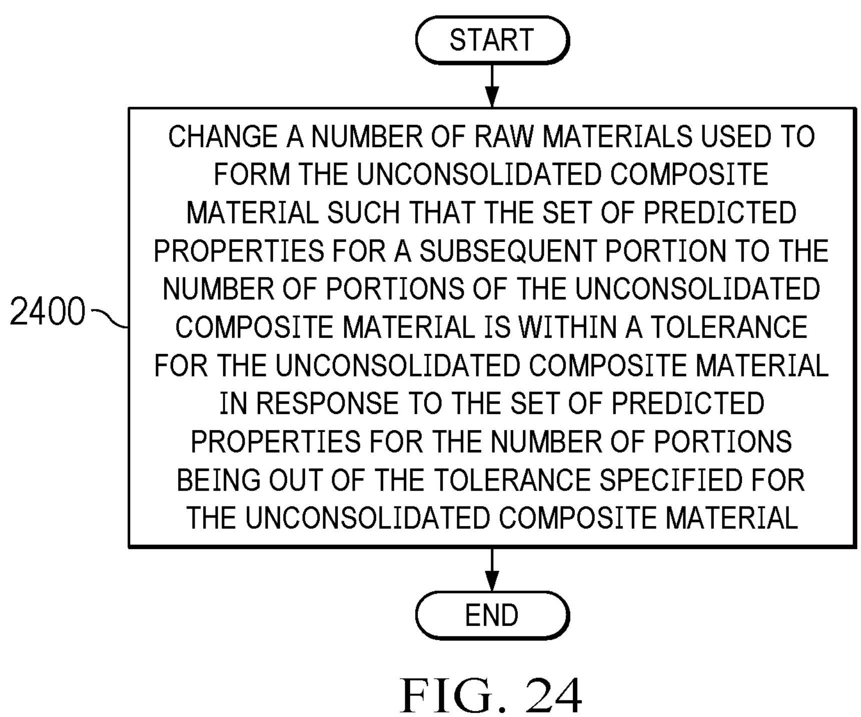
FIG. 24 is an illustration of a flowchart of a process for changing raw materials in accordance with an illustrative embodiment.

Turning to FIG. 24, an illustration of a flowchart of a process for changing raw materials is depicted in accordance with an illustrative embodiment. The operation in this figure is an example of an implementation of operation 1804 in FIG. 18.

As depicted, the process changes a number of raw materials used to form the unconsolidated composite material such that the set of predicted properties for a subsequent portion to the number of portions of the unconsolidated composite material is within a tolerance for the unconsolidated composite material in response to the set of predicted properties for the number of portions being out of the tolerance specified for the unconsolidated composite material (operation 2400). The process terminates thereafter.

Figure 25:
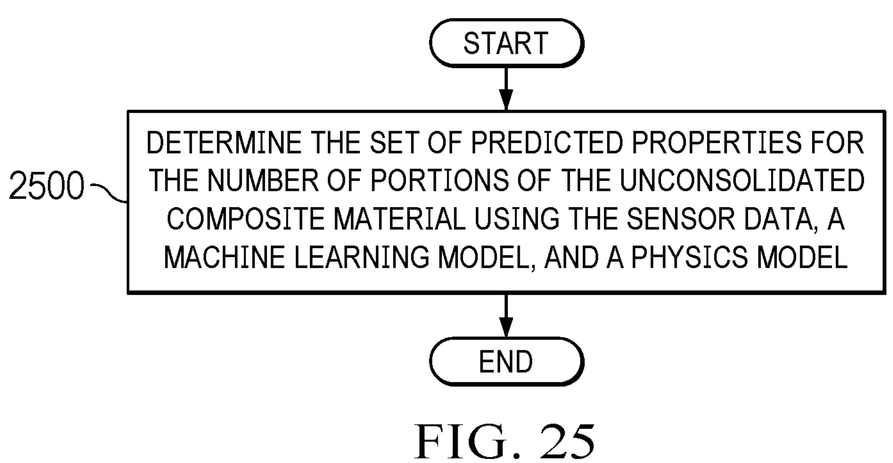
FIG. 25 is an illustration of a flowchart of a process for determining predicted properties of an unconsolidated composite material in accordance with an illustrative embodiment.

Turning next to FIG. 25, an illustration of a flowchart of a process for determining predicted properties of an unconsolidated composite material is depicted in accordance with an illustrative embodiment. The operations in this figure are examples of additional operations that can be used within the operations in the process in FIG. 18.

As depicted, the process determines the set of predicted properties for the number of portions of the unconsolidated composite material using the sensor data, a machine learning model, and a physics model (operation 2500). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Turning now to FIG. 26, an illustration of a block diagram of a data processing system is depicted in accordance with an illustrative embodiment. Data processing system 2600 can be used to implement server computer 104, server computer 106, or client devices 110 in FIG. 1. Data processing system 2600 can also be used to implement computer system 210 in FIG. 2. In this illustrative example, data processing system 2600 includes communications framework 2602, which provides communications between processor unit 2604, memory 2606, persistent storage 2608, communications unit 2610, input/output (I/O) unit 2612, and display 2614. In this example, communications framework 2602 takes the form of a bus system.

Processor unit 2604 serves to execute instructions for software that can be loaded into memory 2606. Processor unit 2604 includes one or more processors. For example, processor unit 2604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2604 can be implemented using one or more heterogeneous processor systems in which a main processor is present with secondary processors on a single chip. As another illustrative example, processor unit 2604 can be a symmetric multi-processor system containing multiple processors of the same type on a single chip.

Memory 2606 and persistent storage 2608 are examples of storage devices 2616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2616 may also be referred to as computer-readable storage devices in these illustrative examples. Memory 2606, in these examples, can be, for example, a random-access memory or any other suitable volatile or non-volatile storage device. Persistent storage 2608 can take various forms, depending on the particular implementation.

For example, persistent storage 2608 may contain one or more components or devices. For example, persistent storage 2608 can be a hard drive, a solid-state drive (SSD), a flash memory, a rewritable optical disk, a rewritable magnetic tape, or some combination of the above. The media used by persistent storage 2608 also can be removable. For example, a removable hard drive can be used for persistent storage 2608.

Communications unit 2610, in these illustrative examples, provides for communications with other data processing systems or devices. In these illustrative examples, communications unit 2610 is a network interface card.

Input/output unit 2612 allows for input and output of data with other devices that can be connected to data processing system 2600. For example, input/output unit 2612 can provide a connection for user input through at least one of a keyboard, a mouse, or some other suitable input device. Further, input/output unit 2612 can send output to a printer. Display 2614 provides a mechanism to display information to a user.

Instructions for at least one of the operating system, applications, or programs can be located in storage devices 2616, which are in communication with processor unit 2604 through communications framework 2602. The processes of the different embodiments can be performed by processor unit 2604 using computer-implemented instructions, which can be located in a memory, such as memory 2606.

These instructions are program instructions and are also referred to as program code, computer usable program code, or computer-readable program code that can be read and executed by a processor in processor unit 2604. The program code in the different embodiments can be embodied on different physical or computer-readable storage media, such as memory 2606 or persistent storage 2608.

Program instructions 2618 is located in a functional form on computer-readable media 2620 that is selectively removable and can be loaded onto or transferred to data processing system 2600 for execution by processor unit 2604. Program instructions 2618 and computer-readable media 2620 form computer program product 2622 in these illustrative examples. In the illustrative example, computer-readable media 2620 is computer-readable storage media 2624.

Computer-readable storage media 2624 is a physical or tangible storage device used to store program instructions 2618 rather than a media that propagates or transmits program instructions 2618. Computer-readable storage media 2624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 2618 can be transferred to data processing system 2600 using a computer-readable signal media. The computer-readable signal media are signals and can be, for example, a propagated data signal containing program instructions 2618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2620" can be singular or plural. For example, program instructions 2618 can be located in computer-readable media 2620 in the form of a single storage device or system. In another example, program instructions 2618 can be located in computer-readable media 2620 that is distributed in multiple data processing systems. In other words, some instructions in program instructions 2618 can be located in one data processing system while other instructions in program instructions 2618 can be located in multiple data processing systems. For example, a portion of program instructions 2618 can be located in computer-readable media 2620 in a server computer while another portion of program instructions 2618 can be located in computer-readable media 2620 located in a set of client computers.

The different components illustrated for data processing system 2600 are not meant to provide architectural limitations to the manner in which different embodiments can be implemented. In some illustrative examples, one or more of the components may be incorporated in or otherwise form a portion of, another component. For example, memory 2606, or portions thereof, can be incorporated in processor unit 2604 in some illustrative examples. The different illustrative embodiments can be implemented in a data processing system including components in addition to or in place of those illustrated for data processing system 2600. Other components shown in FIG. 26 can be varied from the illustrative examples shown. The different embodiments can be implemented using any hardware device or system capable of running program instructions 2618.

Figures 27, 28:
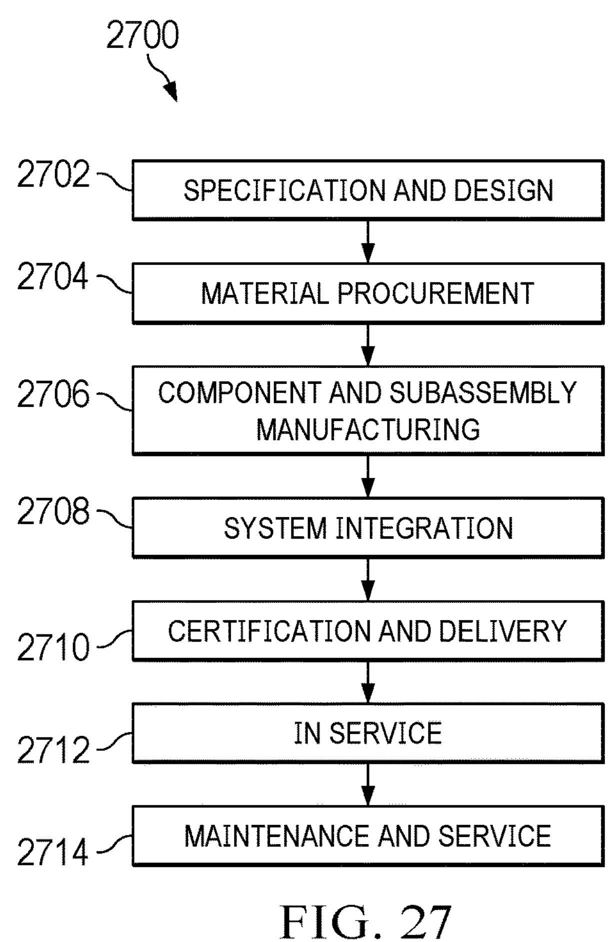
FIG. 27 is an illustration of an aircraft manufacturing and service method in accordance with an illustrative embodiment.
FIG. 28 is an illustration of a block diagram of an aircraft in which an illustrative embodiment may be implemented.

Illustrative embodiments of the disclosure may be described in the context of aircraft manufacturing and service method 2700 as shown in FIG. 27 and aircraft 2800 as shown in FIG. 28. Turning first to FIG. 27, an illustration of an aircraft manufacturing and service method is depicted in accordance with an illustrative embodiment. During preproduction, aircraft manufacturing and service method 2700 may include specification and design 2702 of aircraft 2800 in FIG. 28 and material procurement 2704.

During production, component and subassembly manufacturing 2706 and system integration 2708 of aircraft 2800 in FIG. 28 takes place. Thereafter, aircraft 2800 in FIG. 28 can go through certification and delivery 2710 in order to be placed in service 2712. While in service 2712 by a customer, aircraft 2800 in FIG. 28 is scheduled for routine maintenance and service 2714, which may include modification, reconfiguration, refurbishment, and other maintenance or service.

Each of the processes of aircraft manufacturing and service method 2700 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 28, an illustration of an aircraft is depicted in which an illustrative embodiment may be implemented. In this example, aircraft 2800 is produced by aircraft manufacturing and service method 2700 in FIG. 27 and may include airframe 2802 with plurality of systems 2804 and interior 2806. Examples of systems 2804 include one or more of propulsion system 2808, electrical system 2810, hydraulic system 2812, and environmental system 2814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2700 in FIG. 27.

In one illustrative example, components or subassemblies produced in component and subassembly manufacturing 2706 in FIG. 27 can be fabricated or manufactured in a manner similar to components or subassemblies produced while aircraft 2800 is in service 2712 in FIG. 27. As yet another example, one or more apparatus embodiments, method embodiments, or a combination thereof can be utilized during production stages, such as component and subassembly manufacturing 2706 and system integration 2708 in FIG. 27. One or more apparatus embodiments, method embodiments, or a combination thereof may be utilized while aircraft 2800 is in service 2712, during maintenance and service 2714 in FIG. 27, or both. The use of a number of the different illustrative embodiments may substantially expedite the assembly of aircraft 2800, reduce the cost of aircraft 2800, or both expedite the assembly of aircraft 2800 and reduce the cost of aircraft 2800. Increased quality in manufacturing unconsolidated composite materials during at least one of component and subassembly manufacturing 2706 or maintenance and service 2714 can at least one of reduce the amount of time needed or cost in manufacturing unconsolidated composite materials. With the ability to determine which portions of unconsolidated composite materials meet desired quality levels, less discarding or rework of unconsolidated composite materials can occur.

Figure 29:
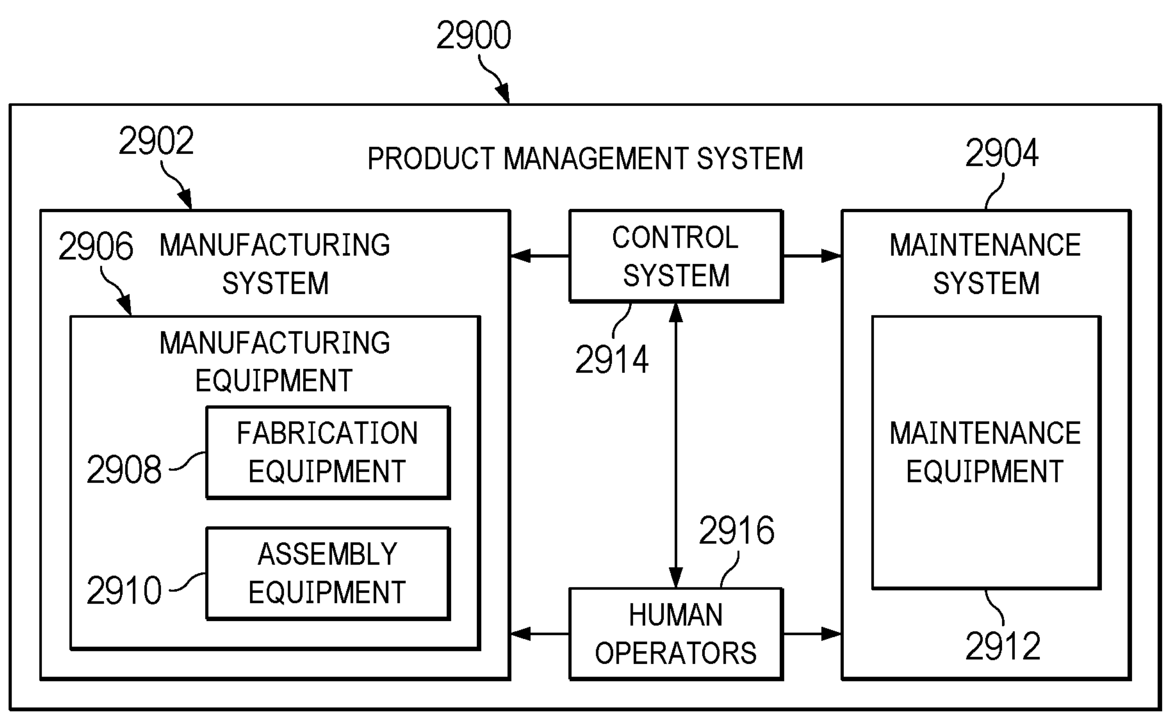
FIG. 29 is an illustration of a block diagram of a product management system in accordance with an illustrative embodiment.

Turning now to FIG. 29, an illustration of a block diagram of a product management system is depicted in accordance with an illustrative embodiment. Product management system 2900 is a physical hardware system. In this illustrative example, product management system 2900 includes at least one of manufacturing system 2902 or maintenance system 2904.

Manufacturing system 2902 is configured to manufacture products, such as aircraft 2800 in FIG. 28. As depicted, manufacturing system 2902 includes manufacturing equipment 2906. Manufacturing equipment 2906 includes at least one of fabrication equipment 2908 or assembly equipment 2910.

Fabrication equipment 2908 is equipment that is used to fabricate components for parts used to form aircraft 2800 in FIG. 28. For example, fabrication equipment 2908 can include machines and tools. These machines and tools can be at least one of a drill, a hydraulic press, a furnace, an autoclave, a mold, a composite tape laying machine, an automated fiber placement (AFP) machine, a vacuum system, a robotic pick and place system, a flatbed cutting machine, a laser cutter, a computer numerical control (CNC) cutting machine, a lathe, or other suitable types of equipment. Fabrication equipment 2908 can be used to fabricate at least one of metal parts, composite parts, semiconductors, circuits, fasteners, ribs, skin panels, spars, antennas, or other suitable types of parts.

Assembly equipment 2910 is equipment used to assemble parts to form aircraft 2800 in FIG. 28. In particular, assembly equipment 2910 is used to assemble components and parts to form aircraft 2800 in FIG. 28. Assembly equipment 2910 also can include machines and tools. These machines and tools may be at least one of a robotic arm, a crawler, a faster installation system, a rail-based drilling system, or a robot. Assembly equipment 2910 can be used to assemble parts such as seats, horizontal stabilizers, wings, engines, engine housings, landing gear systems, and other parts for aircraft 2800 in FIG. 28.

In this illustrative example, maintenance system 2904 includes maintenance equipment 2912. Maintenance equipment 2912 can include any equipment needed to perform maintenance on aircraft 2800 in FIG. 28. Maintenance equipment 2912 may include tools for performing different operations on parts on aircraft 2800 in FIG. 28. These operations can include at least one of disassembling parts, refurbishing parts, inspecting parts, reworking parts, manufacturing replacement parts, or other operations for performing maintenance on aircraft 2800 in FIG. 28. These operations can be for routine maintenance, inspections, upgrades, refurbishment, or other types of maintenance operations.

In the illustrative example, maintenance equipment 2912 may include ultrasonic inspection devices, x-ray imaging systems, vision systems, drills, crawlers, and other suitable devices. In some cases, maintenance equipment 2912 can include fabrication equipment 2908, assembly equipment 2910, or both to produce and assemble parts that are needed for maintenance.

Product management system 2900 also includes control system 2914. Control system 2914 is a hardware system and may also include software or other types of components. Control system 2914 is configured to control the operation of at least one of manufacturing system 2902 or maintenance system 2904. In particular, control system 2914 can control the operation of at least one of fabrication equipment 2908, assembly equipment 2910, or maintenance equipment 2912.

The hardware in control system 2914 can be implemented using hardware that may include computers, circuits, networks, and other types of equipment. The control may take the form of direct control of manufacturing equipment 2906. For example, robots, computer-controlled machines, and other equipment can be controlled by control system 2914. In other illustrative examples, control system 2914 can manage operations performed by human operators 2916 in manufacturing or performing maintenance on aircraft 2800. For example, control system 2914 can assign tasks, provide instructions, display models, or perform other operations to manage operations performed by human operators 2916. In these illustrative examples, composite material manager 212 in FIG. 2 can be implemented in control system 2914 to manage manufacturing of unconsolidated composite materials for use in at least one of the manufacturing or maintenance of aircraft 2800 in FIG. 28. These unconsolidated composite materials can be used to manufacture composite parts or to rework composite parts in at least one of least one of the manufacturing or maintenance of aircraft 2800 in FIG. 28.

In the different illustrative examples, human operators 2916 can operate or interact with at least one of manufacturing equipment 2906, maintenance equipment 2912, or control system 2914. This interaction can occur to manufacture aircraft 2800 in FIG. 28.

Of course, product management system 2900 may be configured to manage other products other than aircraft 2800 in FIG. 28. Although product management system 2900 has been described with respect to manufacturing in the aerospace industry, product management system 2900 can be configured to manage products for other industries. For example, product management system 2900 can be configured to manufacture products for the automotive industry as well as any other suitable industries.

Some features of the illustrative examples are described in the following clauses. These clauses are examples of features and are not intended to limit other illustrative examples.

Clause 1

A composite material management system comprising:

a computer system;

a composite material manager in the computer system, wherein the composite material manager is configured to:

receive sensor data from a sensor system for a composite material manufacturing system, wherein the sensor data is received during manufacturing of an unconsolidated composite material by the composite material manufacturing system;

determine a set of predicted properties for a number of portions of the unconsolidated composite material as completed from manufacturing by the composite material manufacturing system using the sensor data; and identify a quality level for the number of portions of the unconsolidated composite material based on the set of predicted properties for the number of portions of the unconsolidated composite material.

Clause 2

The composite material management system according to clause 1, wherein the composite material manager is configured to:

perform a marking action based on the quality level identified for the number of portions of the unconsolidated composite material.

Clause 3

The composite material management system according to clause 2, wherein performing the marking action based on the quality level identified for the number of portions of the unconsolidated composite material, the composite material manager is configured to:

mark the number of portions of the unconsolidated composite material as unusable based on the quality level for the portion being out of a tolerance.

Clause 4

The composite material management system according to one of clauses 2 or 3, wherein performing the marking action based on the quality level identified for the number of portions of the unconsolidated composite material, the composite material manager is configured to:

mark the number of portions of the unconsolidated composite material as usable based on the quality level for the portion being within a tolerance.

Clause 5

The composite material management system according to one of clauses 2, 3, or 4, wherein performing the marking action based on the quality level identified for the number of portions of the unconsolidated composite material, the composite material manager is configured to:

mark the number of portions of the unconsolidated composite material with the quality level.

Clause 6

The composite material management system according to one of clauses 2, 3, 4, or 5, wherein performing the marking action based on the quality level identified for the number of portions of the unconsolidated composite material, the composite material manager is configured to:

record at least one of the quality level for the number of portions of the unconsolidated composite material.

Clause 7

The composite material management system according to one of clauses 1, 2, 3, 4, 5, or 6 further comprising:

the composite material manufacturing system.

Clause 8

The composite material management system according to one of clauses 3, 4, 5, 6, or 7, wherein the composite material manufacturing system is one of a carbon fiber prepreg coating line, a reinforcing fiber resin impregnation line, a resin mix process system, a resin filming line, a prepreg system, and a slitting process system.

Clause 9

The composite material management system according to one of clauses 1, 2, 3, 4, 5, 6, 7, or 8, wherein a set of sensors in the sensor system is at a sensor location located between a first point and a second point in the composite material manufacturing system and wherein the first point is a point at which a set of actions is performed on a portion of the unconsolidated composite material as the portion of the unconsolidated composite material passes the first point.

Clause 10

The composite material management system according to one of clauses 1, 2, 3, 4, 5, 6, 7, 8, or 9 further comprising:

a machine learning model, wherein the composite material manager determines the set of predicted properties for the portion of the unconsolidated composite material using the sensor data and the machine learning model.

Clause 11

The composite material management system according to one of clauses 1, 2, 3, 4, 5, 6, 7, 8, 9, or 10 further comprising:

a machine learning model; and a physics model, wherein the composite material manager determines the set of predicted properties for a portion of the unconsolidated composite material using the sensor data, the machine learning model, and the physics model.

Clause 12

The composite material management system according to clause 11, wherein in determining the set of predicted properties for the portion of the unconsolidated composite material, the composite material manager is configured to:

determine a first set of initial predicted properties for the portion of the unconsolidated composite material from the machine learning model generated using the sensor data;

determine a second set of initial predicted properties for the portion of the unconsolidated composite material from the physics model generated using the sensor data; and determine the set of predicted properties for the portion of the unconsolidated composite material from a fusion of the first set of initial predicted properties and the second set of initial predicted properties.

Clause 13

The composite material management system according to one of clauses 1, 2, 3, 4, 5, 6, 7, 8, 9, 10, 11, or 12, wherein the unconsolidated composite material is selected from at least one of a prepreg, an aerospace-grade prepreg, a thermoset prepreg, a thermoplastic prepreg, a woven fabric prepreg, a fiber tow prepreg, a tow prepreg, unidirectional tape prepreg, a resin coated film, non-crimp fabric, or a resin mix.

Clause 14

The composite material management system according to one of clauses 1, 2, 3, 4, 5, 6, 7, 8, 9, 10, 11, 12, or 13, wherein the sensor data comprises at least one of a component temperature, an unconsolidated composite material temperature, an ambient temperature, a humidity, a roller speed, a speed of the unconsolidated composite material, a pressure between a pair of rollers, a gap between the pair of rollers, an unconsolidated composite material thickness, a Fourier transform infrared (FTIR) spectra, spectroscopy data, a material width, a fiber web width, a material areal weight, a fiber areal weight, a resin viscosity, an electrical measurement across a dimension of the unconsolidated composite material, a voltage across the dimension of the unconsolidated composite material, an electromagnetic measurement across the dimension of the unconsolidated composite material, an acoustic measurement across the dimension of the unconsolidated composite material, a tension, or an image of a prepreg at a location in the composite material manufacturing system.

Clause 15

The composite material management system according to one of clauses 1, 2, 3, 4, 5, 6, 7, 8, 9, 10, 11, 12, 13, or 14, wherein the composite material manager is configured to receive upstream information selected from at least one of reinforcement information, fiber information, reinforcement sizing information, resin information, release liner information, or resin film information.

Clause 16

The composite material management system according to one of clauses 1, 2, 3, 4, 5, 6, 7, 8, 9, 10, 11, 12, 13, 14, or 15, wherein the set of properties comprises at least one of a prepreg fiber areal weight, prepreg resin content, prepreg thickness, prepreg infiltration level, a prepreg tack level, resin film areal weight, resin film thickness, release liner areal weight, release liner thickness, or a laminate structural property.

Clause 17

A composite material management system comprising:

a carbon fiber prepreg coating line that operates to manufacture length of prepreg from fibers and a resin coated film;

a sensor system, wherein the sensor system is operatable to generate sensor data for carbon fiber prepreg coating line during operation of the carbon fiber prepreg coating line;

a composite material manager configured to:

receive the sensor data from the sensor system for a composite material manufacturing system, wherein the sensor data is received during manufacturing of an unconsolidated composite material by the composite material manufacturing system;

determine a set of predicted properties for a number of portions of the prepreg as completed from manufacturing by the composite material manufacturing system using the sensor data; and identify a quality level for the number of portions of the prepreg based on the set of predicted properties for the number of portions of the unconsolidated composite material.

Clause 18

The composite material management system according to clause 17, wherein in identifying the quality level for the number of portions of the prepreg based on the set of predicted properties for the number of portions of the unconsolidated composite material, the composite material manager is configured to:

mark a portion of the prepreg in the number of portions of the prepreg as unusable based on the quality level for the portion being out of a tolerance.

Clause 19

The composite material management system according to clauses 17 or 18, wherein in identifying the quality level for the number of portions of the unconsolidated composite material based on the set of predicted properties for the number of portions of the unconsolidated composite material, the composite material manager is configured to:

mark the number of portions of the prepreg as usable based on the quality level for the portion being within a tolerance.

Clause 20

The composite material management system according to clauses 17, 18, or 19, wherein in identifying the quality level for the number of portions of the prepreg based on the set of predicted properties for the number of portions of the prepreg, the composite material manager is configured to:

mark a portion of the prepreg in the number of portions of the prepreg with the quality level.

Clause 21

The composite material management system according to clauses 17, 18, 19, or 20, wherein the fibers are in a form selected from a tow, a tape, and a woven fabric and wherein the resin coated film is a resin coated paper.

Clause 22

A method for manufacturing an unconsolidated composite material, the method comprising:

receiving sensor data from a sensor system for a composite material manufacturing system, wherein the sensor data is received during manufacturing of the unconsolidated composite material by the composite material manufacturing system;

determining a set of predicted properties for a number of portions of the unconsolidated composite material as completed from manufacturing by the composite material manufacturing system using the sensor data; and identifying a quality level for the number of portions of the unconsolidated composite material based on the set of predicted properties for the number of portions of the unconsolidated composite material.

Clause 23

The method according to clause 22 further comprising:

performing a marking action based on the quality level identified for the number of portions of the unconsolidated composite material.

Clause 24

The method according to clause 23, wherein the performing the marking action based on the quality level identified for the number of portions of the unconsolidated composite material comprises:

marking a portion of the unconsolidated composite material in the number of portions of the unconsolidated composite material as unusable based on the quality level for the portion being out of a tolerance.

Clause 25

The method according to clauses 23 or 24, wherein the performing the marking action based on the quality level identified for the number of portions of the unconsolidated composite material comprises:

marking a portion of the unconsolidated composite material in the number of portions of the unconsolidated composite material as unusable based on the quality level for the portion being within a tolerance.

Clause 26

The method according to clauses 23, 24 or 25, wherein the performing the marking action based on the quality level identified for the number of portions of the unconsolidated composite material comprises:

marking a portion of the unconsolidated composite material in the number of portions of the unconsolidated composite material with the quality level.

Clause 27

The method according to clauses 23, 24, 25, or 26, wherein the performing the marking action based on the quality level identified for the number of portions of the unconsolidated composite material comprises:

recording at least one of the quality level for the number of portions of the unconsolidated composite material.

Clause 28

The method according to clauses 22, 23, 24 25, 26, or 27, wherein the set of predicted properties for a portion of the unconsolidated composite material is determined using the sensor data, a machine learning model, and a physics model.

Clause 29

The method according to clauses 22, 23, 24 25, 26, 27, or 28, wherein determining the set of predicted properties for the number of portions of the unconsolidated composite material comprises:

determining a first set of initial predicted properties for a portion of the unconsolidated composite material from a machine learning model generated using the sensor data;

determining a second set of initial predicted properties for the portion of the unconsolidated composite material from a physics model generated using the sensor data; and determining the set of predicted properties for the portion of the unconsolidated composite material from a fusion of the first set of initial predicted properties and the second set of initial predicted properties.

Clause 30

The method according to clauses 22, 23, 24 25, 26, 27, 28, or 29, wherein the set of predicted properties for a portion of the unconsolidated composite material is determined using sensor data and a machine learning model.

Clause 31

The method according to clauses 22, 23, 24 25, 26, 27, 28, 29, or 30, wherein the composite material manufacturing system is a carbon fiber prepreg coating line.

Clause 32

The method according to clauses 22, 23, 24 25, 26, 27, 28, 29, 30, or 31, wherein the unconsolidated composite material is selected from at least one of a prepreg, a thermoset prepreg, a woven fabric prepreg, a fiber tow prepreg, unidirectional tape prepreg, or a resin coated film.

Clause 33

The method according to clauses 22, 23, 24 25, 26, 27, 28, 29, 30, 31, or 32, wherein the sensor data comprises at least one of a component temperature, an unconsolidated composite material temperature, an ambient temperature, a humidity, a roller speed, a speed of the unconsolidated composite material, a gap between a pair of rollers, an unconsolidated composite material thickness, a Fourier transform infrared (FTIR) spectra, a fiber web width, a fiber areal weight, a resin viscosity, a voltage across a dimension of the unconsolidated composite material, an electrical measurement across the dimension of the unconsolidated composite material, an electromagnetic measurement across the dimension of the unconsolidated composite material, an acoustic measurement across the dimension of the unconsolidated composite material, a tension, or an image of a prepreg at a location in the composite material manufacturing system.

Clause 34

A computer program product for manufacturing an unconsolidated composite material, the computer program product comprising a computer-readable storage medium having program instructions embodied therewith, the program instructions executable by a computer system to cause the computer system to perform a method of:

receiving sensor data from a sensor system for a composite material manufacturing system, wherein the sensor data is received during manufacturing of the unconsolidated composite material by the composite material manufacturing system;

determining a set of predicted properties for a number of portions of the unconsolidated composite material as completed from manufacturing by the composite material manufacturing system using the sensor data; and identifying a quality level for the number of portions of the unconsolidated composite material based on the set of predicted properties for the number of portions of the unconsolidated composite material.

Thus, the illustrative examples provide a method, apparatus, system, and computer program product for predicting properties that unconsolidated composite materials will have upon completion of manufacturing the unconsolidated composite materials while the manufacturing process occurs. Further, the illustrative examples can also perform corrective actions using these predictions to change the properties that the unconsolidated composite materials will have as completed from manufacturing to form a completed product.

In the different illustrative examples, a composite material manager performs operations to determine a set of predicted properties for a number of portions of the unconsolidated composite material has completed from manufacturing. In other words, the prediction is for the portions of the uncured composite material when the manufacturing of the number of portions of uncured composite materials is completed to form a completed product.

As a result, a reduction in at least one of expense or the amount of time needed to manufacture unconsolidated composite materials can be realized using composite material manager 212 to predict quality level portions of unconsolidated composite material. Further reduction can occur by performing corrective actions during manufacturing of the unconsolidated composite material such that the additional amounts of unconsolidated material that are in tolerance occur. As a result, additional manufacturing, reworking, or discarding of unconsolidated composite material can be reduced.

In one illustrative example, composite material manufacturing system 208 can be managed by composite material management system 202 with greater efficiency through improvements in detecting inconsistencies in an unconsolidated composite material in a completed form. For example, fiber input can be monitored to detect and track inconsistencies used to manufacture an unconsolidated composite material. The monitoring can be performed using images generated during different times in the manufacturing of the unconsolidated composite material.

In the illustrative examples, inconsistencies can be detected in-situ in a fiber input used to manufacture the unconsolidated composite material such as a composite prepreg. The fiber input can be, for example, a continuous fiber tow that is input into a machine which manufactures a composite prepreg.

In the illustrative examples, inconsistencies can be detected in composite prepreg in the final form. A determination can be made as to whether a correlation of fiber presentation inconsistencies and the inconsistencies in the composite prepreg is present.

Illustrative examples provide a method, apparatus, system, and computer program product that can identify in-situ fiber inconsistencies in a fiber input to a manufacturing process, identify inconsistencies in the unconsolidated composite material in the completed form that results from the manufacturing process to determine whether these inconsistencies in the fiber input have an effect on inconsistencies in the unconsolidated composite material in the completed form. In other words, a determination can be made as to whether the inconsistencies in the fiber cause inconsistencies in the unconsolidated composite material. These determinations of the fiber inconsistencies in the fiber input, material inconsistencies in unconsolidated composite material in the completed form, and whether a correlation is present between the inconsistencies can be used to at least one of reduce or eliminate required material screening and characterization testing.

Figure 30:
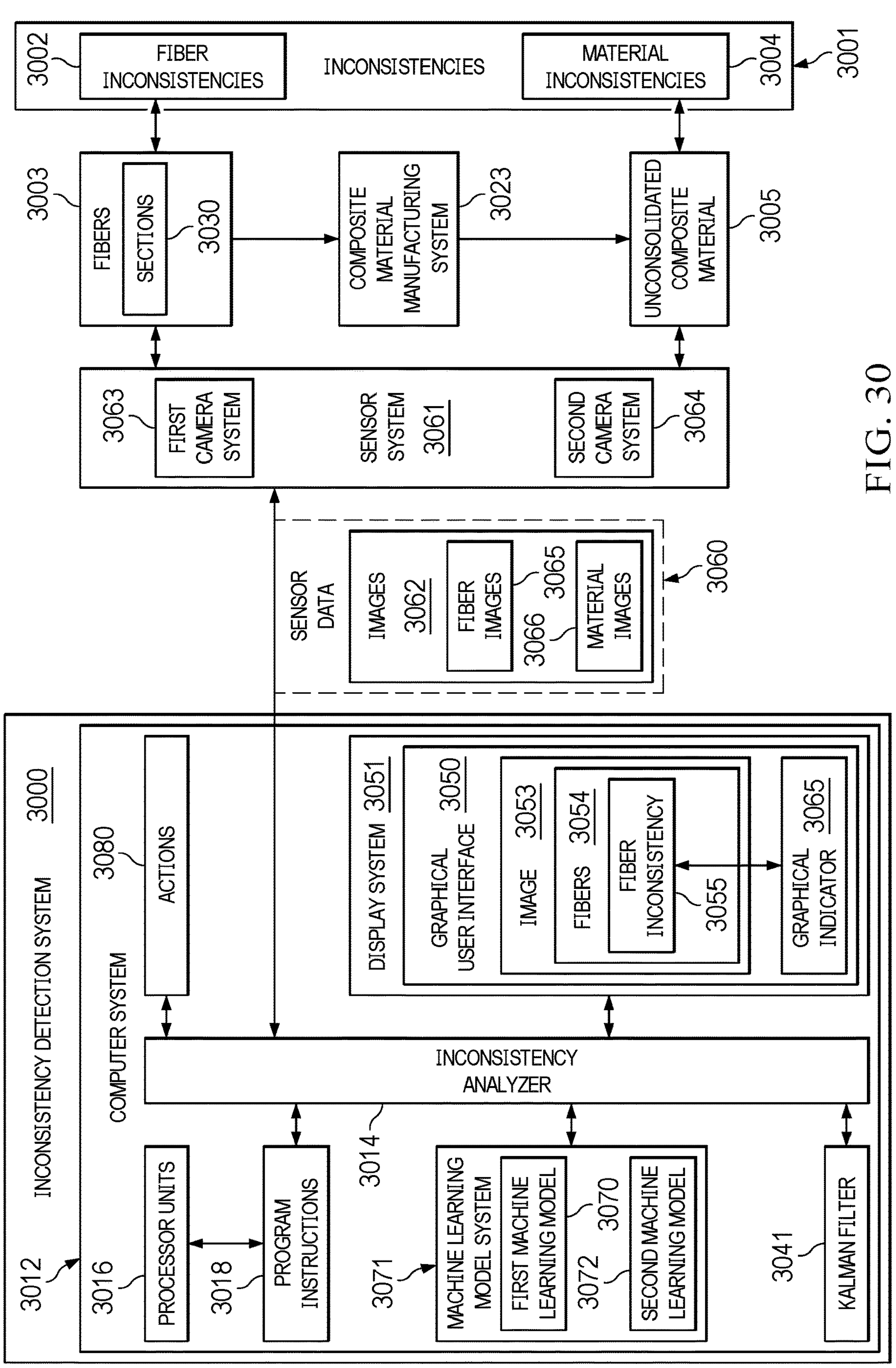
FIG. 30 is an illustration of an inconsistency detection system in accordance with an illustrative embodiment.

With reference now to FIG. 30, an illustration of an inconsistency detection system is depicted in accordance with an illustrative embodiment. In this illustrative example, inconsistency detection system 3000 can be used to detect inconsistencies 3001. For example, inconsistency detection system 3000 can detect fiber inconsistencies 3002 in inconsistencies 3001 that are present in fibers 3003. Fiber inconsistencies 3002 can include at least one of a gap between fibers 3003, a loose fiber, a foreign object in fibers 3003, or other types of inconsistencies that may be undesirable.

Additionally, inconsistency detection system 3000 can detect material inconsistencies 3004 in inconsistencies 3001 that are present in unconsolidated composite material 3005 manufactured using fibers 3003.

Fibers 3003 take a number of different forms. For example, fibers 3003 can include at least one of glass fibers, carbon fibers, aramid fibers, para-aramid fibers, hybrid fibers, boron silicate fibers, or other suitable fibers for manufacturing unconsolidated composite material 3005. Unconsolidated composite material 3005 can also take a number of different forms. In this example, unconsolidated composite material 3005 can include at least one of a prepreg, a composite prepreg, an aerospace-grade prepreg, a thermoset prepreg, a thermoplastic prepreg, a woven fabric prepreg, a fiber tow prepreg, a tow prepreg, unidirectional tape prepreg, non-crimp fabric, or other suitable unconsolidated composite materials that include fibers.

In this example, fibers 3003 is an input into composite material manufacturing system 3023. Composite material manufacturing system 3023 uses this input to manufacture unconsolidated composite material 3005. Composite material manufacturing system 3023 can take a number of different forms. For example, composite material manufacturing system 3023 can be selected from a group comprising a prepreg machine, a hot melt prepreg machine, a carbon fiber prepreg coating line, carbon fiber prepreg coating line, a reinforcing fiber resin impregnation line, a resin mix process system, a resin filming line, a prepreg system, a slitting process system, and other suitable composite material manufacturing systems.

In this example, inconsistency detection system 3000 comprises a computer system 3012 and inconsistency analyzer 3014 and computer system 3012. As depicted, inconsistency analyzer 3014 is located in computer system 3012.

Inconsistency analyzer 3014 can be implemented in software, hardware, firmware or a combination thereof. When software is used, the operations performed by inconsistency analyzer 3014 can be implemented in program instructions configured to run on hardware, such as a processor unit. When firmware is used, the operations performed by inconsistency analyzer 3014 can be implemented in program instructions and data and stored in persistent memory to run on a processor unit. When hardware is employed, the hardware can include circuits that operate to perform the operations in inconsistency analyzer 3014.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, “a number of” when used with reference to items, means one or more items. For example, “a number of operations” is one or more operations.

Further, the phrase “at least one of,” when used with a list of items, means different combinations of one or more of the listed items can be used, and only one of each item in the list may be needed. In other words, “at least one of” means any combination of items and number of items may be used from the list, but not all of the items in the list are required. The item can be a particular object, a thing, or a category.

For example, without limitation, “at least one of item A, item B, or item C” may include item A, item A and item B, or item B. This example also may include item A, item B, and item C or item B and item C. Of course, any combination of these items can be present. In some illustrative examples, “at least one of” can be, for example, without limitation, two of item A; one of item B; and ten of item C; four of item B and seven of item C; or other suitable combinations.

Computer system 3012 is a physical hardware system and includes one or more data processing systems. When more than one data processing system is present in computer system 3012, those data processing systems are in communication with each other using a communications medium. The communications medium can be a network. The data processing systems can be selected from at least one of a computer, a server computer, a tablet computer, or some other suitable data processing system.

As depicted, computer system 3012 includes a number of processor units 3016 that are capable of executing program instructions 3018 implementing processes in the illustrative examples. In other words, program instructions 3018 are computer-readable program instructions.

As used herein, a processor unit in the number of processor units 3016 is a hardware device and is comprised of hardware circuits such as those on an integrated circuit that respond to and process instructions and program code that operate a computer. When the number of processor units 3016 executes program instructions 3018 for a process, the number of processor units 3016 can be one or more processor units that are in the same computer or in different computers. In other words, the process can be distributed between processor units 3016 on the same or different computers in computer system 3012.

Further, the number of processor units 3016 can be of the same type or different types of processor units. For example, the number of processor units 3016 can be selected from at least one of a single core processor, a dual-core processor, a multi-processor core, a general-purpose central processing unit (CPU), a graphics processing unit (GPU), a digital signal processor (DSP), or some other type of processor unit.

In this example, inconsistency analyzer 3014 operates to detect fiber inconsistencies 3002 in sections 3030 of fibers 3003 input into composite material manufacturing system 3023 in real time during operation of composite material manufacturing system 3023. In this illustrative example, a section of fibers 3003 can also be referred to as a frame of fibers 3003. Inconsistency analyzer 3014 detects material inconsistencies 3004 in unconsolidated composite material 3005 in real time as unconsolidated composite material 3005 is being manufactured by composite material manufacturing system 3023 using fibers 3003. In this example, inconsistency analyzer 3014 determines whether material inconsistencies 3004 are present in a number of sections 3030 in which fiber inconsistencies 3002 are detected in real time as unconsolidated composite material 3005 is being manufactured by composite material manufacturing system 3023. In other words, inconsistency analyzer 3014 can determine whether a section in fibers 3003 containing fiber inconsistencies 3002 will also have material inconsistencies 3004 and that section of fibers 3003 has been processed to form unconsolidated composite material 3005.

In this example, inconsistency analyzer 3014 also tracks fiber inconsistencies 3002 in the number of sections 3030 in which fibers 3003 with fiber inconsistencies 3002 resulted in material inconsistencies 3004 in the number of the sections 3030 in unconsolidated composite material 3005. In other words, inconsistency analyzer 3014 tracks a location of a particular section in which fiber inconsistencies resulted in a material inconsistency. For example, inconsistency analyzer 3014 can determine the amount of fiber inconsistencies.

In the illustrative example, inconsistency analyzer 3014 can track fiber inconsistencies 3002 in the number of sections 3030 in which fibers 3003 with fiber inconsistencies 3002 resulted in material inconsistencies 3004 in the number of sections 3030 in unconsolidated composite material 3005 using Kalman filter 3041.

In this example, Kalman filter 3041 tracks a distance d traveled by a section of fibers 3003 within a standard deviation of δ.

In one illustrative example, inconsistency analyzer 3014 can determine an amount of fiber inconsistencies 3002 that affects material inconsistencies 3004. The amount of fiber inconsistencies that affect material inconsistencies can be the amounts that cause material inconsistencies 3004 that are undesired. The amount of fiber inconsistencies 3002 that results in the material inconsistencies in unconsolidated composite material 3005 can be as follows:

$$PFI = \frac{n_{Inconsistency_{Both}}}{n_{Inconsistency_{Material}}}$$

wherein $n_{Inconsistency_{Both}}$ is a first number of frames of images that had fiber inconsistencies 3002 and $n_{Inconsistency_{Material}}$ is a second number of the frames of the images that had material inconsistencies 3004.

In this example, these determinations and other analysis and operations can be made using sensor data 3060 generated by sensor system 3061. In one illustrative example, sensor system 3061 can generate images 3062 that are analyzed by inconsistency analyzer 3014. For example, sensor system 3061 can include first camera system 3063 and second camera system 3064. These camera systems can include cameras selected from at least one of a visible light camera, an infrared camera, a thermal camera, a line scan camera, or other suitable type of camera.

In this example, first camera system 3063 is positioned to generate fiber images 3065 of fibers 3003 in a location in which fibers 3003 are input into composite material manufacturing system 3023. Fiber images 3065 are images 3062 of fibers 3003.

Second camera system 3064 is positioned to generate material images 3066 of unconsolidated composite material 3005. In this example, material images 3066 are images 3062 of unconsolidated composite material 3005.

In this illustrative example, first camera system 3063 can be positioned to generate fiber images 3065 at spreader bars in composite material manufacturing system 3023. Second camera system 3064 can be positioned to generate material images 3066 at a location prior to unconsolidated composite material being stored on a roll. The location can be any location in which material images 3066 can be generated for analysis of unconsolidated composite material 3005 in a final form in this example.

In this example, fiber images 3065 of fibers 3003 input into composite material manufacturing system 3023 can be generated in real time during operation of composite material manufacturing system 3023. Inconsistency analyzer 3014 can detect fiber inconsistencies 3002 in sections 3030 of fibers 3003 input into composite material manufacturing system 3023 in real time during operation of composite material manufacturing system 3023 using fiber images 3065 and first machine learning model 3070 in machine learning model system 3071. In this example, first machine learning model 3070 is trained to detect the fiber inconsistencies in the fiber images of the fibers.

Additionally, material images 3066 of unconsolidated composite material 3005 can be generated in real time as unconsolidated composite material 3005 is being manufactured by composite material manufacturing system 3023. Inconsistency analyzer 3014 can detect material inconsistencies 3004 in unconsolidated composite material 3005 in real time as unconsolidated composite material 3005 is being manufactured by composite material manufacturing system 3023 using material images 3066 and second machine learning model 3072. In this example, second machine learning model 3072 is trained to detect material inconsistencies 3004 in material images 3066 of the unconsolidated composite material 3005.

In these illustrative examples, first machine learning model 3070 and second machine learning model 3072 are types of artificial intelligence models that can learn without being explicitly programmed. A machine learning model can learn basic training data input into the machine learning model. The machine learning model can learn using various types of machine learning algorithms. The machine learning algorithms include at least one of a supervised learning, an unsupervised learning, a feature learning, a sparse dictionary learning, an anomaly detection, a reinforcement learning, a recommendation learning, or other types of learning algorithms. Examples of machine learning models include an artificial neural network, a convolutional neural network, a nearest mean classifier, a multi-class classification model, a decision tree, a support vector machine, a regression machine learning model, a classification machine learning model, a random forest learning model, a Bayesian network, a genetic algorithm, and other types of models. These machine learning models can be trained using data and process additional data to provide a desired output. In these examples, the particular type of machine learning model selected is one that can recognize objects or features in images.

As a result, inconsistencies 3001 can be determined while the manufacturing of unconsolidated composite material 3005 is being performed. With these determinations, inconsistency analyzer 3014 can perform a number of actions 3080 in response to material inconsistencies 3004 being present in the number of the sections 3030 in which fiber inconsistencies 3002 were detected.

A number of actions 3080 can take a number of different forms. For example, the number of actions 3080 can be selected from at least one of generate a first alert indicating fiber inconsistencies 3002; generate a second alert indicating material inconsistencies 3004; predict material inconsistencies prior to the material inconsistencies occurring; halt production of unconsolidated composite material 3005 in response to material inconsistencies 3004 being present in a number of sections 3030 in which fiber inconsistencies 3002 were detected; select new fibers for input into composite material manufacturing system 3023; or other suitable actions.

In these examples, the number of actions 3080 can be performed in real time in response to detecting inconsistencies 3001. In other words, these actions can be performed prior to completing manufacturing of all of unconsolidated composite material 3005. For example, some portions of unconsolidated composite material 3005 may be completed while other portions are still being manufactured by composite material manufacturing system 3023. One or more of these actions can be performed to reduce the occurrence of material inconsistencies 3004.

Figure 31:
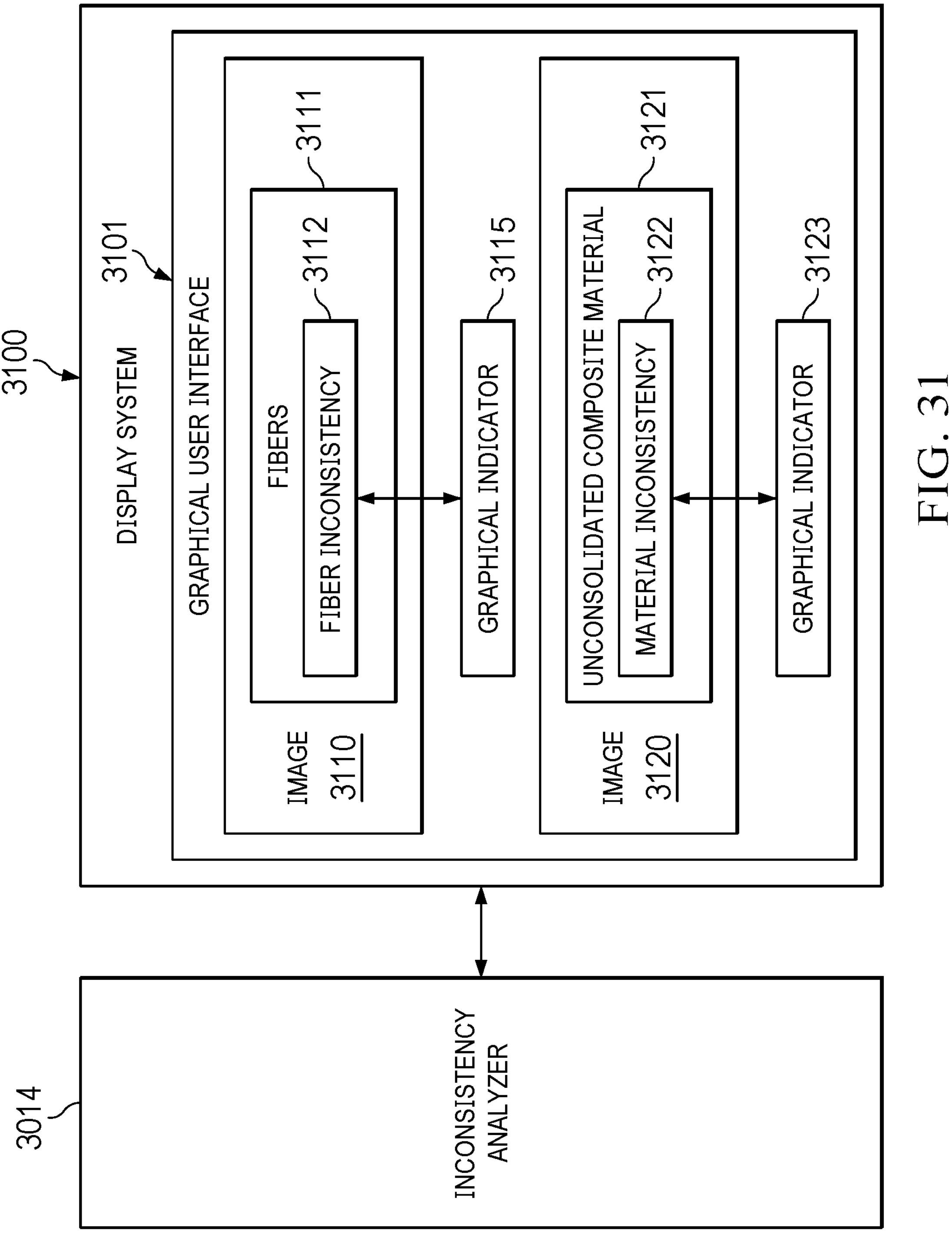
FIG. 31 is an illustration of a graphical user interface for displaying information about inconsistencies in accordance with an illustrative embodiment.

With reference now to FIG. 31, an illustration of a graphical user interface for displaying information about inconsistencies is depicted in accordance with an illustrative embodiment. In the illustrative examples, the same reference numeral may be used in more than one figure. This reuse of a reference numeral in different figures represents the same element in the different figures.

Inconsistency analyzer 3014 can display information in display system 3100. Display system 3100 is a physical hardware system and includes one or more display devices on which graphical user interface 3101 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

In this example, inconsistency analyzer 3014 can display image 3110 of fibers 3111 with fiber inconsistency 3112 in graphical user interface 3101. Inconsistency analyzer 3014 can display graphical indicator 3115 in association with fiber inconsistency 3054 in image 3110.

In this example, displaying a graphical indicator in association with fiber inconsistency 3112 means that graphical indicator 3115 is displayed in a manner that draws attention to fiber inconsistency 3112 in image 3110. A graphical indicator can include at least one of an icon, a pictogram, an ideogram, a graphic, an image, text, animation, bolding, a color, a line, an arrow, or other suitable graphic. In other words, a graphical indicator can be a single graphical element or a combination of graphical elements.

As another example, inconsistency analyzer 3014 can display image 3120 of unconsolidated composite material 3121 with material inconsistency 3122. Inconsistency analyzer 3014 can display graphical indicator 3123 in association with material inconsistency 3122 in image 3120.

The illustration of inconsistency detection system 3000 in FIG. 30 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, sensor system 3061 also generates sensor information about components in composite material manufacturing system 3023. Further, the sensor system can include other types of sensors in addition to or in place of Kim systems. Sensor system 3061 can also include one of a temperature sensor, a tension sensor, a density sensor, a drop gauge, an infrared sensor, a noncontact laser distance sensor, a beta gauge, a speed sensor, a Fourier transform infrared (FTIR) spectrometer, a Raman spectrometer, a force detector, a linear variable differential transformer (LVDT) sensor, a rotary third differential transformer (RVDT) sensor, a thickness sensor, a gap width sensor, a viscometer, a light reflecting sensor, an electrical conductivity sensor, an electrical resistance sensor, a capacitance sensor, an electromagnetic sensor, an acoustic sensor, a humidity sensor, a laser Doppler sensor, or other suitable sensors.

Figure 32:
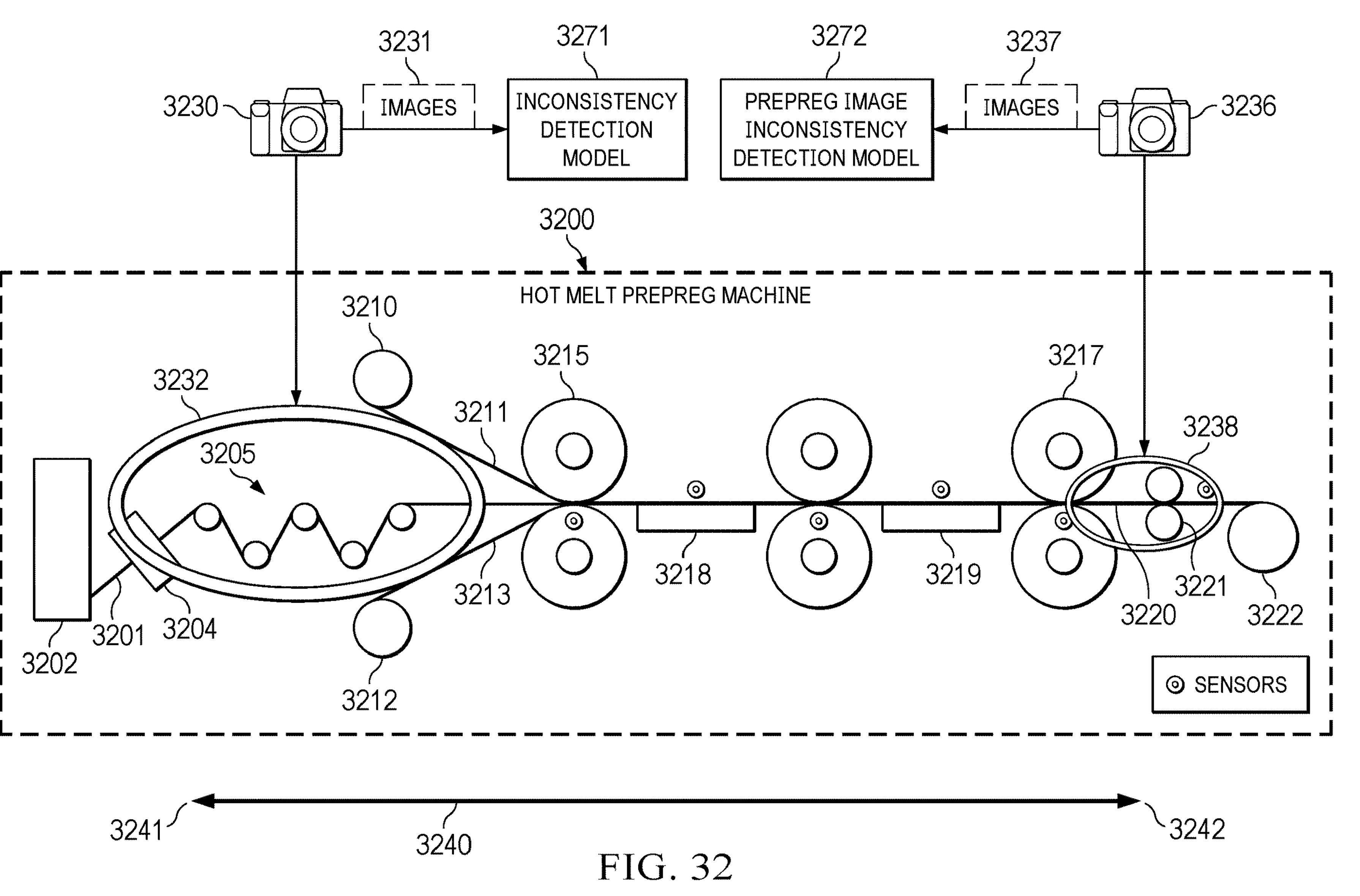
FIG. 32 is an illustration of a hot melt prepreg machine in accordance with an illustrative embodiment.

Turning next to FIG. 32, an illustration of a hot melt prepreg machine is depicted in accordance with an illustrative embodiment. In this example, hot melt prepreg machine 3200 is an example of one implementation for composite material manufacturing system 3023 in FIG. 30.

As depicted, fibers 3201 in the form of carbon fiber tows are input into hot melt prepreg machine 3200 from creel 3202. In this example, comb 3204 arranges fibers 3201 and spreader bars 3205 evenly spread fibers 3201.

In this example, filmed paper roll 3210 is a source of film 3211 and filmed paper roll 3212 is a source of film 3213. As depicted, nip 3215, nip 3216, and nip 3217 apply pressure to fibers 3201, film 3211 and film 3213. Platen 3218 and platen 3219 maintain the temperature of the materials. In this example, prepreg 3220 is cut to the final width by slitters 3221 wound onto spool 3222.

Additionally, hot melt prepreg machine 3200 also includes sensors 3280. These sensors can include at least one of a temperature sensor, a thickness sensor, a speed sensor, a gap sensor, a pressure sensor, and other suitable types of sensors. For example, the temperature and pressure sensors may monitor the temperature and pressure is applied by the nips. As another example, a thickness and temperature sensor may be used to monitor thickness and temperature at the platens.

In this example, camera 3230 is positioned to generate images 3231 of fibers 3201 within area 3232. Camera 3236 is positioned to generate images 3237 of prepreg 3220 within area 3238. In this example, images 3237 of prepreg 3220 are a finished product.

Fibers 3201 travel distance 3240 from start point 3241 to end point 3242 as fibers 3201 is processed to form prepreg 3220. In this example, distance 3240 is the distance traveled by fibers 3201 from the time fibers 3201 are photographed by camera 3236 to when prepreg 3220 is photographed by camera 3236. For example, start point 3241 is the location of camera 3230 and end point 3242 is the location of camera 3236.

Further in this example, fiber image inconsistency detection model 3271 is an example of first machine learning model 3070 in FIG. 30. Fiber image inconsistency detection model 3271 receives images 3231 generated by camera 3230 and can detect fiber inconsistencies in fibers 3201 using images 3231.

Prepreg image inconsistency detection model 3272 is an example of second machine learning model 3072 in FIG. 30. Prepreg image inconsistency detection model 3272 receives images 3237 generated by camera 3236 and can detect material inconsistencies in prepreg 3220.

The example in this figure is described with respect to a composite material manufacturing system in the form of hot melt prepreg machine 3200. This example is not meant to limit detecting inconsistencies to this particular type of machine. Other illustrative examples can be applied to other types of composite material manufacturing systems that use fibers to manufacture unconsolidated composite materials.

Figure 33:
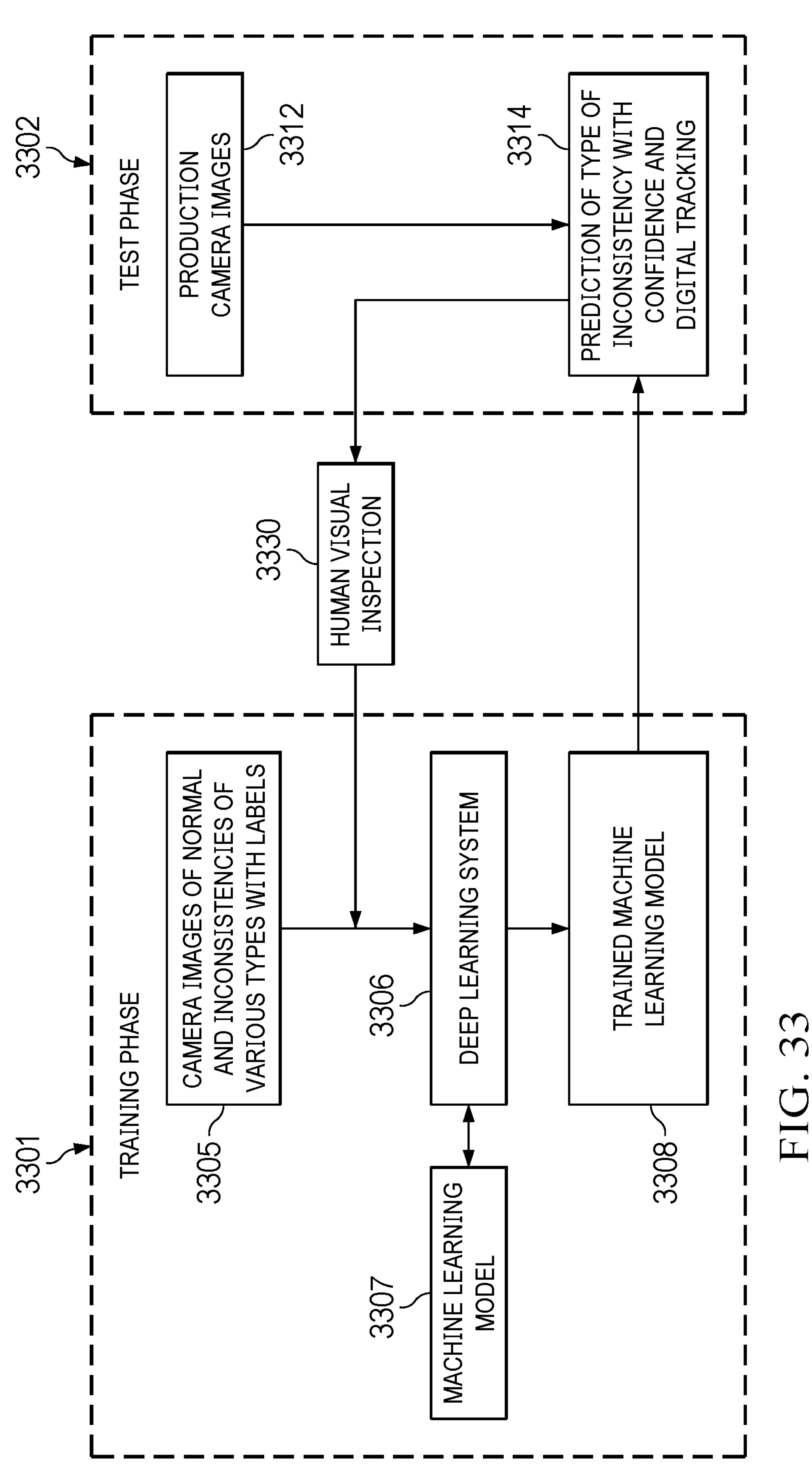
FIG. 33 is an illustration of dataflow for training a machine learning model to detect inconsistencies in accordance with an illustrative embodiment.

Turning next to FIG. 33, an illustration of dataflow for training a machine learning model to detect inconsistencies is depicted in accordance with an illustrative embodiment. This data flow can be used by machine learning models to detect a fiber inconsistency in fibers or a material inconsistency in unconsolidated composite material. In this illustrative example, the dataflow includes training phase 3301 and test phase 3302.

In training phase 3301, camera images of normal and inconsistencies of various types with labels 3305 are generated using cameras. These images can be images 3231 generated by camera 3230 of area 3232. For example, these images can be of the fiber presentation at a spreader bar area 3232.

These images can be static such as images of the fibers or prepreg that are still. Images can also be moving images in which images are generated as fibers or prepreg or moving during manufacturing in hot melt prepreg machine 3200.

The labels identify whether images are normal or include inconsistencies. The labels for inconsistencies can be for example, gap, loose, or foreign object damage. A label can be good or normal for images that do not have inconsistencies.

In these examples, when camera images of normal and inconsistencies of various types with labels 3305 include inconsistencies, the labels can include a bounding box encompassing an inconsistency and text identifying the type of inconsistency in an image. This example, camera images of normal are images that do not include inconsistencies.

In this example, machine learning model 3307 is trained by deep learning system 3306 using camera images of normal and inconsistencies of various types with labels 3305 from area 3232. Machine learning model 3307 can take a number of different forms. For example, machine learning model 3307 can be a neural network, convolutional neural network (CNN), a decision tree, a nearest mean classifier, a multi-class classification model, or other suitable types of machine learning models that can be trained to recognize objects such as inconsistencies in images.

Deep learning system 3306 performs operations to train machine learning model 3307. Deep learning system 3306 can be difficult to break be made a slat delay set, for example, the computational framework that uses neural networks to train machine learning model 3307.

In this example, the dataflow is used to train the machine learning model 3307 to detect fiber inconsistencies. In another example, the dataflow can be used to train another machine learning model to detect material inconsistencies using images 3237 generated by camera 3236 for area 3238.

In this example, camera images of normal and inconsistencies of various types, with labels 3305 are input into deep learning system 3306 to train machine learning model 3307.

The result is trained machine learning model 3308. After training, test phase 3302 can be used to assess the accuracy of training machine learning model 3308. In this example, production camera images 3312 are used to test training machine learning model 3308. Production camera images 3312 are generated by camera 3230 during production of prepreg 3220 using fibers 3201 in FIG. 32.

During test phase 3302, prediction of the type of inconsistency with confidence and digital tracking 3314 is generated by training machine learning model 3308 using production camera images. In this example, the prediction generated by machine learning model 3307 can include classifying an image corresponding to the class that is used to train machine learning model 3307. Machine learning model 3307 can draw a bounding box around the identified inconsistency in an image in production camera images 3312. Additionally, machine learning model 3307 also includes a confidence level as to the accuracy of the prediction. For example, if the accuracy of the prediction is greater than the threshold, then the image can be marked as containing an inconsistency.

In this illustrative example, machine learning model 3307 can also track the inconsistency. In other words, machine learning model 3307 can track the section from the fiber containing the inconsistency as the fiber is processed to form a prepreg. In this illustrative example, human visual inspection 3330 can be performed as needed. Human visual inspection 3330 can be performed as an additional check to ensure that the detection of inconsistencies occurs with a desired level accuracy. Human visual inspection 3330 can be used to label images for use in training machine learning model 3308 or training a new machine learning model.

For example, to identify these preferences, an analysis can be performed to identify the source of discrepancies. For example, discrepancies can be caused by aging sensors or new environmental conditions can result in incorrect predictions. With aging sensors, a calibration process can be performed to reduce discrepancies. New environmental conditions may include a change in lighting conditions, a movement of hot melt prepreg machine 3200, or other changes. With the source of the discrepancy, additional training or retraining of machine learning model can improve the accuracy in identifying fiber inconsistencies in fibers 3201 and material inconsistencies in prepreg 3220.

For example, a few images can be examined by a human visual inspection 3330 every few runs and the results compared against the machine learning model generated results. If the results do not match, these particular images with the labels generated by human visual inspection 3330 can be used for re-training.

The illustration of training phase 3301 and test phase 3302 for training machine learning model 3307 to detect fiber inconsistencies is presented as an example. In other illustrative examples, this data flow for training a machine learning model can also be used for training a machine learning model to detect material inconsistencies in unconsolidated composite material such as a prepreg. With this other illustrative example, images 3237 generated by camera 3236 of area 3238 are used for camera images of normal and inconsistency of various types with labels 3305. With this example, digital tracking is not performed for the material inconsistencies.

Figure 34:
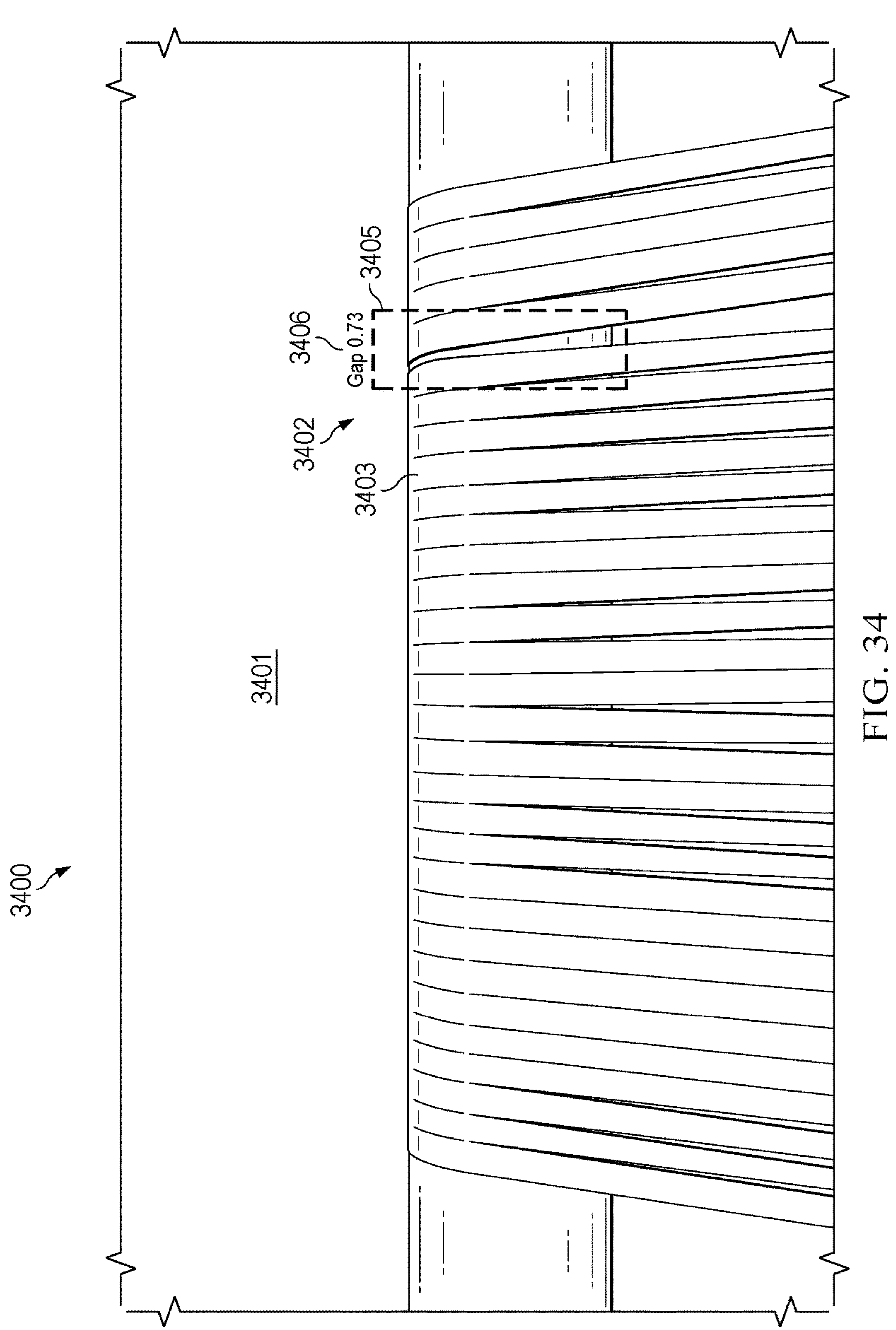
FIG. 34 is an illustration of a display of a fiber inconsistency in accordance with an illustrative embodiment.

With reference now to FIG. 34, an illustration of a display of a fiber inconsistency is depicted in accordance with an illustrative embodiment. In this illustrative example, display 3400 is an example of the display that can be displayed by a graphical user interface 3101 in FIG. 31. In this example, the fiber inconsistency can be detected by inconsistency detection model 3271 in FIG. 32. Image 3401 is shown in display 3400 with fiber inconsistency 3403 shown in association with graphical indicator 3402.

In this example, fiber inconsistency 3403 has been classified as a gap with a 73% level of accuracy. This level of accuracy meets the threshold for identifying the fiber inconsistency as a gap.

In this example, graphical indicator 3402 is displayed in association with fiber inconsistency 3403 and comprises bounding box 3405 and text 3406 that reads as "Gap 0.73".

Figure 35:
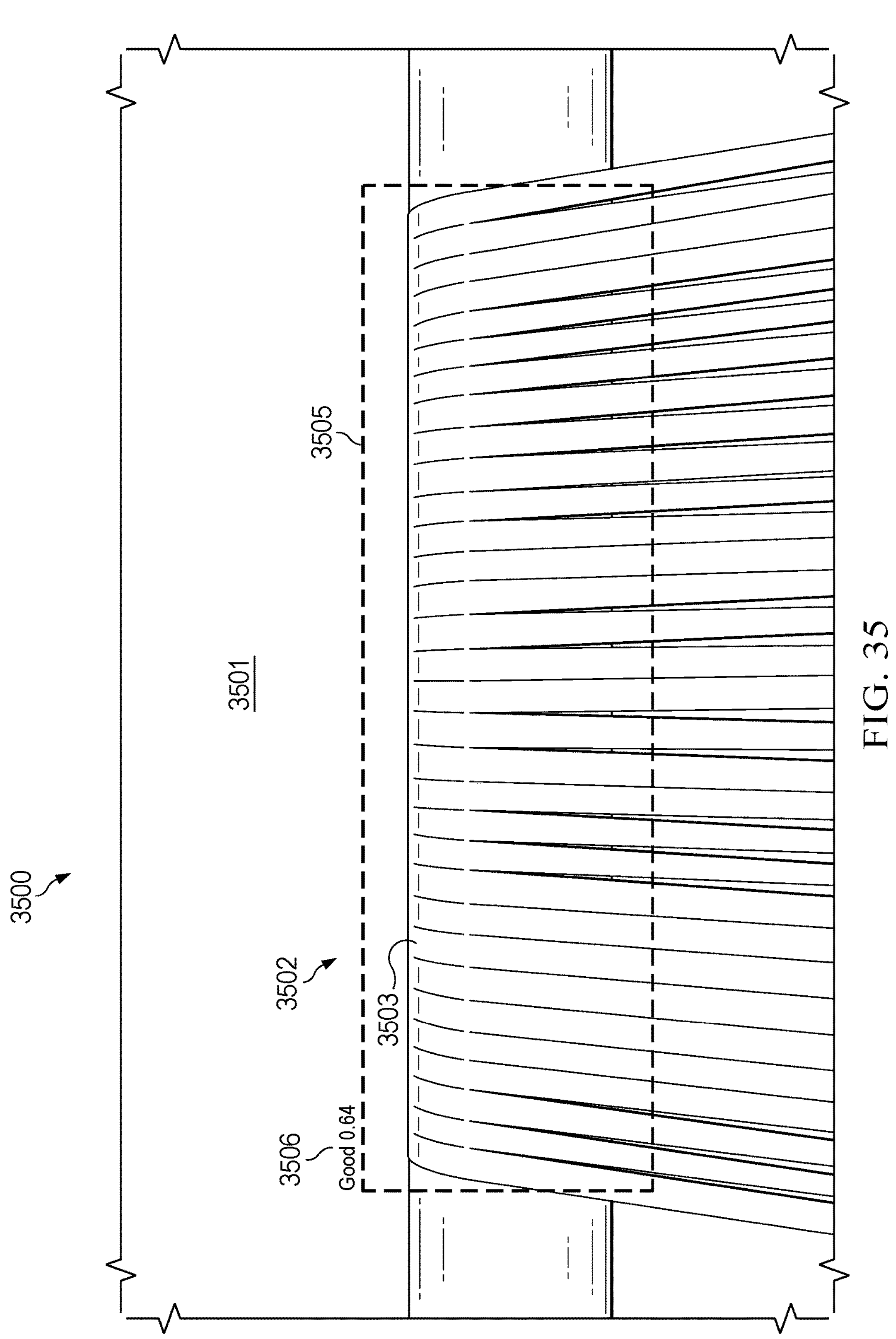
FIG. 35 is an illustration of a display of fibers without an inconsistency in accordance with an illustrative embodiment.

Next to FIG. 35, an illustration of a display of fibers without an inconsistency is depicted in accordance with an illustrative embodiment.

In this example, display 3500 is an example of the display that can be displayed in a graphical user interface 3101 in FIG. 31. Further in this example, inconsistency has not been detected by inconsistency detection model 3271 in FIG. 32. Image 3501 is shown in display 3500 which fibers 3503 are shown in association with graphical indicator 3502.

In this illustrative example, fibers 3503 has been classified as good with a 64% level of confidence. As depicted, graphical indicator 3502 comprises bounding box 3505 and text 3506. Bounding box 3505 encompasses fibers 3503. Text 3506 reads as "Good 0.64".

Figure 36:
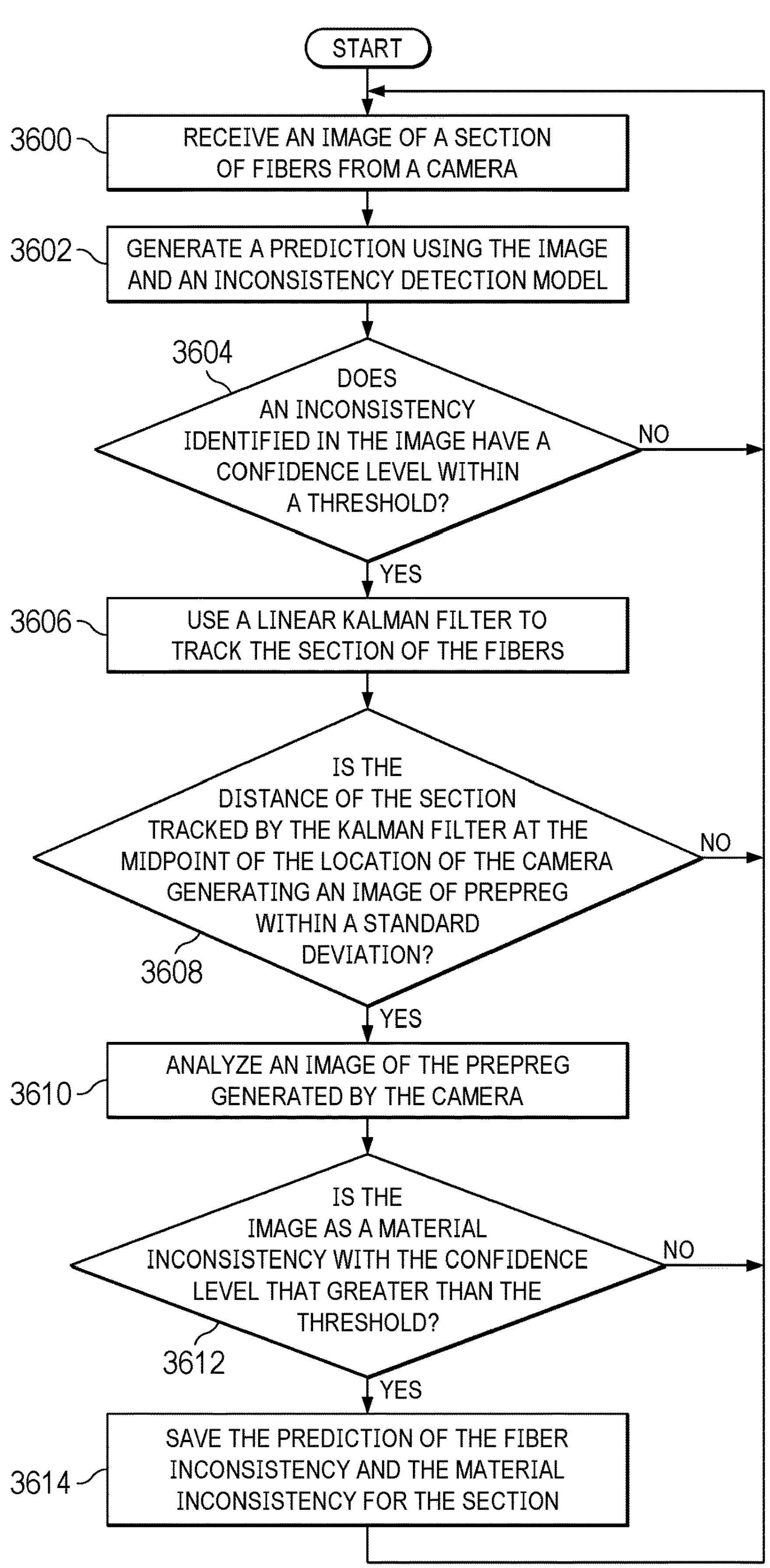
FIG. 36 is an illustration of a process for tracking a fiber inconsistency in fibers in accordance with an illustrative embodiment.

With reference now to FIG. 36, an illustration of a process for tracking a fiber inconsistency in fibers is depicted in accordance with an illustrative embodiment. The process in this flowchart can be implemented by inconsistency analyzer 3014 to track inconsistencies in a composite material manufacturing system such as hot melt prepreg machine 3200 in FIG. 32.

The process begins by receiving an image of a section of fibers from a camera (operation 3600). In operation 3600, the image is an image in images 3231 generated by camera 3230 of area 3232.

The process generates a prediction using the image and an inconsistency detection model (operation 3602). In this operation, this prediction is generated by inconsistency detection model 3271 in FIG. 32.

Next, a determination is made as to whether an inconsistency identified in the image has a confidence level within a threshold (operation 3604). In operation 3604, the threshold is one that indicates a level of confidence needed to determine that the inconsistency should be tracked. In some cases, the confidence level may be low enough that the inconsistencies identified as normal and is not tracked.

If the inconsistency has a confidence level within the threshold, the process uses a linear Kalman filter to track the section of the fibers (operation 3606). In operation 3606, a speed sensor in hot melt prepreg machine 3200 can provide sensor data for use in the Kalman filter to limit and locate the section in which the fiber consistency was detected. With the use of the Kalman filter, tracking the movement of the section can be performed with an uncertainty distribution in the form of a standard deviation for the tract distance. Uncertainty can be reduced by using sensor data from other sensors during the manufacturing process as the section moves through hot melt prepreg machine 3200.

A determination is made as to whether the distance of the section tracked by the Kalman filter is at the midpoint of the location of the camera generating an image of prepreg within a standard deviation (operation 3608). In this operation, the Kalman filter tracks distance 3240 for the section of fibers being processed within a standard deviation. In other words, the distance that the section moves is within some deviation or change from the exact distance.

This distance is the distance traveled by the section containing fiber inconsistency from when the image of section with the fiber inconsistency was generated by camera 3230 to the location where an image of the same section for the prepreg is generated by camera 3236. When the section travels this distance, this section is now positioned relative to the second camera that generates the image of the prepreg in the same section as the fibers for which the prediction of the fiber inconsistency has been generated.

If the distance tracked by the Kalman filter is within the midpoint of the location of the camera generating an image within a standard deviation, the process analyzes an image of the prepreg generated by the camera (operation 3610). In operation 3610, this image is an image in images 3237 generated by camera 3236 of area 3238.

A determination is made as to whether the image has a material inconsistency with a confidence level that is greater than the threshold (operation 3612). If the material inconsistency has a confidence level greater than the threshold, the process saves the prediction of the fiber inconsistency and the material inconsistency for the section (operation 3614). The process then returns to operation 3600. Otherwise, the process returns to operation 3600 without saving results.

With reference again to operation 3608, if the distance tracked by the Kalman filter is not within the midpoint of the location of the camera generating an image within a standard deviation, the process returns to operation 3600.

With reference again to step 3604, if the inconsistency does not have a confidence level within the threshold, the process returns to operation 3600.

The results collected in this process can be analyzed to detect a portion of fiber inconsistencies in sections that result in material inconsistencies in the sections of the final prepreg.

For example, an amount of fiber inconsistencies that affects the material inconsistencies can be determined using these results. The amount of fiber inconsistencies that results in the material inconsistencies in the unconsolidated composite material can be as follows:

$$PFI = \frac{n_{Inconsistency_{Both}}}{n_{Inconsistency_{Material}}}$$

wherein $n_{Inconsistency_{Both}}$ is a first number of sections in images that had fiber inconsistencies and $n_{Inconsistency_{Material}}$ is a second number of the sections in the images that had the material inconsistencies.

Figure 37:
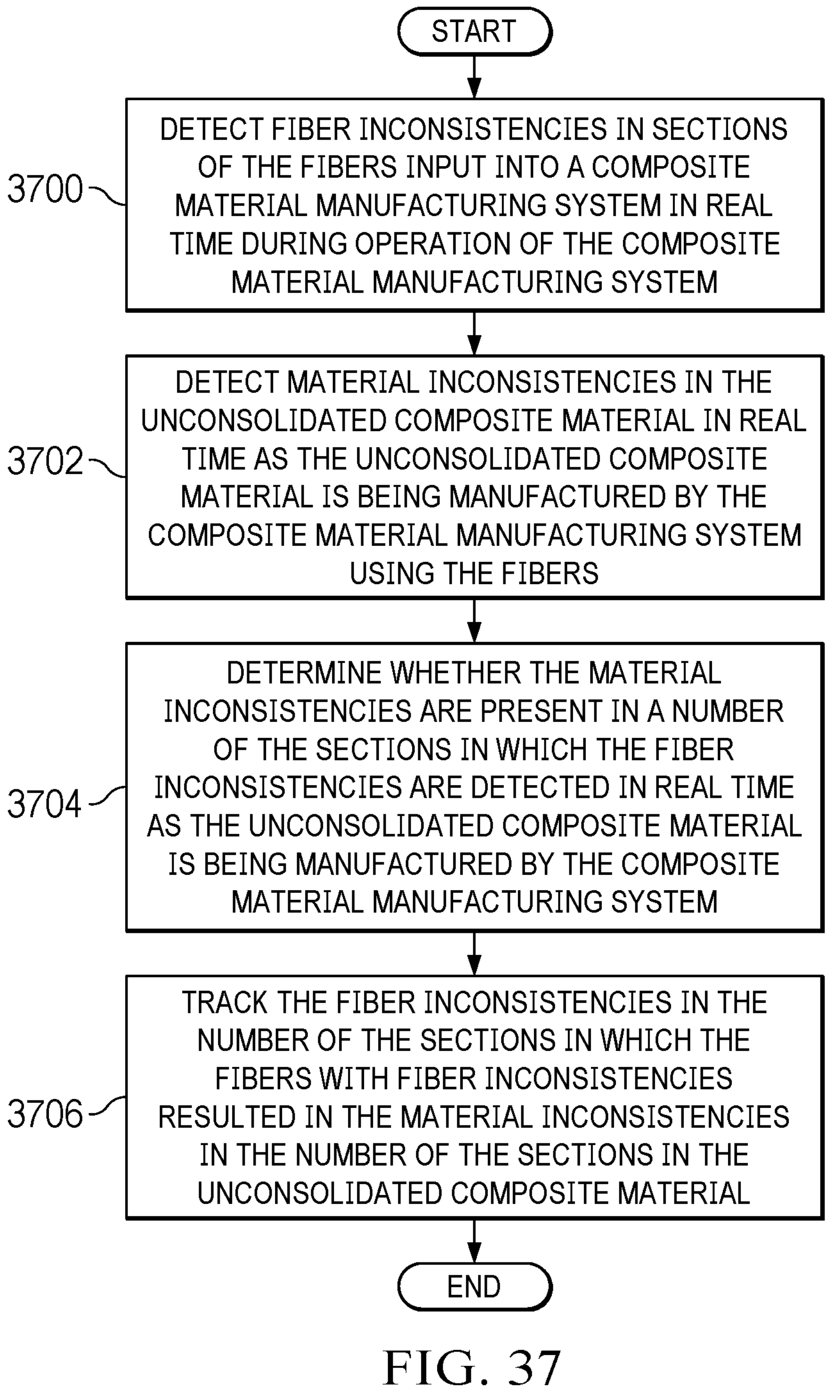
FIG. 37 is an illustration of a flowchart of a process for detecting inconsistencies in unconsolidated composite material in accordance with an illustrative embodiment.

In FIG. 37 (claim 13), an illustration of a flowchart of a process for detecting inconsistencies in unconsolidated composite material is depicted in accordance with an illustrative embodiment. The process in FIG. 37 can be implemented in hardware, software, or both. When implemented in software, the process can take the form of program instructions that are run by one or more processor units located in one or more hardware devices in one or more computer systems. For example, the process can be implemented in image analyzer 3014 in computer system 3012 in FIG. 30.

The process begins by detecting fiber inconsistencies in sections of the fibers input into a composite material manufacturing system in real time during operation of the composite material manufacturing system (operation 3700). The process detects material inconsistencies in the unconsolidated composite material in real time as the unconsolidated composite material is being manufactured by the composite material manufacturing system using the fibers (operation 3702).

The process determines whether the material inconsistencies are present in a number of the sections in which the fiber inconsistencies are detected in real time as the unconsolidated composite material is being manufactured by the composite material manufacturing system (operation 3704). The process tracks the fiber inconsistencies in the number of the sections in which the fibers with fiber inconsistencies resulted in the material inconsistencies in the number of the sections in the unconsolidated composite material (operation 3706). The process terminates thereafter.

Figure 38:
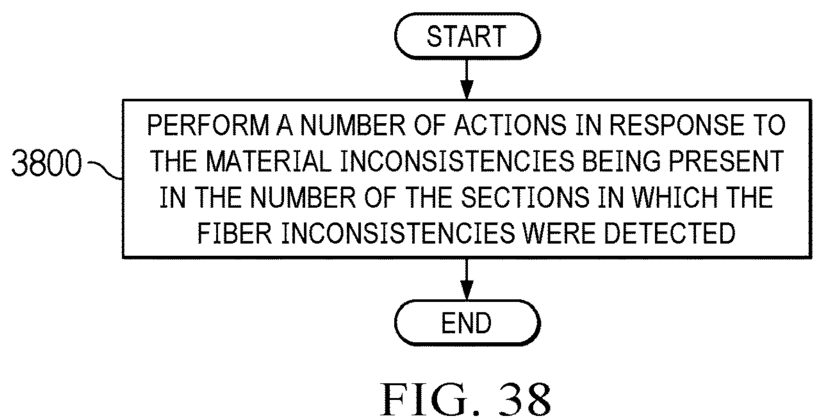
FIG. 38 is an illustration of a flowchart of a process for performing actions in accordance with an illustrative embodiment.

Next in FIG. 38, an illustration of a flowchart of a process for performing actions is depicted in accordance with an illustrative embodiment. This flowchart is an example of an additional operation that can be performed with the operations in FIG. 37.

The process performs a number of actions in response to the material inconsistencies being present in the number of the sections in which the fiber inconsistencies were detected (operation 3800). The process terminates thereafter.

Figure 39:
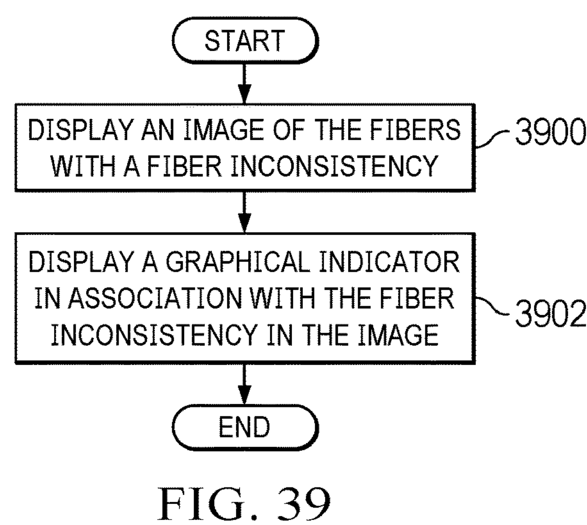
FIG. 39 is an illustration of a flowchart of a process for displaying information about a fiber inconsistency in accordance with an illustrative embodiment.

With reference next to FIG. 39, an illustration of a flowchart of a process for displaying information about a fiber inconsistency is depicted in accordance with an illustrative embodiment. The process in this flowchart is an example of an additional operation that can be performed with the operations in FIG. 37.

The process displays an image of the fibers with a fiber inconsistency (operation 3900). The process displays a graphical indicator in association with the fiber inconsistency in the image (operation 3902). The process terminates thereafter.

Figure 40:
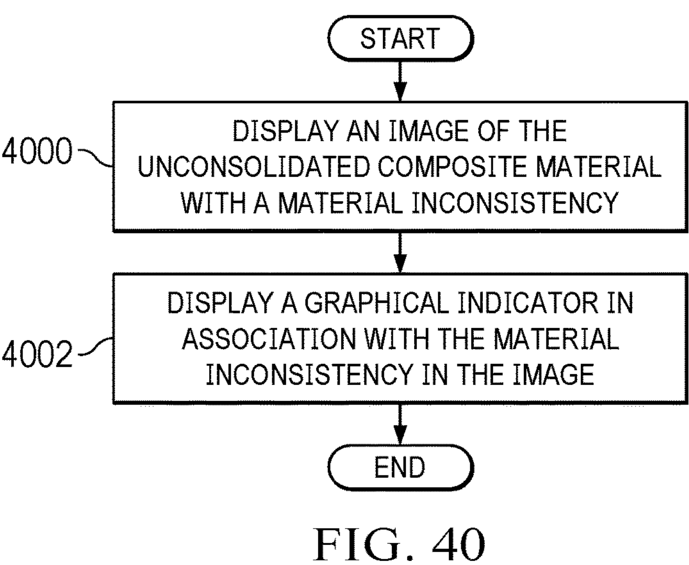
FIG. 40 is an illustration of a flowchart of a process for displaying information about a material inconsistency in accordance with an illustrative embodiment.

With reference next to FIG. 40, an illustration of a flowchart of a process for displaying information about a material inconsistency is depicted in accordance with an illustrative embodiment. The process in this flowchart is an example of an additional operation that can be performed with the operations in FIG. 37.

the process displays an image of the unconsolidated composite material with a material inconsistency (operation 4000). The process displays a graphical indicator in association with the material inconsistency in the image (operation 4002). The process terminates thereafter.

Figure 41:
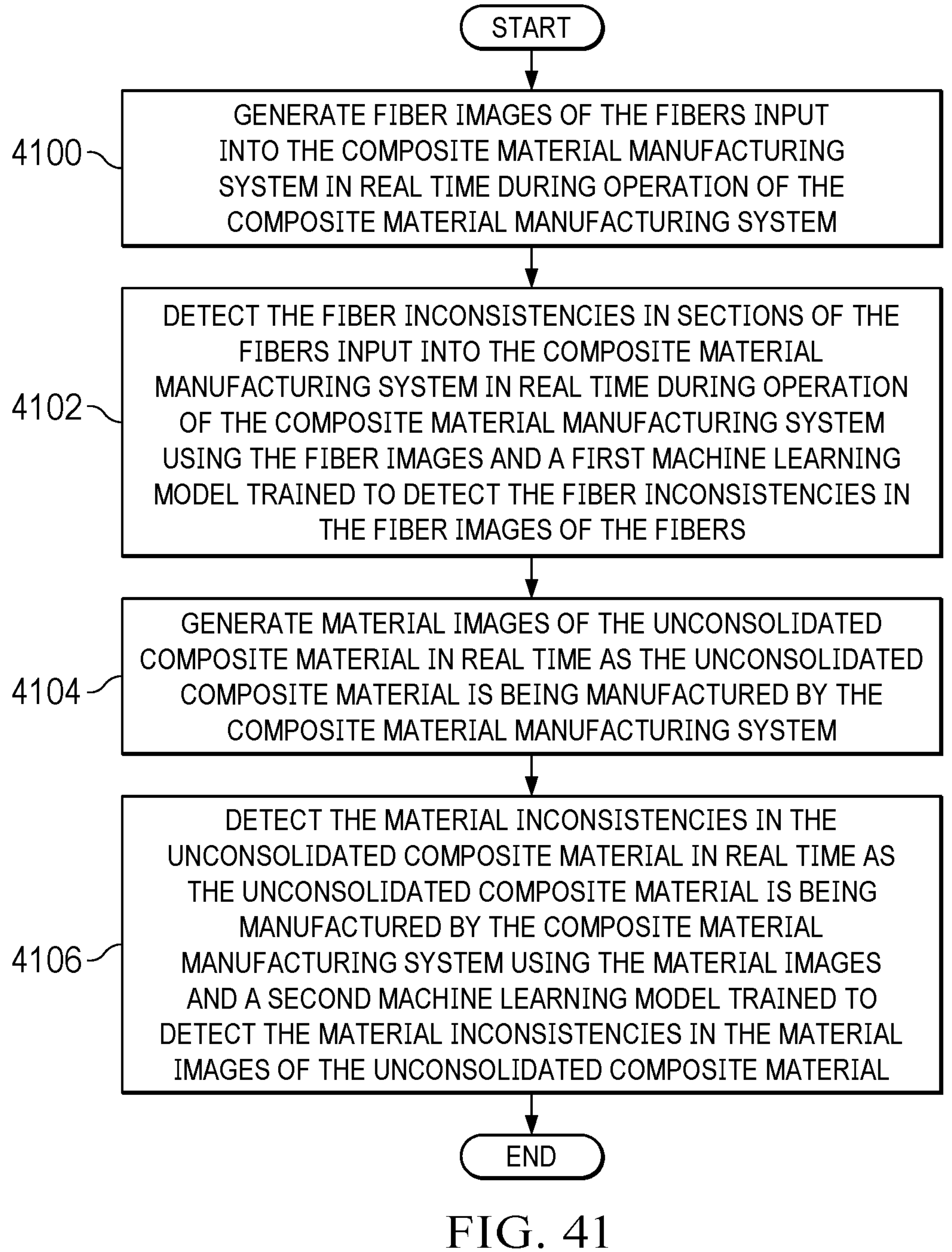
FIG. 41 is an illustration of a flowchart of a process for detecting fiber and material inconsistencies in accordance with an illustrative embodiment.

With reference now to FIG. 41, an illustration of a flowchart of a process for detecting fiber and material inconsistencies is depicted in accordance with an illustrative embodiment. The process in this flowchart is an example of an implementation of operation 3700 and operation 3702 in FIG. 37.

The process generates fiber images of the fibers input into the composite material manufacturing system in real time during operation of the composite material manufacturing system (operation 4100). The process detects the fiber inconsistencies in sections of the fibers input into the composite material manufacturing system in real time during operation of the composite material manufacturing system using the fiber images and a first machine learning model trained to detect the fiber inconsistencies in the fiber images of the fibers (operation 4102).

The process generates material images of the unconsolidated composite material in real time as the unconsolidated composite material is being manufactured by the composite material manufacturing system (operation 4104). The process detects the material inconsistencies in the unconsolidated composite material in real time as the unconsolidated composite material is being manufactured by the composite material manufacturing system using the material images and a second machine learning model trained to detect the material inconsistencies in the material images of the unconsolidated composite material (operation 4106). The process terminates thereafter.

Figure 42:
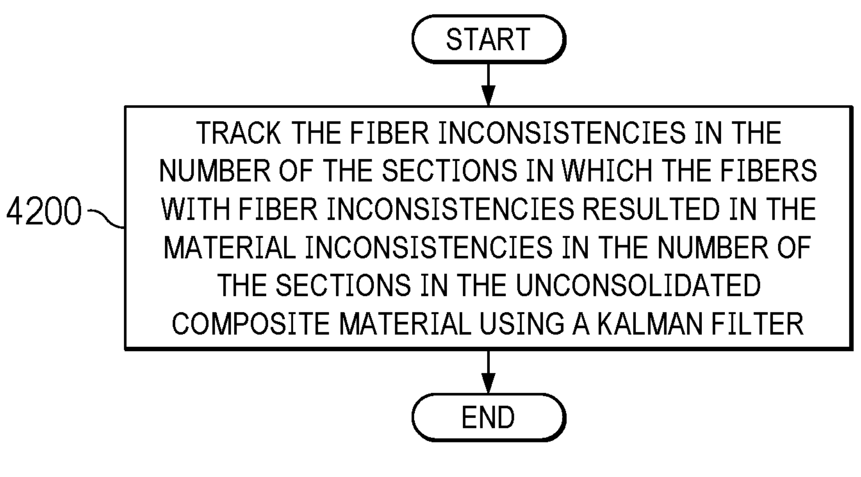
FIG. 42 is an illustration of a flowchart of a process for tracking fiber inconsistencies in accordance with an illustrative embodiment.

Next in FIG. 42, an illustration of a flowchart of a process for tracking fiber inconsistencies is depicted in accordance with an illustrative embodiment. The process in this figure is an example of an implementation for operation 3706 in FIG. 37.

The process tracks the fiber inconsistencies in the number of the sections in which the fibers with fiber inconsistencies resulted in the material inconsistencies in the number of the sections in the unconsolidated composite material using a Kalman filter (operation 4200). The process terminates thereafter. In this operation 4200, the Kalman filter tracks a distance d traveled by a section of fibers within a standard deviation of $\delta$.

Figure 43:
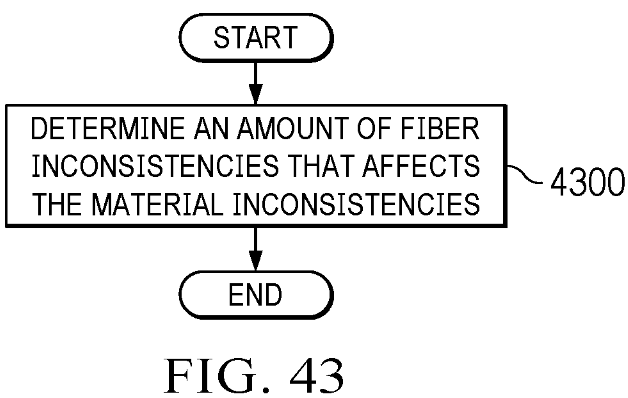
FIG. 43 is an illustration of a flowchart of a process for determining an amount of fiber inconsistencies that affects the material inconsistencies in accordance with an illustrative embodiment.

In FIG. 43, an illustration of a flowchart of a process for determining the amount of fiber inconsistencies that affects the material inconsistencies is depicted in accordance with an illustrative embodiment. The process in FIG. 43 is an example of an additional operation that can be performed with the operations in FIG. 37.

The process determines an amount of fiber inconsistencies that affects the material inconsistencies (operation 4300). The process terminates thereafter. In operation 4300, the amount of fiber inconsistencies that results in the material inconsistencies in the unconsolidated composite material is as follows:

$$PFI = \frac{n_{Inconsistency_{Both}}}{n_{Inconsistency_{material}}}$$

wherein $n_{Inconsistency_{Both}}$ is a first number of sections in images that had fiber inconsistencies and $n_{Inconsistency_{Material}}$ is a second number of the sections in the images that had the material inconsistencies.

In this example, $n_{Inconsistency_{Both}}$ is a first number of sections in images that had fiber inconsistencies and $n_{Inconsistency_{Material}}$ is a second number of the sections in the images that had the material inconsistencies within the distance with standard deviation of 1$\delta$ tracked by the Kalman Filter. This is repeated every time an inconsistency is flagged by the inconsistency detection system. Numerous PFIs can be recorded and analyzed for further statistics such as the minimum number of sections that result in material inconsistencies (if true), the type of fiber that results in lowering the overall PFIs, and other statistics.

Some features of the illustrative examples are described in the following clauses. These clauses are examples of features and are not intended to limit other illustrative examples.

Clause 1

An inconsistency detection system comprising:

a computer system; and an inconsistency analyzer located in the computer system, wherein the inconsistency analyzer is configured to:

detect fiber inconsistencies in sections of fibers input into a composite material manufacturing system in real time during operation of the composite material manufacturing system;

detect material inconsistencies in an unconsolidated composite material in real time as the unconsolidated composite material is being manufactured by the composite material manufacturing system using the fibers;

determine whether the material inconsistencies are present in a number of the sections in which the fiber inconsistencies are detected in real time as the unconsolidated composite material is being manufactured by the composite material manufacturing system; and track the fiber inconsistencies in the number of the sections in which the fibers with fiber inconsistencies resulted in the material inconsistencies in the number of the sections in the unconsolidated composite material.

Clause 2

The inconsistency detection system according to clause 1, wherein the inconsistency analyzer is configured to:

perform a number of actions in response to the material inconsistencies being present in the number of the sections in which the fiber inconsistencies were detected.

Clause 3

The inconsistency detection system according to clause 2, wherein the number of actions is selected from at least one of:

generate first alert indicating the fiber inconsistencies;

generate a second alert indicating the material inconsistencies;

predict the material inconsistencies prior to the material inconsistencies occurring;

halt production of the unconsolidated composite material in response to the material inconsistencies being present in a number of the sections in which the fiber inconsistencies were detected; and select new fibers for input into the composite material manufacturing system.

Clause 4

The inconsistency detection system according to one of clauses 1, 2, or 3, wherein the inconsistency analyzer is configured to:

display an image of the fibers with a fiber inconsistency; and display a graphical indicator in association with the fiber inconsistency in the image.

Clause 5

The inconsistency detection system according to one of clauses 1, 2, 3, or 4, wherein the inconsistency analyzer is configured to:

display an image of the unconsolidated composite material with a material inconsistency; and display a graphical indicator in association with the material inconsistency in the image.

Clause 6

The inconsistency detection system according to one of clauses 1, 2, 3, 4, or 5, wherein in detecting the fiber inconsistencies, the inconsistency analyzer is configured to:

generate fiber images of the fibers input into the composite material manufacturing system in real time during operation of the composite material manufacturing system;

detect the fiber inconsistencies in the sections of the fibers input into the composite material manufacturing system in real time during operation of the composite material manufacturing system using the fiber images and a first machine learning model trained to detect the fiber inconsistencies in the fiber images of the fibers; and wherein in detecting the material inconsistencies, the inconsistency analyzer is configured to:

generate material images of the unconsolidated composite material in real time as the unconsolidated composite material is being manufactured by the composite material manufacturing system; and detect the material inconsistencies in the unconsolidated composite material in real time as the unconsolidated composite material is being manufactured by the composite material manufacturing system using the material images and a second machine learning model trained to detect the material inconsistencies in the material images of the unconsolidated composite material.

Clause 7

The inconsistency detection system according to clause 6 further comprising:

a first camera system positioned to generate the fiber images of fibers in a location in which the fibers are input into the composite material manufacturing system; and a second camera system positioned to generate the material images in a location prior to the unconsolidated composite material being wound onto a spool.

Clause 8

The inconsistency detection system according to one of clauses 1, 2, 3, 4, 5, 5, 6, or 7, wherein in tracking the fiber inconsistencies, the inconsistency analyzer is configured to:

track the fiber inconsistencies in the number of the sections in which the fibers with fiber inconsistencies resulted in the material inconsistencies in the number of the sections in the unconsolidated composite material using a Kalman filter.

Clause 9

The inconsistency detection system according clause 8, wherein the Kalman filter tracks a distance d traveled by a section of fibers within a standard deviation of $\delta$.

Clause 10

The inconsistency detection system according to one of clauses 1, 2, 3, 4, 5, 5, 6, 7, 8, or 9, wherein the fiber inconsistencies are selected from at least one of a gap between the fibers, a loose fiber, or a foreign object in the fibers.

Clause 11

The inconsistency detection system according to one of clauses 1, 2, 3, 4, 5, 5, 6, 7, 8, 9, or 10, wherein the inconsistency analyzer is configured to:

determine an amount of fiber inconsistencies that affects the material inconsistencies.

Clause 12

The inconsistency detection system according to clause 11, wherein the amount of fiber inconsistencies that results in the material inconsistencies in the unconsolidated composite material is as follows:

$$PFI = \frac{n_{Inconsistency_{Both}}}{n_{Inconsistency_{Material}}}$$

wherein $n_{Inconsistency_{Both}}$ is a first number of the sections in images that had fiber inconsistencies and $n_{Inconsistency_{Material}}$ is a second number of the sections in the images that had the material inconsistencies.

Clause 13

A method for detecting inconsistencies in an unconsolidated composite material, the method comprising:

- detecting fiber inconsistencies in sections of the fibers input into a composite material manufacturing system in real time during operation of the composite material manufacturing system;
- detecting material inconsistencies in the unconsolidated composite material in real time as the unconsolidated composite material is being manufactured by the composite material manufacturing system using the fibers;
- determining whether the material inconsistencies are present in a number of the sections in which the fiber inconsistencies are detected in real time as the unconsolidated composite material is being manufactured by the composite material manufacturing system; and
- tracking the fiber inconsistencies in the number of the sections in which the fibers with fiber inconsistencies resulted in the material inconsistencies in the number of the sections in the unconsolidated composite material.

Clause 14

The method according to clause 13 further comprising:

- performing a number of actions in response to the material inconsistencies being present in the number of the sections in which the fiber inconsistencies were detected.

Clause 15

The method according to clause 14, wherein the number of actions is selected from at least one of:

- generate first alert indicating the fiber inconsistencies;
- generate a second alert indicating the material inconsistencies;
- predict material inconsistencies prior to the material inconsistencies occurring;
- halt production of the unconsolidated composite material in response to the material inconsistencies being present in a number of the sections in which the fiber inconsistencies were detected;
- select new fibers for input into the composite material manufacturing system.

Clause 16

The method according to one of clauses 13, 14, or 15 further comprising:

- displaying an image of the fibers with a fiber inconsistency; and
- displaying a graphical indicator in association with the fiber inconsistency in the image.

Claim 17

The method according to one of clauses 13, 14, 15, or 16 further comprising:

- displaying an image of the unconsolidated composite material with a material inconsistency; and
- displaying a graphical indicator in association with the material inconsistency in the image.

Clause 18

The method according to one of clauses 13, 14, 15, 16, or 17, wherein detecting the fiber inconsistencies comprises:

- generating fiber images of the fibers input into the composite material manufacturing system in real time during operation of the composite material manufacturing system;
- detecting the fiber inconsistencies in sections of the fibers input into the composite material manufacturing system in real time during operation of the composite material manufacturing system using the fiber images and a first machine learning model trained to detect the fiber inconsistencies in the fiber images of the fiber; and wherein detecting the material inconsistencies comprises:

- generating material images of the unconsolidated composite material in real time as the unconsolidated composite material is being manufactured by the composite material manufacturing system; and
- detecting the material inconsistencies in the unconsolidated composite material in real time as the unconsolidated composite material is being manufactured by the composite material manufacturing system using the material images and a second machine learning model trained to detect the material inconsistencies in the material images of the unconsolidated composite material.

Clause 19

The method according to clause 18, wherein a first camera system positioned to generate the fiber images of the fibers in a location in which the fibers are input into the composite material manufacturing system; and a second camera system positioned to generate the material images in a location prior to the unconsolidated composite material being wound onto a spool.

Clause 20

The method according to one of clauses 13, 14, 15, 16, 17, 18, or 19, wherein tracking the fiber inconsistencies comprises:

- tracking the fiber inconsistencies in the number of the sections in which the fibers with fiber inconsistencies resulted in the material inconsistencies in the number of the sections in the unconsolidated composite material using a Kalman filter.

Clause 21

The method according to clause 20 wherein the Kalman filter tracks a distance d traveled by a section of fibers within a standard deviation of $\delta$.

Clause 22

The method according to one of clauses 13, 14, 15, 16, 17, 18, 19, 20, or 21, wherein the fiber inconsistencies are selected from at least one of a gap between the fibers, a loose fiber, or a foreign object in the fibers.

Clause 23

The method according to one of clauses 13, 14, 15, 16, 17, 18, 19, 20, 21, or 22 further comprising:

- determining an amount of fiber inconsistencies that affects the material inconsistencies.

Clause 24

The method according to clause 23, wherein the amount of fiber inconsistencies that results in the material inconsistencies in the unconsolidated composite material is as follows:

$$PFI = \frac{n_{Inconsistency_{Both}}}{n_{Inconsistency_{Material}}}$$

wherein $n_{Inconsistency_{Both}}$ is a first number of sections in images that had fiber inconsistencies and $n_{Inconsistency_{Material}}$ is a second number of the sections in the images that had the material inconsistencies.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An inconsistency detection system comprising:

a computer system; and an inconsistency analyzer located in the computer system, wherein the inconsistency analyzer is configured to:

detect fiber inconsistencies in sections of fibers input into a composite material manufacturing system in real time during operation of the composite material manufacturing system;

detect material inconsistencies in an unconsolidated composite material in real time as the unconsolidated composite material is being manufactured by the composite material manufacturing system using the fibers;

determine whether the material inconsistencies are present in a number of the sections in which the fiber inconsistencies are detected in real time as the unconsolidated composite material is being manufactured by the composite material manufacturing system; and track the fiber inconsistencies in the number of the sections in which the fibers with fiber inconsistencies resulted in the material inconsistencies in the number of the sections in the unconsolidated composite material, wherein in tracking the fiber inconsistencies, the inconsistency analyzer is configured to:

track the fiber inconsistencies in the number of the sections in which the fibers with fiber inconsistencies resulted in the material inconsistencies in the number of the sections in the unconsolidated composite material using a Kalman filter, wherein the inconsistency analyzer is configured to: perform a number of actions in response to the material inconsistencies being present in the number of the sections in which the fiber inconsistencies were detected, and wherein the number of actions is selected from at least one of:

generate an alert indicating the fiber inconsistencies;

generate an alert indicating the material inconsistencies;

predict material inconsistencies prior to the material inconsistencies occurring;

halt production of the unconsolidated composite material in response to the material inconsistencies being present in a number of the sections in which the fiber inconsistencies were detected; and select new fibers for input into the composite material manufacturing system.

2. The inconsistency detection system of claim 1, wherein the inconsistency analyzer is configured to:

display an image of the fibers with a fiber inconsistency; and display a graphical indicator in association with the fiber inconsistency in the image.

3. The inconsistency detection system of claim 1, wherein the inconsistency analyzer is configured to:

display an image of the unconsolidated composite material with a material inconsistency; and display a graphical indicator in association with the material inconsistency in the image.

4. The inconsistency detection system of claim 1, wherein in detecting the fiber inconsistencies, the inconsistency analyzer is configured to:

generate fiber images of the fibers input into the composite material manufacturing system in real time during operation of the composite material manufacturing system;

detect the fiber inconsistencies in the sections of the fibers input into the composite material manufacturing system in real time during operation of the composite material manufacturing system using the fiber images and a first machine learning model trained to detect the fiber inconsistencies in the fiber images of the fibers; and wherein in detecting the material inconsistencies, the inconsistency analyzer is configured to:

generate material images of the unconsolidated composite material in real time as the unconsolidated composite material is being manufactured by the composite material manufacturing system; and detect the material inconsistencies in the unconsolidated composite material in real time as the unconsolidated composite material is being manufactured by the composite material manufacturing system using the material images and a second machine learning model trained to detect the material inconsistencies in the material images of the unconsolidated composite material.

5. The inconsistency detection system of claim 4 further comprising:

a first camera system positioned to generate the fiber images of fibers in a location in which the fibers are input into the composite material manufacturing system; and a second camera system positioned to generate the material images in a location prior to the unconsolidated composite material being wound onto a spool.

6. The inconsistency detection system of claim 1, wherein the Kalman filter tracks a distance d traveled by a section of fibers within a standard deviation of δ.

7. The inconsistency detection system of claim 1, wherein the fiber inconsistencies are selected from at least one of a gap between the fibers, a loose fiber, or a foreign object in the fibers.

8. The inconsistency detection system of claim 1, wherein the inconsistency analyzer is configured to:

determine an amount of fiber inconsistencies that affects the material inconsistencies.

9. The inconsistency detection system of claim 8, wherein the amount of fiber inconsistencies that results in the material inconsistencies in the unconsolidated composite material is as follows:

$$PFI = \frac{n_{Inconsistency_{Both}}}{n_{Inconsistency_{Material}}}$$

wherein $n_{Inconsistency_{Both}}$ is a first number of the sections in images that had fiber inconsistencies and material inconsistencies and $n_{Inconsistency_{Material}}$ is a second number of the sections in the images that had the material inconsistencies.

10. A method for detecting inconsistencies in an unconsolidated composite material, the method comprising:

detecting fiber inconsistencies in sections of the fibers input into a composite material manufacturing system in real time during operation of the composite material manufacturing system;

detecting material inconsistencies in the unconsolidated composite material in real time as the unconsolidated composite material is being manufactured by the composite material manufacturing system using the fibers;

determining whether the material inconsistencies are present in a number of the sections in which the fiber inconsistencies are detected in real time as the unconsolidated composite material is being manufactured by the composite material manufacturing system;

tracking the fiber inconsistencies in the number of the sections in which the fibers with fiber inconsistencies resulted in the material inconsistencies in the number of the sections in the unconsolidated composite material, wherein tracking the fiber inconsistencies comprises:

tracking the fiber inconsistencies in the number of the sections in which the fibers with fiber inconsistencies resulted in the material inconsistencies in the number of the sections in the unconsolidated composite material using a Kalman filter; and performing a number of actions in response to the material inconsistencies being present in the number of the sections in which the fiber inconsistencies were detected, wherein the number of actions is selected from at least one of:

generate an alert indicating the fiber inconsistencies;

generate an alert indicating the material inconsistencies;

predict material inconsistencies prior to the material inconsistencies occurring;

halt production of the unconsolidated composite material in response to the material inconsistencies being present in a number of the sections in which the fiber inconsistencies were detected; and select new fibers for input into the composite material manufacturing system.

11. The method of claim 10 further comprising:

displaying an image of the fibers with a fiber inconsistency; and displaying a graphical indicator in association with the fiber inconsistency in the image.

12. The method of claim 10 further comprising:

displaying an image of the unconsolidated composite material with a material inconsistency; and displaying a graphical indicator in association with the material inconsistency in the image.

13. The method of claim 10, wherein detecting the fiber inconsistencies comprises:

generating fiber images of the fibers input into the composite material manufacturing system in real time during operation of the composite material manufacturing system;

detecting the fiber inconsistencies in the sections of the fibers input into the composite material manufacturing system in real time during operation of the composite material manufacturing system using the fiber images and a first machine learning model trained to detect the fiber inconsistencies in the fiber images of the fiber; and wherein detecting the material inconsistencies comprises:

generating material images of the unconsolidated composite material in real time as the unconsolidated composite material is being manufactured by the composite material manufacturing system; and detecting the material inconsistencies in the unconsolidated composite material in real time as the unconsolidated composite material is being manufactured by the composite material manufacturing system using the material images and a second machine learning model trained to detect the material inconsistencies in the material images of the unconsolidated composite material.

14. The method of claim 13, wherein a first camera system positioned to generate the fiber images of the fibers in a location in which the fibers are input into the composite material manufacturing system; and a second camera system positioned to generate the material images in a location prior to the unconsolidated composite material being wound onto a spool.

15. The method of claim 10, wherein the Kalman filter tracks a distance d traveled by a section of fibers within a standard deviation of δ.

16. The method of claim 10, wherein the fiber inconsistencies are selected from at least one of a gap between the fibers, a loose fiber, or a foreign object in the fibers.

17. The method of claim 10 further comprising:

determining an amount of fiber inconsistencies that affects the material inconsistencies.

18. The method of claim 17, wherein the amount of fiber inconsistencies that results in the material inconsistencies in the unconsolidated composite material is as follows:

$$PFI = \frac{n_{Inconsistency_{Both}}}{n_{Inconsistency_{Material}}}$$

wherein $n_{Inconsistency_{Both}}$ is a first number of the sections in images that had fiber inconsistencies and material inconsistencies and $n_{Inconsistency_{Material}}$ is a second number of the sections in the images that had the material inconsistencies.

19. A method for detecting inconsistencies in an unconsolidated composite material, the method comprising:

detecting fiber inconsistencies in sections of the fibers input into a composite material manufacturing system in real time during operation of the composite material manufacturing system;

detecting material inconsistencies in the unconsolidated composite material in real time as the unconsolidated composite material is being manufactured by the composite material manufacturing system using the fibers;

determining whether the material inconsistencies are present in a number of the sections in which the fiber inconsistencies are detected in real time as the unconsolidated composite material is being manufactured by the composite material manufacturing system;

tracking the fiber inconsistencies in the number of the sections in which the fibers with fiber inconsistencies resulted in the material inconsistencies in the number of the sections in the unconsolidated composite material;

determining an amount of fiber inconsistencies that affects the material inconsistencies, wherein the amount of fiber inconsistencies that results in the material inconsistencies in the unconsolidated composite material is as follows:

$$PFI = \frac{n_{Inconsistency_{Both}}}{n_{Inconsistency_{Material}}}$$

wherein $n_{Inconsistency_{Both}}$ is a first number of the sections in images that had fiber inconsistencies and material inconsistencies and $n_{Inconsistency_{Material}}$ is a second number of the sections in the images that had the material inconsistencies; and performing a number of actions in response to the material inconsistencies being present in the number of the sections in which the fiber inconsistencies were detected, wherein the number of actions is selected from at least one of:

generate an alert indicating the fiber inconsistencies;

generate an alert indicating the material inconsistencies;

predict material inconsistencies prior to the material inconsistencies occurring;

halt production of the unconsolidated composite material in response to the material inconsistencies being present in a number of the sections in which the fiber inconsistencies were detected; and select new fibers for input into the composite material manufacturing system.

20. The method of claim 19, wherein tracking the fiber inconsistencies comprises:

tracking the fiber inconsistencies in the number of the sections in which the fibers with fiber inconsistencies resulted in the material inconsistencies in the number of the sections in the unconsolidated composite material using a Kalman filter.

21. The method of claim 20, wherein the Kalman filter tracks a distance d traveled by a section of fibers within a standard deviation of δ.

* * * * *